US012615334B1

(12) United States Patent　　(10) Patent No.:　US 12,615,334 B1

King et al.　　(45) Date of Patent:　Apr. 28, 2026

(54) SYSTEMS AND METHODS FOR ALLOCATING ORIGINATING CALLING PARTY IDENTIFIERS ACROSS TELECOMMUNICATIONS SERVICE BOUNDARIES

(71) Applicant: FoneTech Connect, LLC, Peachtree Corners, GA (US)

(72) Inventors: David Alan King, Peachtree Corners, GA (US); Linda Lorimer King, Peachtree Corners, GA (US)

(73) Assignee: FoneTech Connect, LLC, Peachtree Corners, GA (US)

( * ) Notice: Subject to any disclaimer, the term of this patent is extended or adjusted under 35 U.S.C. 154(b) by 0 days.

(21) Appl. No.: 19/351,902

(22) Filed: Oct. 7, 2025

Related U.S. Application Data

(63) Continuation-in-part of application No. 19/054,244, filed on Feb. 14, 2025, now Pat. No. 12,464,073.

(60) Provisional application No. 63/707,442, filed on Oct. 15, 2024.

(51) Int. Cl.
　　*H04M 3/42*　　　(2006.01)
　　*H04M 3/22*　　　(2006.01)
(52) U.S. Cl.
　　CPC ..... *H04M 3/42059* (2013.01); *H04M 3/2218* (2013.01); *H04M 2201/42* (2013.01)

(58) Field of Classification Search
None
See application file for complete search history.

(56)　　　　References Cited

U.S. PATENT DOCUMENTS

| | | | |
|---|---|---|---|
| 6,744,866 B1 * | 6/2004 | Nolting | H04M 3/2281 |
| | | | 379/112.01 |
| 2008/0056144 A1 * | 3/2008 | Hutchinson | H04L 43/00 |
| | | | 370/250 |

* cited by examiner

*Primary Examiner* — Hemant S Patel

(74) *Attorney, Agent, or Firm* — H. Brock Kolls

(57)　　　　ABSTRACT

The present invention relates to systems and methods for allocating originating calling party identifiers based on call traffic and population data. In exemplary embodiments, call records are ingested through a network interface and processed by classification, mapping, threshold evaluation, and quantity calculation modules. Results are persisted in structured databases and rendered as machine-actionable files and vector-encoded reports for automated procurement and compliance monitoring. The system incorporates stratified sampling to optimize performance on large datasets, caching to reduce latency, and audit logging with cryptographic integrity checks to ensure tamper-evident reconciliation. Identifier allocation can be applied across numbering plan areas, exchange blocks, IP address ranges, and URL-based partitions, enabling use across legacy and modern communication infrastructures. By linking real-time analytics with automated ordering and validation workflows, the invention improves provisioning speed, enforces numbering compliance, and strengthens brand identity, security, and reputation management across diverse telecommunications networks.

20 Claims, 27 Drawing Sheets

Carrier Heatmap

Which carriers your calls are terminating on?

| Row Labels | Count of Carrier Name | Carrier % | Cumulative % |
|---|---|---|---|
| T-Mobile | 19186 | 26.17% | 26.17% |
| Verizon Wireless | 16034 | 21.87% | 48.05% |
| Landline | 15193 | 20.73% | 68.78% |
| AT&T Wireless | 15135 | 20.65% | 89.42% |
| MetroPCS | 3990 | 5.44% | 94.87% |
| VoIP Carrier | 1473 | 2.01% | 96.88% |
| Spectrum - Charter / Time Warner | 788 | 1.08% | 97.95% |
| Xfinity - Comcast | 697 | 0.95% | 98.90% |
| US Cellular | 541 | 0.74% | 99.64% |
| Sprint | 245 | 0.33% | 99.97% |
| Voice Premier - Cox | 19 | 0.03% | 100.00% |
| Grand Total | 73301 | | |

Send to LocalPOP    Download Report ➜    Close ✖

Figure 9:
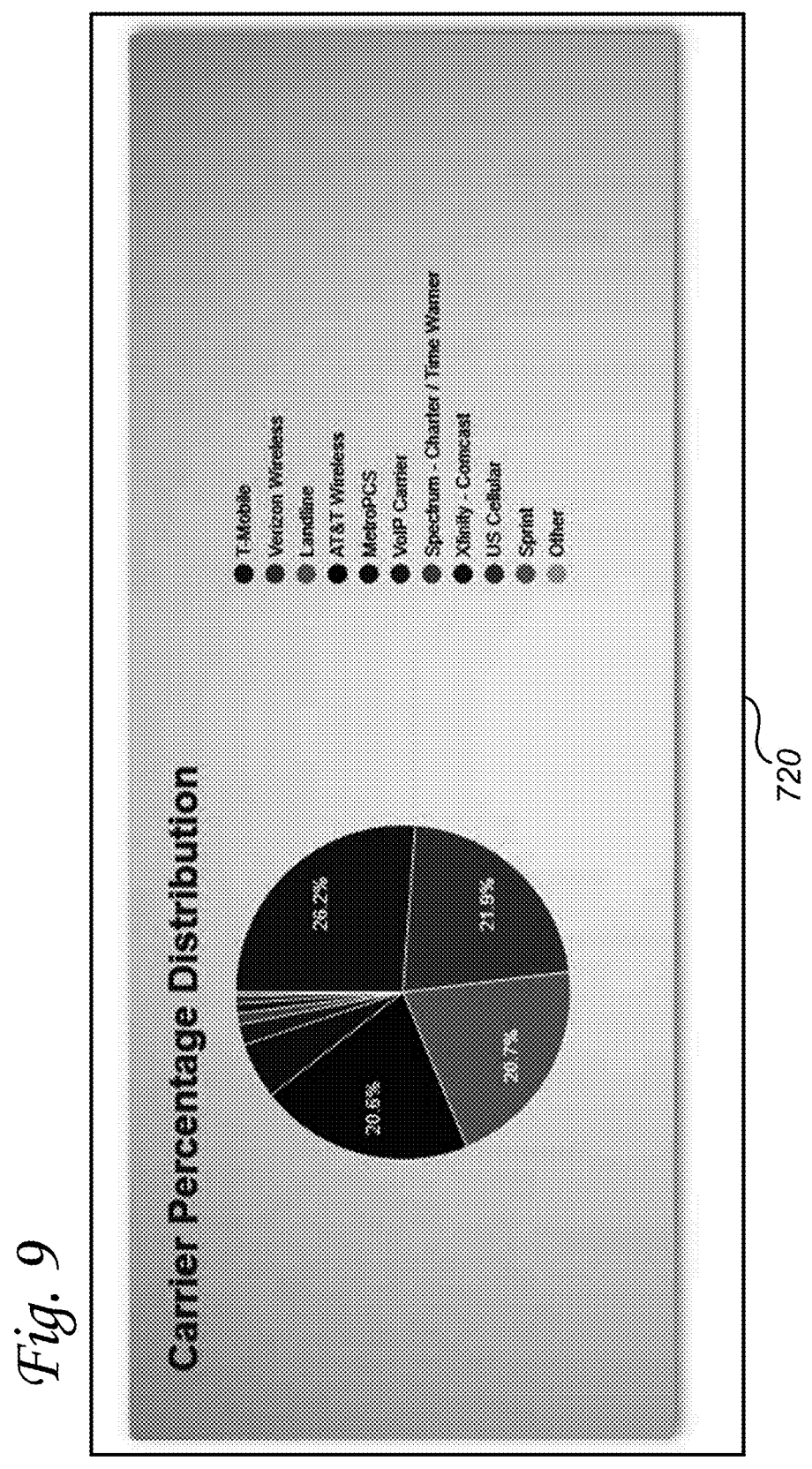

Carrier Percentage Distribution

- T-Mobile
- Verizon Wireless
- Landline
- AT&T Wireless
- MetroPCS
- VoIP Carrier
- Spectrum - Charter / Time Warner
- Xfinity - Comcast
- US Cellular
- Sprint
- Other

720

Destination Heatmap

What states are you calling?

| Row Labels | Count of State | State % | Cumulative % |
|---|---|---|---|
| TX | 10057 | 13.68% | 13.68% |
| FL | 7305 | 9.93% | 23.61% |
| CA | 5267 | 7.16% | 30.77% |
| GA | 3822 | 5.20% | 35.97% |
| PA | 3796 | 5.16% | 41.13% |
| IL | 3778 | 5.14% | 46.27% |
| NY | 3467 | 4.71% | 50.98% |
| OH | 3299 | 4.49% | 55.47% |
| MI | 2765 | 3.76% | 59.23% |
| NJ | 2742 | 3.73% | 62.96% |
| NC | 1896 | 2.58% | 65.53% |
| TN | 1660 | 2.26% | 67.79% |
| AZ | 1566 | 2.13% | 69.92% |
| IN | 1459 | 1.98% | 71.91% |
| VA | 1414 | 1.92% | 73.83% |
| MO | 1407 | 1.91% | 75.74% |
| LA | 1281 | 1.74% | 77.48% |
| MD | 1146 | 1.56% | 79.04% |
| SC | 1126 | 1.53% | 80.57% |
| OK | 1104 | 1.50% | 82.07% |
| AL | 1069 | 1.45% | 83.53% |
| CO | 1035 | 1.41% | 84.93% |
| MN | 1029 | 1.40% | 86.33% |
| WI | 914 | 1.24% | 87.58% |
| AR | 880 | 1.20% | 88.77% |
| KY | 863 | 1.17% | 89.95% |
| MA | 842 | 1.14% | 91.09% |
| CT | 640 | 0.87% | 91.96% |
| OR | 639 | 0.87% | 92.83% |
| MS | 633 | 0.86% | 93.69% |
| ME | 449 | 0.61% | 94.30% |
| IA | 444 | 0.60% | 94.91% |
| NM | 424 | 0.58% | 95.48% |
| WA | 420 | 0.57% | 96.05% |
| KS | 413 | 0.56% | 96.62% |
| UT | 398 | 0.54% | 97.16% |
| NE | 269 | 0.37% | 97.52% |
| NH | 266 | 0.36% | 97.88% |
| DE | 248 | 0.34% | 98.22% |
| HI | 236 | 0.32% | 98.54% |
| RI | 206 | 0.28% | 98.82% |
| NV | 177 | 0.24% | 99.06% |
| MT | 160 | 0.22% | 99.28% |
| SD | 115 | 0.16% | 99.44% |
| VT | 105 | 0.14% | 99.58% |
| ID | 90 | 0.12% | 99.70% |
| WV | 75 | 0.10% | 99.80% |
| ND | 66 | 0.09% | 99.89% |
| AK | 41 | 0.06% | 99.95% |
| WY | 37 | 0.05% | 100.00% |
| Grand Total | 73540 | | |

LPOP Report

| OBN Quantity | Location | Traffic Volume | NPA1 | NPA2 | NPA3 | NPA4 | NPA5 | NPA6 | NPA7 | NPA8 |
|---|---|---|---|---|---|---|---|---|---|---|
| 18 | CHICAGO IL | 4.4% | 847 | 708 | 224 | 773 | 872 | 630 | 331 | 464 |
| 14 | ATLANTA GA | 4.08% | 770 | 678 | 470 | 943 | 706 | 762 | ' | ' |
| 14 | DALLAS TX | 3.8% | 972 | 469 | 945 | 214 | 817 | 682 | ' | ' |
| 14 | HOUSTON TX | 3.72% | 281 | 346 | 832 | ' | ' | ' | ' | ' |
| 14 | NEW YORK METRO NY | 3.68% | 917 | 929 | 347 | 718 | 631 | 934 | 914 | 516 |
| 19 | LOS ANGELES CA | 3.54% | 909 | 213 | 951 | 323 | 310 | 818 | 840 | 424 |
| 10 | SOUTHEAST FL OJUS EAEA | 3.34% | 754 | 954 | 305 | 786 | 645 | ' | ' | ' |
| 11 | PHILADELPHIA PA | 2.82% | 610 | 484 | 215 | 267 | 445 | ' | ' | ' |
| 11 | NORTH JERSEY NJ | 2.65% | 908 | 732 | 848 | 201 | 973 | 862 | 551 | ' |
| 10 | DETROIT MI | 2.54% | 248 | 947 | 734 | 810 | 586 | ' | ' | ' |
| 7 | GULF COAST | 2.04% | 813 | 656 | 863 | 941 | 727 | ' | ' | ' |
| 6 | PHOENIX AZ | 1.68% | 928 | 520 | 602 | ' | ' | ' | ' | ' |
| 5 | SAN ANTONIO TX | 1.57% | 830 | 956 | 210 | ' | ' | ' | ' | ' |
| 6 | ST LOUIS MO | 1.3% | 636 | 573 | 618 | ' | ' | ' | ' | ' |
| 7 | SAN FRANCISCO CA | 1.26% | 707 | 925 | 341 | 510 | 408 | 669 | 650 | 369 |
| 5 | CLEVELAND OH | 1.26% | 440 | 216 | 234 | ' | ' | ' | ' | ' |
| 4 | DENVER CO | 1.16% | 970 | 303 | 720 | ' | ' | ' | ' | ' |
| 5 | WASHINGTON DC | 1.04% | 240 | 301 | 571 | 703 | 227 | ' | ' | ' |
| 6 | EASTERN MA | 1.02% | 508 | 774 | 617 | 781 | 978 | 857 | ' | ' |
| 4 | COLUMBUS OH | 1.01% | 740 | 220 | 380 | 614 | ' | ' | 339 | ' |
| 4 | PITTSBURGH PA | 1.01% | 878 | 724 | 412 | ' | ' | ' | ' | ' |
| 4 | BROWNSVILLE TX | 1.01% | 956 | ' | ' | ' | ' | ' | ' | ' |

Recommended Quantity of Toll-Free Numbers: 14

Number Sentry Server

202

*Originating Calling Party Identifier* 302   Call Generation Server

*Inquiry Attempt Acknowledgement*

304    204   310

Comms. Network 228

338

222B   222B   222B 222B   222B   222B

*Calling Party Reputation Data*

306

406

Call Receiving Test Rack

312   228

*Call Routed To Answer Server*

*Answer Acknowledgement*

340

Comms. Network

206

308

402

Answer Server

*Labeling, Block, Branding Analysis*

310     222A

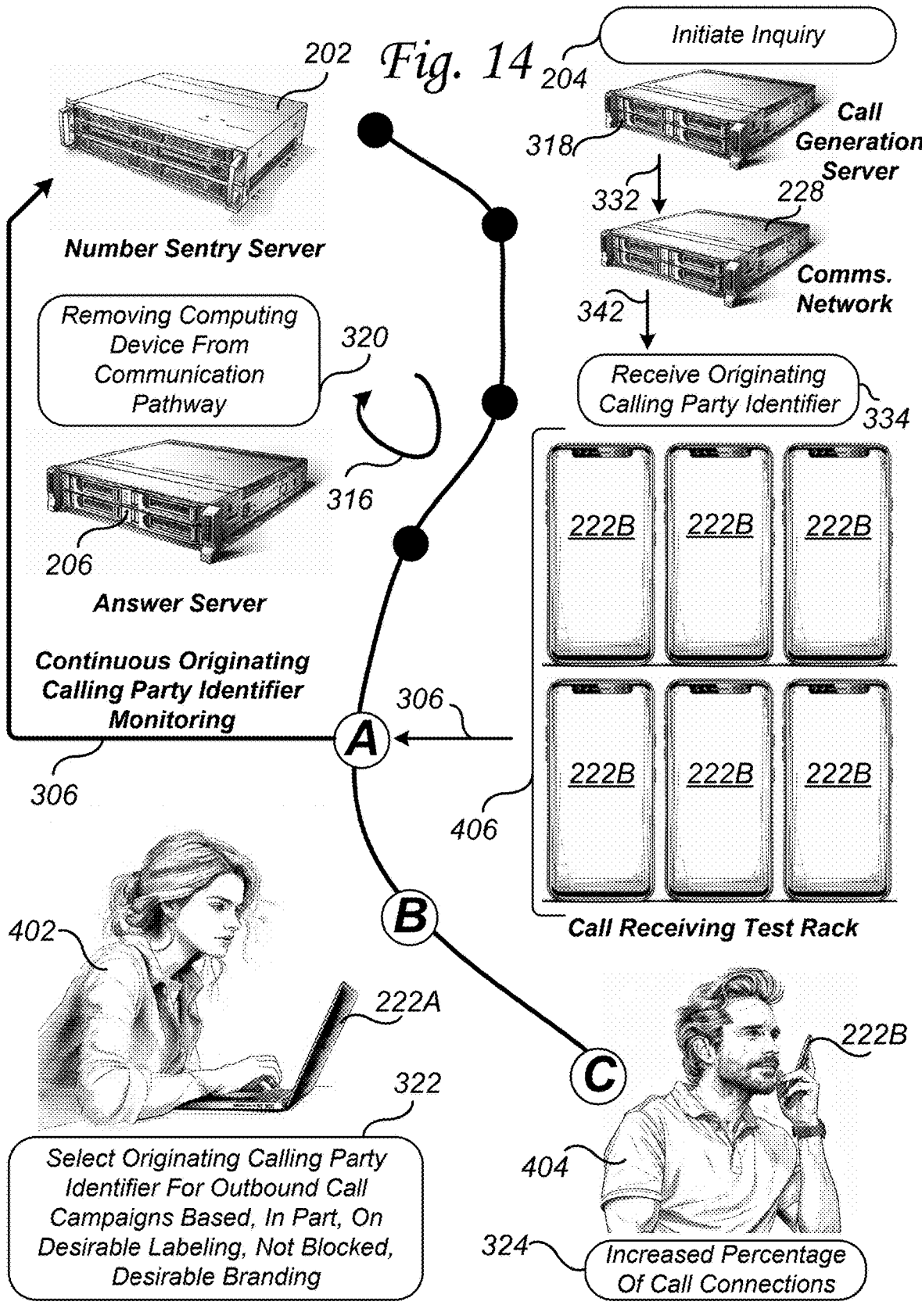

*Fig. 14*

Initiate Inquiry

202 — Number Sentry Server

204 — Call Generation Server

318

332

228 — Comms. Network

342

Removing Computing Device From Communication Pathway — 320

316

206 — Answer Server

Receive Originating Calling Party Identifier — 334

Continuous Originating Calling Party Identifier Monitoring

306

306

A

306

406

222B 222B 222B 222B 222B 222B

Call Receiving Test Rack

402

B

222A

322

C

404

222B

Select Originating Calling Party Identifier For Outbound Call Campaigns Based, In Part, On Desirable Labeling, Not Blocked, Desirable Branding 324 — Increased Percentage Of Call Connections Managing Brand Identity And Brand
Reputation Database And Local POP 502

Managing Brand Identity And Brand Reputation Database And Local POP <u>502</u>

Call Log Record <u>522</u>

| Log Identifier |
| --- |
| Call Record ID |
| Originating Identifier |
| Received Identifier |
| Timestamp |
| Call Duration |
| Termination Cause |
| Other Fields |

DID Metric Record <u>524</u>

| DID Metric Identifier |
| --- |
| DID Number |
| DID Status |
| Call Success Rate |
| Block Rate |
| Engagement Score |
| Health Score |
| Other Fields |

Heatmap Record <u>526</u>

| Heatmap Identifier |
| --- |
| Heatmap ID |
| LATA ID |
| Geographic Coordinates (Lat/Long or Polygon ID) |
| Call Volume |
| Population Value |
| Color Intensity Value |
| Other Fields |

Campaign Analytics Record <u>528</u>

| Campaign Record Identifier |
| --- |
| Campaign ID |
| Campaign Name |
| Start Date |
| End Date |
| DIDs Assigned |
| Total Calls |
| Conversion Rate |
| Compliance Flag |
| Other Fields |

Outbound Call Metrics Record <u>532</u>

| Calling Identifier Status ID |
| --- |
| Metric Record ID |
| Total Outbound Calls |
| Average Call Duration |
| Answer Rate |
| Latency Mean |
| Error Rate |
| Carrier Distribution Percentage |
| Other Fields |

Fraud/Risk Record <u>530</u>

| Fraud Identifier |
| --- |
| Risk Record ID |
| Call Fingerprint (Hash Or Feature Vector) |
| Fraud Score |
| Rejection Rate |
| Suspicious Pattern Flag |
| Carrier Feedback |
| Other Fields |

Records Data Table <u>534</u>

| Records Identifier | | |
| --- | --- | --- |
| Call Record ID | Traffic Volume Value | Fraud Score |
| Originating Identifier | | Routing Score |
| Received Identifier | Carrier ID | DID Assignment |
| Rate Center | Carrier Feedback | Procurement Status |
| LATA ID | NPA Code | Idempotency Token |
| Call Count | NPA Rank | Audit Hash |
| Population Value | Recommended Quantity | Compliance Flag |
| Threshold Flag | | Other Fields |

*Fig. 19B*

Start

A Network Interface Configured To Receive Call Records   *1002*

Classification Module   *1004*

Distinguish The Terminating Calling Party Identifiers From The Originating Calling Party Identifiers Within The Call Records   *1006*

Recon Module   *1008*

Generate Carrier And Destination Heatmap Data From The Terminating Calling Party Identifiers And To Persist The Heatmap Data   *1010*

Mapping Module   *1012*

Map The Terminating Calling Party Identifiers With One Or More Telecommunications-Defined Service Boundries   *1014*

Traffic Volume Module   *1016*

Compute, For Each Telecommunications-Defined Service Boundaries, A Traffic Volume Value Based On Associated Call Counts   *1018*

Numbering Plan Partition Selector Configured, For Each Of The Telecommunications-Defined Service Boundaries Identified, To Retrieve, Sort, Resolve, And Output A Set Of Telecommunications Numbering Plan Partitions For Each Telecommunications-Defined Service Boundaries Identified   *1020*

Quantity Calculator Configured To Computer, For ach Of The Telecommunications-Defined Service Boundaries Identified, A Required Quantity Of Originating Calling Party Identifiers

*1022*

Report Generator Configured To Output A Machine-Actionable File And A Vector-Encoded Heatmap Report

Exit

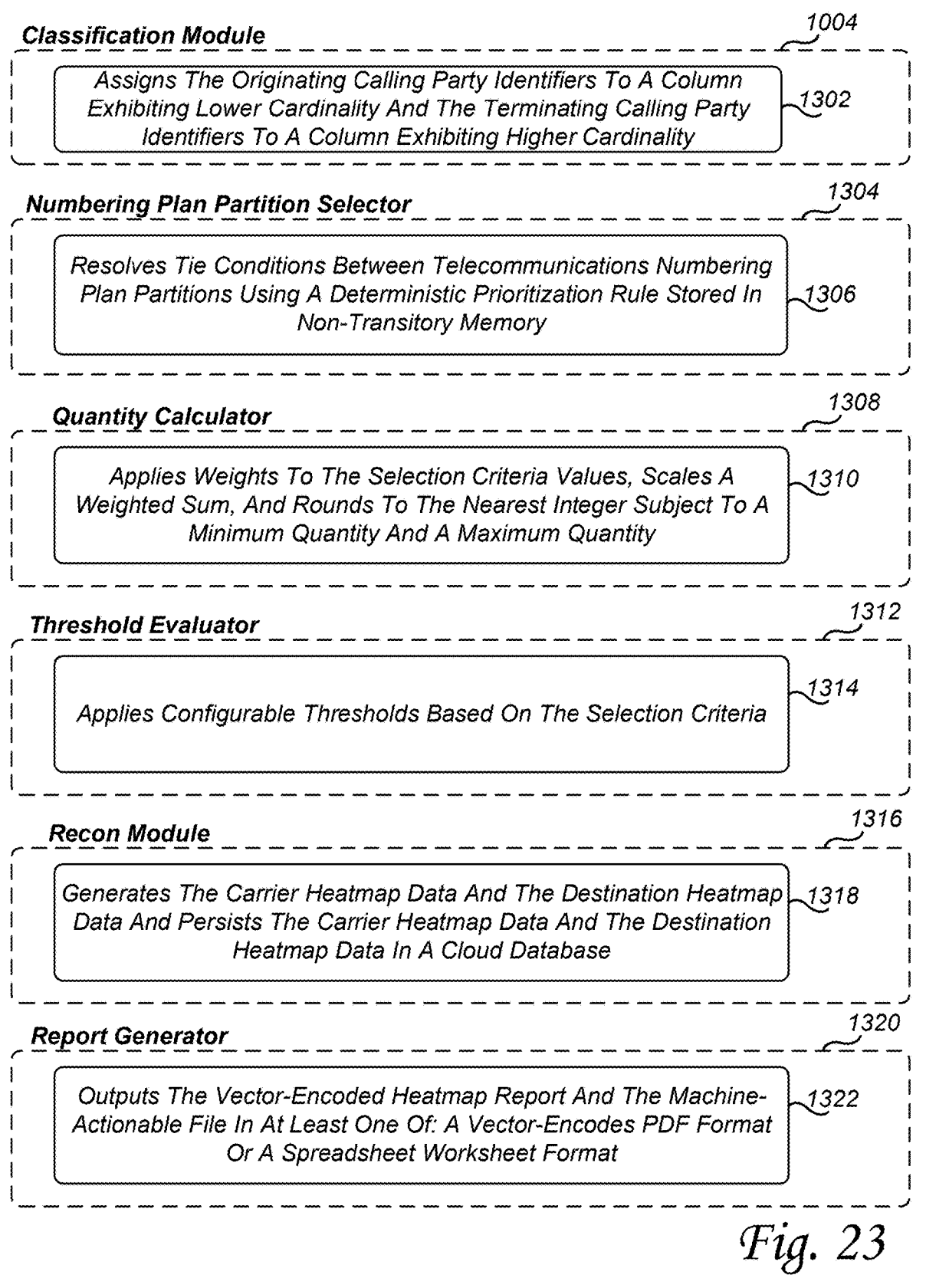

Classification Module      1004

> Assigns The Originating Calling Party Identifiers To A Column Exhibiting Lower Cardinality And The Terminating Calling Party Identifiers To A Column Exhibiting Higher Cardinality   1302

Numbering Plan Partition Selector      1304

> Resolves Tie Conditions Between Telecommunications Numbering Plan Partitions Using A Deterministic Prioritization Rule Stored In Non-Transitory Memory   1306

Quantity Calculator      1308

> Applies Weights To The Selection Criteria Values, Scales A Weighted Sum, And Rounds To The Nearest Integer Subject To A Minimum Quantity And A Maximum Quantity   1310

Threshold Evaluator      1312

> Applies Configurable Thresholds Based On The Selection Criteria   1314

Recon Module      1316

> Generates The Carrier Heatmap Data And The Destination Heatmap Data And Persists The Carrier Heatmap Data And The Destination Heatmap Data In A Cloud Database   1318

Report Generator      1320

> Outputs The Vector-Encoded Heatmap Report And The Machine-Actionable File In At Least One Of: A Vector-Encodes PDF Format Or A Spreadsheet Worksheet Format   1322

*Fig. 23*

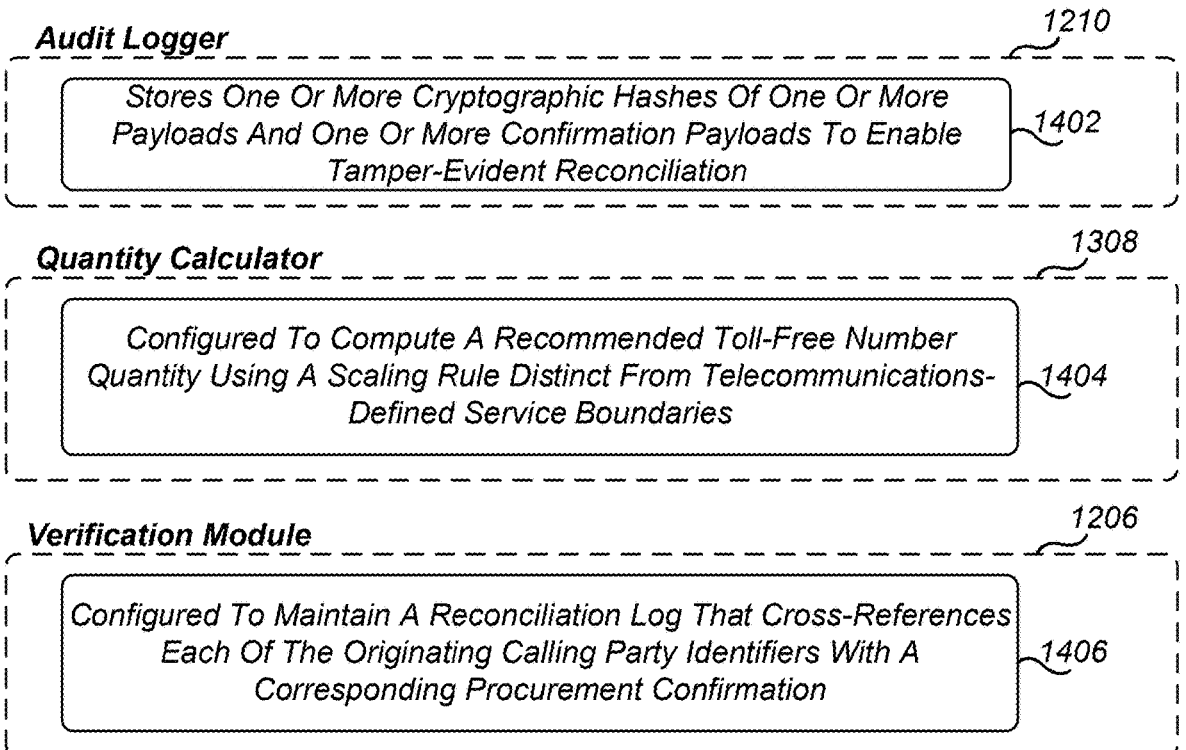

*Audit Logger*                    1210

Stores One Or More Cryptographic Hashes Of One Or More Payloads And One Or More Confirmation Payloads To Enable Tamper-Evident Reconciliation    1402

*Quantity Calculator*            1308

Configured To Compute A Recommended Toll-Free Number Quantity Using A Scaling Rule Distinct From Telecommunications-Defined Service Boundaries    1404

*Verification Module*            1206

Configured To Maintain A Reconciliation Log That Cross-References Each Of The Originating Calling Party Identifiers With A Corresponding Procurement Confirmation    1406

*Fig. 24*

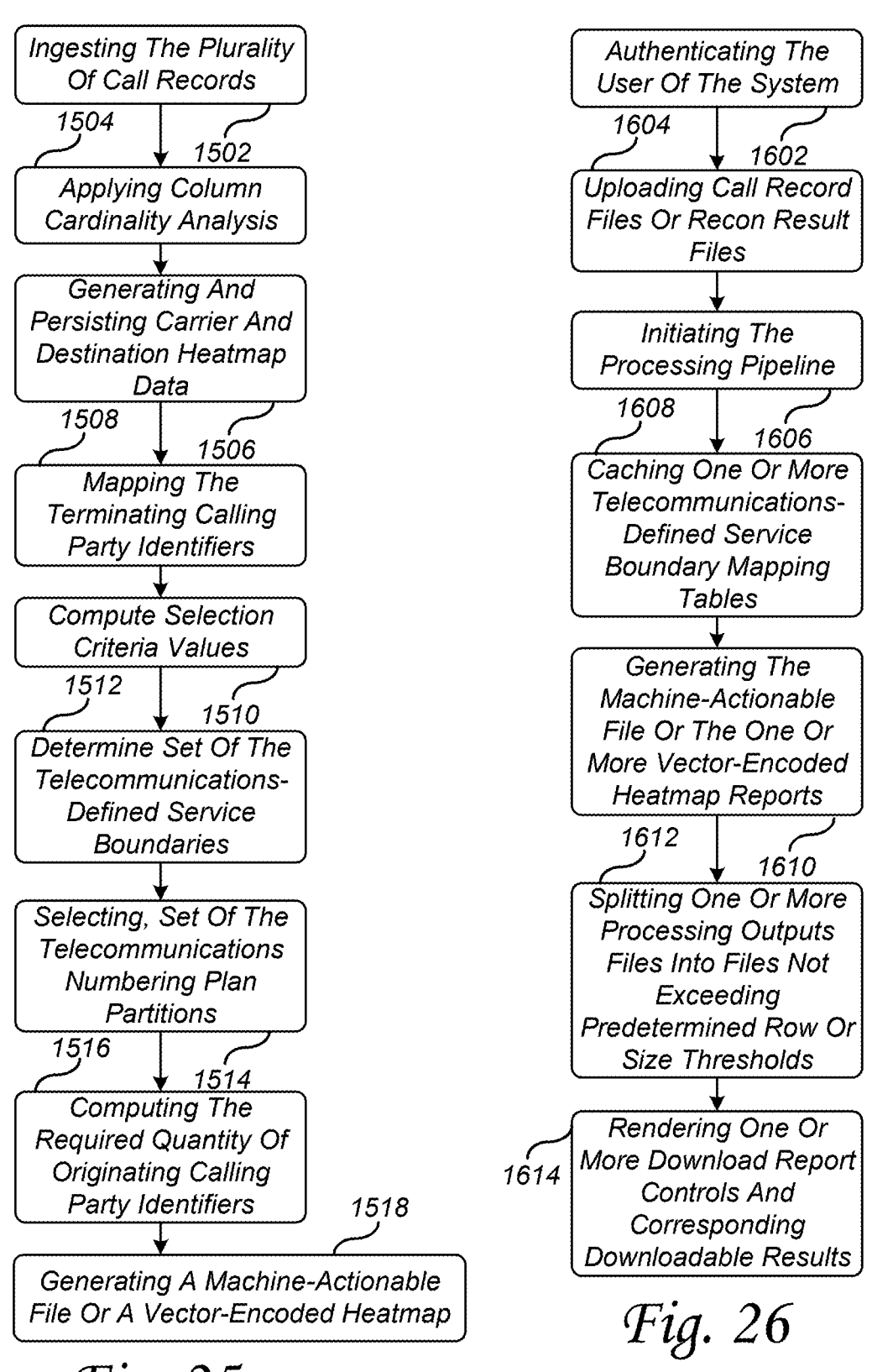

Ingesting The Plurality Of Call Records

1504

1502

Applying Column Cardinality Analysis

Generating And Persisting Carrier And Destination Heatmap Data

1508

1506

Mapping The Terminating Calling Party Identifiers

Compute Selection Criteria Values

1512

1510

Determine Set Of The Telecommunications-Defined Service Boundaries

Selecting, Set Of The Telecommunications Numbering Plan Partitions

1516

1514

Computing The Required Quantity Of Originating Calling Party Identifiers

1518

Generating A Machine-Actionable File Or A Vector-Encoded Heatmap

*Fig. 25*

Authenticating The User Of The System

1604

1602

Uploading Call Record Files Or Recon Result Files

Initiating The Processing Pipeline

1608

1606

Caching One Or More Telecommunications-Defined Service Boundary Mapping Tables

Generating The Machine-Actionable File Or The One Or More Vector-Encoded Heatmap Reports

1612

1610

Splitting One Or More Processing Outputs Files Into Files Not Exceeding Predetermined Row Or Size Thresholds

1614

Rendering One Or More Download Report Controls And Corresponding Downloadable Results

*Fig. 26*

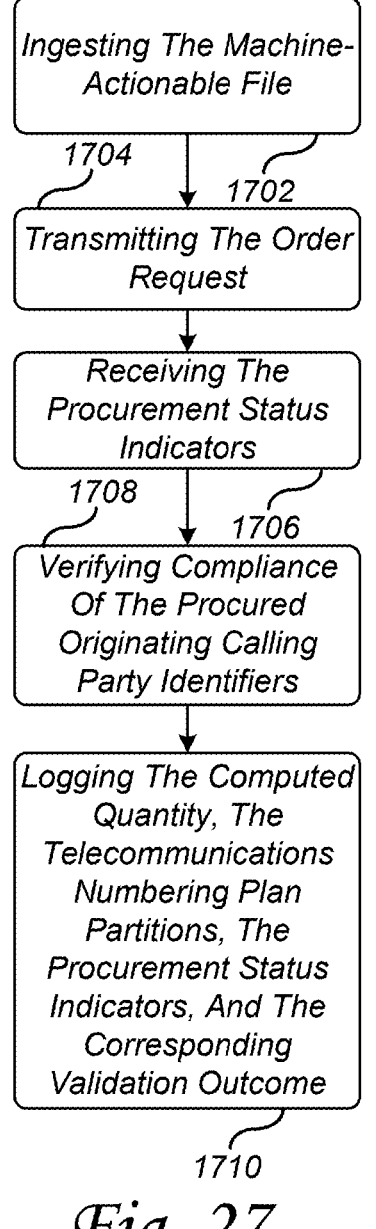

Ingesting The Machine-Actionable File

1704

1702

Transmitting The Order Request

Receiving The Procurement Status Indicators

1708

1706

Verifying Compliance Of The Procured Originating Calling Party Identifiers

Logging The Computed Quantity, The Telecommunications Numbering Plan Partitions, The Procurement Status Indicators, And The Corresponding Validation Outcome

The Telecommunications Numbering Plan Partitions Comprise At Least One Of: A Numbering Plan Area (NPA), A Numbering Plan Area-Exchange Block (NPA-NXX),An Internet Protocol (IP) Address Or IP Address Block, A Uniform Resource Locator (URL)-Based Identifier Grouping, Or Another Telecommunications-Defined Partition For Routing Or Service Allocation

SYSTEMS AND METHODS FOR ALLOCATING ORIGINATING CALLING PARTY IDENTIFIERS ACROSS TELECOMMUNICATIONS SERVICE BOUNDARIES

CROSS-REFERENCE TO RELATED APPLICATIONS

This application contains subject matter that is related to the subject matter of the following co-pending applications. The below-listed applications are hereby incorporated herein by reference in their entirety:

This is a U.S. non-provisional application that is a continuation in part of a U.S. non-provisional application Ser. No. 19/054,244, inventor David Alan King et al., entitled "MANAGING BRAND IDENTITY, BRAND SECURITY, AND BRAND REPUTATION ACROSS COMMUNICATION NETWORKS", filed Feb. 14, 2025; and This is a U.S. non-provisional application that claims the benefit of U.S. provisional application, Ser. No. 63/707, 442, inventor David Alan King et al., entitled "SYSTEMS AND METHODS FOR OPTIMIZING CALL CENTER TRAFFIC THROUGH SHAPING AND ROUTE SELECTION", filed Oct. 15, 2024.

TECHNICAL FIELD OF THE INVENTION

This invention relates to telecommunications systems and data-driven originating calling party identifiers management, and particularly to systems and methods for allocating originating calling party identifiers based on call traffic and population data. The invention further relates to the integration of network interfaces, distributed servers, and structured databases that enable identifier classification, mapping, and quantity determination across telecommunications-defined service boundaries. More specifically, the invention encompasses practical implementations that generate machine-actionable files, vector-encoded reports, and automated procurement workflows to improve provisioning efficiency, enforce numbering compliance, and enhance brand identity, security, and reputation management.

BACKGROUND OF THE INVENTION

Before our invention, enterprises and carriers faced significant challenges when working with originating calling party identifiers and related data. Prior approaches often relied on static spreadsheets or rigid carrier reports that were slow to update and difficult to reconcile with current traffic conditions. These methods lacked the flexibility to accommodate rapid changes in call volumes or geographic demand, which led to inefficiencies in number utilization.

Another limitation was the fragmented nature of call record information. Different carriers and service providers maintained their own formats, definitions, and reporting tools, making it difficult for organizations to integrate data across multiple networks. This lack of interoperability increased the time and resources needed to analyze traffic and determine allocation needs.

Brand presentation and caller reputation also suffered. Consumers frequently received calls labeled inconsistently across networks, with legitimate businesses sometimes misclassified as potential spam, nuisance, or telemarketer calls. At the same time, spoofed identifiers could bypass detection, creating reputational and security risks that prior monitoring solutions were ill-equipped to address.

Prior approaches further struggled to scale with emerging technologies. Many were tied to legacy numbering plan partitions such as traditional area codes and exchange blocks, offering limited adaptability to newer forms of routing, IP-based addressing, or web-integrated identifiers. As communication platforms diversified, older systems proved increasingly inadequate to manage identifiers across heterogeneous environments.

Auditing and compliance processes in prior approaches were also constrained. Validation was often performed after the fact, lacking mechanisms for real-time monitoring or tamper-evident reconciliation. This created uncertainty during regulatory reviews and limited the ability to ensure accuracy and accountability in number allocation practices.

The present invention addresses these and other shortcomings by providing a comprehensive system and method that enables reliable management of originating calling party identifiers, consistent treatment of reputation and branding data across networks, and scalable allocation processes adaptable to both traditional and emerging telecommunications environments. For these reasons and shortcomings, as well as other reasons and shortcomings, there is a long-felt need that gives rise to the present invention.

SUMMARY OF THE INVENTION

The shortcomings of the prior approaches are overcome, and additional advantages are provided through the provision of a system for allocating originating calling party identifiers based on call traffic and population data. The system includes a network interface configured to ingest call records containing originating identifiers, terminating identifiers, timestamps, and call counts. A processor and non-transitory memory implement specialized modules that transform this raw data into structured, actionable outputs.

The classification module distinguishes originating from terminating identifiers by column cardinality analysis, and a recon module generates and persists carrier and destination heatmap data. A mapping module associates identifiers with telecommunications-defined service boundaries, while traffic volume values are computed and combined with population datastore values. Threshold evaluators then identify boundaries that satisfy configurable criteria, enabling targeted allocation decisions.

The numbering plan partition selector retrieves and prioritizes applicable partitions, the quantity calculator computes required identifier counts within bounded ranges, and the report generator outputs a machine-actionable file and vector-encoded heatmap report. At scale, stratified sampling maintains representation across boundaries while reducing processing load. Together, these features deliver technical improvements in provisioning speed, accuracy, and usability.

Additional shortcomings of the prior approaches are overcome, and additional advantages are provided through the provision of a system that allocates originating calling party identifiers using a web-based graphical interface. A web server hosts the interface, which accepts uploads of call record files or recon result files and, upon upload, initiates execution of interconnected processing modules. These modules include a classification module, mapping module, traffic volume module, population datastore, threshold evaluator, numbering plan partition selector, quantity calculator, and report generator, enabling the transformation of uploaded data into structured results.

Caching of service boundary mapping tables in non-transitory memory reduces reliance on repeated external lookups, thereby lowering latency and improving processing efficiency. The graphical interface further renders interactive vector-encoded heatmaps that preserve label clarity across multiple zoom levels while maintaining efficient memory use.

The system also ensures downstream compatibility by splitting processing outputs into files within manageable row and size thresholds. Collectively, these features improve speed, usability, and reliability, offering technical benefits beyond manual or less integrated approaches.

Additional shortcomings of the prior approaches are overcome, and additional advantages are provided through the provision of a system that automates the procurement and validation of originating calling party identifiers. An automation client transmits order requests to a number-procurement service, each request including computed quantities of identifiers and associated numbering plan partitions obtained from a machine-actionable file. A verification module then receives procurement status indicators and validates compliance with designated numbering plan partitions, while an audit logger persists quantities, partitions, procurement statuses, and validation outcomes in a tamper-evident record.

Execution of the automation client, verification module, and audit logger enables fully automated ordering workflows that enforce compliance and reduce provisioning latency relative to manual approaches. The system further incorporates remediation actions when mismatches are detected, including cancellation, substitution with equivalent partitions, or operator alerts. Collectively, these capabilities provide a trusted and efficient framework for identifier acquisition and compliance assurance across telecommunications-defined service boundaries.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 8 illustrates one example of a carrier heatmap;

FIG. 9 illustrates one example of a carrier percentage distribution chart;

FIG. 10 illustrates one example of a destination heatmap;

FIG. 12 illustrates one example of a LPOP report;

FIGS. 13-15 illustrate examples of managing a brand identity, brand security, and brand reputation system, method, and network;

FIGS. 19A-19B illustrates one example of a database structure for the systems and methods of the present invention;

FIGS. 20-22 illustrates examples of allocating telecommunication numbers based on call traffic and population data;

FIGS. 23-24 illustrates exemplary embodiments that can be used interchangeably with the systems and methods of the present invention;

FIGS. 25-27 illustrates examples of methods of allocating telecommunication numbers based on call traffic and population data; and FIG. 28 illustrates exemplary embodiments that can be used interchangeably with the systems and methods of the present invention.

Figure 1:
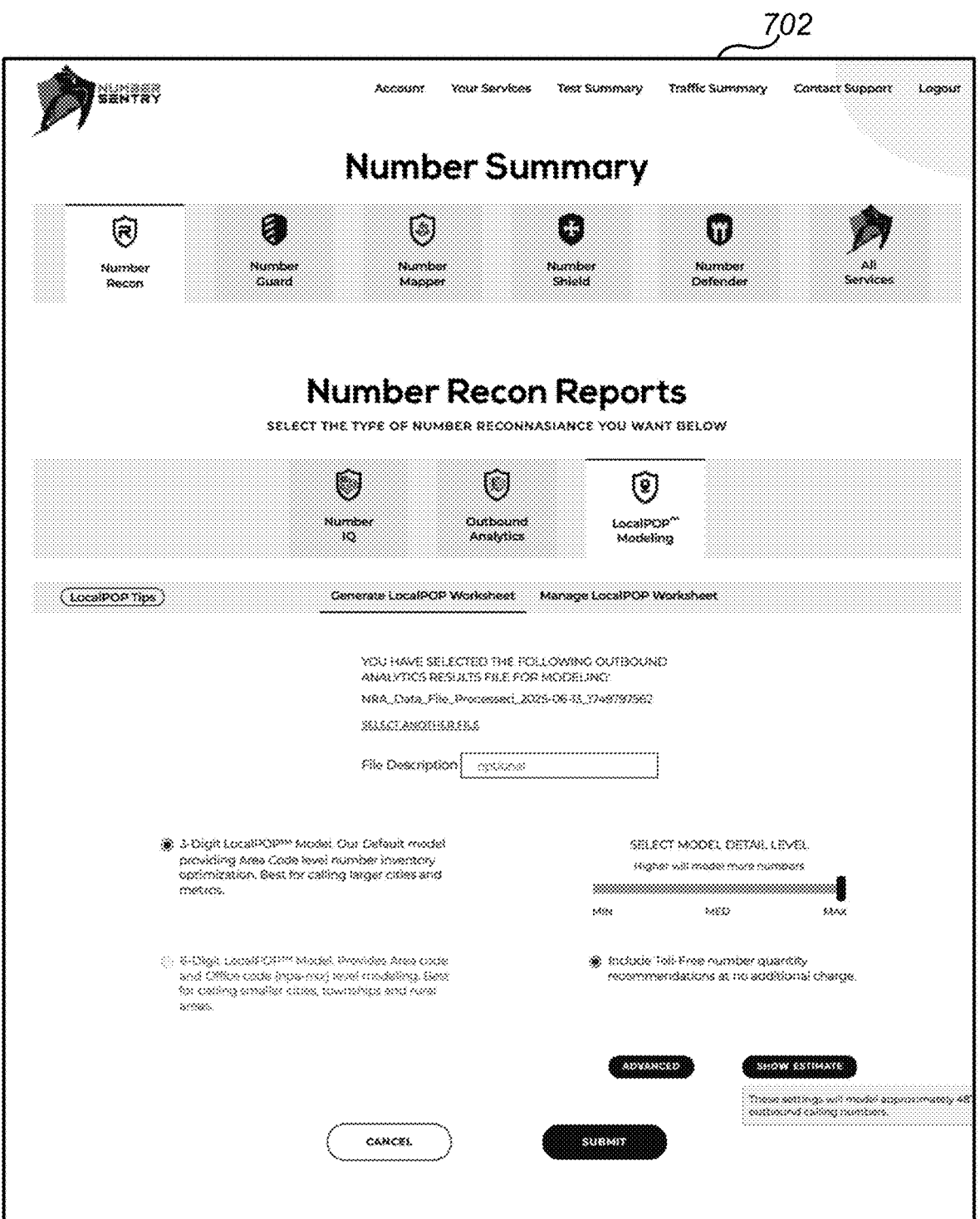
FIG. 1 illustrates one example of a user interface to upload call record files and initiate a number recon report.

The detailed description explains the preferred embodiments of the invention, together with advantages and features, by way of example, with reference to the drawings.

DETAILED DESCRIPTION OF THE INVENTION

The present invention relates to telecommunications analytics, network data processing, and automated originating calling party identifiers resource allocation. More specifically, the invention provides systems and methods that enable enterprises, call centers, and service providers to establish and maintain an efficient, trusted, and geographically optimized calling presence by integrating brand identity management, call traffic analysis, and automated number provisioning into a unified platform.

In today's telecommunications environment, organizations are increasingly judged not only by the content of their calls but by the perception of the identifiers that appear on consumer devices. Call recipients are far less likely to answer calls labeled as "spam," "fraud," or "scam likely," even where such labeling may be inaccurate. Branding inconsistencies, improper assignment of business names, or arbitrary designations applied by carrier networks erode consumer trust and materially reduce connection rates. The lack of transparency in how originating calling party identifiers are displayed creates an environment where legitimate enterprises suffer reputational harm despite compliance with industry standards.

Alongside these reputation concerns, businesses face the parallel challenge of efficiently allocating Direct Inward Dialing (DID) numbers and other identifiers that establish a local presence in the markets they serve. Historically, this process has been carried out manually or through simplistic distribution strategies that assign numbers broadly across geographic regions without regard to measurable call demand or population density. Such approaches frequently result in inefficient allocation, where excess resources are devoted to low-traffic areas while high-volume or high-population regions remain underserved. These mismatches lead to wasted capital, suboptimal outreach performance, and reduced return on investment in outbound calling campaigns.

Existing solutions have failed to adequately address these dual challenges. Manual methods are slow, error-prone, and cannot scale to meet the demands of enterprises that generate millions of outbound calls. Geographic-only strategies ignore the reality that not all regions or carriers contribute equally to business objectives. Even where analytics are applied, outputs are often static reports that lack direct integration with procurement processes, forcing human intervention and reformatting before numbers can be ordered from suppliers. This disconnection between analysis and execution further increases provisioning latency and undermines operational efficiency.

The present invention addresses these shortcomings by unifying reputation monitoring and local presence optimization in a data-driven, automated platform. The system ingests raw call records comprising originating identifiers, terminating identifiers, timestamps, and call counts. Through automated classification techniques such as column cardinality analysis, the system accurately distinguishes originating and terminating identifiers without manual pre-processing. These records are processed through a recon module that generates carrier and geographic heatmaps, persisting visual and quantitative data that represent actual call distribution across networks, states, and carriers.

The system further incorporates a mapping module that associates terminating identifiers with defined telecommunications boundaries, including regulatory partitions, numbering plan areas (NPAs), Local Access and Transport Areas (LATAs), jurisdictional boundaries, and interconnection regions. For each boundary, traffic volume is calculated from the call records, and population values are retrieved from integrated demographic datasets. A threshold evaluator applies configurable criteria—such as traffic minimums, population minimums, subscriber counts, or consumer demand indicators—to identify which boundaries merit further analysis.

For each selected boundary, a numbering plan partition selector retrieves and ranks candidate partitions, such as NPAs or NPA-NXX blocks, using deterministic rules to resolve ties and establish priority. A quantity calculator applies a weighted formula that combines traffic metrics and population values, scaling results to a predefined range while enforcing upper and lower bounds. The result is a precise, data-backed recommendation for how many identifiers should be acquired in each geographic and regulatory region.

These outputs are delivered in dual formats. First, they are rendered as interactive, vector-encoded heatmaps and charts that preserve clarity across zoom levels and allow user interaction within a graphical interface. Second, they are compiled into structured, machine-actionable files that can be directly ingested by automated procurement clients. This direct compatibility eliminates the need for manual reformatting, accelerates provisioning cycles, and reduces human error. The automation client transmits order requests to originating calling party identifier suppliers, verifies compliance of received identifiers with the partitions designated, and persists audit logs that include cryptographic hashes to ensure tamper-evident reconciliation.

By integrating these processes, the present invention offers a technical solution to longstanding operational and reputational problems. Enterprises are able to dynamically acquire identifiers that both enhance connection rates and maintain brand integrity. Carrier and population data are harnessed to ensure numbers are allocated where they will be most effective, reducing wasted capacity and improving alignment with actual demand. Automated workflows replace manual bottlenecks, achieving lower latency and improved scalability.

Through these combined improvements, the invention provides not only a more efficient mechanism for allocating telecommunications resources but also a framework that preserves brand reputation, enhances customer trust, and optimizes business outcomes in a highly regulated and performance-sensitive environment.

In the present invention, the term "calling party reputation data" or "brand identity" is intended to mean data that comprises a type or kind of identity, a business or governmental-related activity, an organization, a person, the intention or reason for the call, a brand or caller logo, an emblem, photograph, likeness, icon, or other descriptors associated with the calling party. Such data can also include network-applied labels such as "SPAM LIKELY," "FRAUD RISK," or similar indicators. Examples include, but are not limited to, business names (e.g., "ACME"), activity labels (e.g., "LAWN SERVICE"), or other suitable identifiers presented to a consumer.

In the present invention, the term "originating calling party identifier" is intended to mean a phone number or other suitable identifier used by an originating calling party to initiate a communication.

In the present invention, the term "communications network" is intended to mean telecommunication companies and networks, including but not limited to AT&T, T-Mobile, Verizon, GSM-based networks, CDMA-based networks, 3G, 4G, and 5G networks, and other similar types of telecommunications networks and their network elements.

In the present invention, the term "software control messages" is intended to mean messages such as Application Programming Interface (API) commands, webhooks, signaling messages, Integrated Development Environment (IDE) control messages, orchestration control messages, and other similar types of software control instructions that enable interaction between systems, automate workflows, and support communication across software components.

In the present invention, the term "receiving called party identifier" is intended to mean the identifier of a computing device configured to receive a communication, such as a phone number or other suitable identifier associated with that device.

In the present invention, the term "machine-actionable file" is intended to mean a structured electronic file formatted for direct ingestion by automated systems without requiring manual reformatting. Such a file can include structured data in formats such as CSV, JSON, XML, or other standardized schema suitable for interoperability with telecommunications provisioning systems.

In the present invention, the term "telecommunications-defined service boundary" is intended to mean a partition or boundary used in telecommunications for regulatory, operational, or commercial purposes. Examples include, but are not limited to, a regulatory partition, industry-defined routing partition, numbering plan area, billing boundary, interconnection boundary, jurisdictional rating boundary, or compliance boundary.

In the present invention, the term "heatmap" is intended to mean a visual or data-driven representation that uses color intensity or similar encoding to display the distribution, concentration, or volume of calls, identifiers, or carrier activity across geographic regions, telecommunications service boundaries, or other defined partitions.

In the present invention, the term "vector-encoded heatmap report" is intended to mean a heatmap that is stored and rendered using vector-based encoding such as scalable vector graphics (SVG), portable document format (PDF), or other vector standards, thereby preserving label legibility, accuracy, and usability at multiple zoom levels while reducing memory utilization.

In the present invention, the term "automation client" is intended to mean a software-controlled module or system configured to transmit provisioning requests to an external number-procurement service, including the ability to manage tokens, rate limits, retries, and acknowledgments in an automated manner without manual intervention.

In the present invention, the term "classification module" is intended to mean a data processing component configured to analyze a plurality of call records and distinguish terminating calling party identifiers from originating calling party identifiers by applying column cardinality analysis or equivalent statistical methods.

In the present invention, the term "verification module" is intended to mean a subsystem configured to receive procurement status indicators and validate that procured originating calling party identifiers correspond to the designated numbering plan partitions, including the ability to detect mismatches and trigger remediation actions.

In the present invention, the term "mapping module" is intended to mean a processing component configured to associate terminating calling party identifiers with one or more telecommunications-defined service boundaries, including regulatory, industry, billing, interconnection, or jurisdictional rating boundaries.

In the present invention, the term "audit logger" is intended to mean a subsystem that persistently records procurement activity, validation outcomes, or other operational data in a tamper-evident manner, optionally including cryptographic hashing or reconciliation mechanisms to ensure compliance, traceability, and security.

In the present invention, the term "numbering plan partition" is intended to mean a subdivision of telecommunication identifiers used for routing or service allocation, including numbering plan area (NPA), numbering plan area-exchange block (NPA-NXX), Internet Protocol (IP) address or IP block, Uniform Resource Locator (URL)-based groupings, or other industry-defined identifier partitions.

In the present invention, the term "quantity calculator" is intended to mean a module configured to compute required or recommended quantities of identifiers based on weighted combinations of traffic volume, population, or other service demand indicators, with scaling, rounding, and enforcement of minimum and maximum bounds.

In the present invention, the term "threshold evaluator" is intended to mean a module that applies configurable thresholds for traffic volume, population, subscriber counts, or other indicators to identify service boundaries meeting or exceeding criteria stored in memory.

In the present invention, the term "recon module" is intended to mean a processing component configured to generate and persist carrier heatmap data and destination heatmap data derived from call records, enabling visualization and analysis of call traffic patterns across telecommunications-defined service boundaries.

In the present invention, the term "graphical user interface (GUI)" is intended to mean a web-based or software-based interface hosted on a server that enables users to upload files, configure analysis, view interactive vector-encoded heatmaps, monitor the progress of modules, and download reports.

In the present invention, the term "stratified sampling policy" is intended to mean a statistical sampling technique defined with respect to telecommunications-defined service boundaries, in which per-boundary sample sizes are proportionally allocated, supplemented with residual pooling, and applied to reduce processing load while maintaining representation and accuracy.

In the present invention, the term "cryptographic hash" is intended to mean a one-way algorithmic transformation of order and confirmation payloads used to create tamper-evident records for reconciliation and verification purposes.

In the present invention, the term "idempotency token" is intended to mean a unique identifier attached to an automated order request to prevent duplicate processing and ensure consistency in transaction handling.

In the present invention, the term "rate-limited backoff" is intended to mean a transmission control mechanism that spaces automated order requests or retries over time to prevent overloading of a number-procurement service or network resource.

In the present invention, the term "reconciliation log" is intended to mean a structured record correlating originating calling party identifiers with procurement confirmations, including tolerance thresholds for detecting and flagging mismatches for operator review.

Turning now to the drawings in greater detail, it will be seen that in FIG. 1, there is illustrated an exemplary embodiment of a user interface 702 configured to receive an upload of one or more call record files and initiate execution of a number recon report. In an exemplary embodiment, the user interface 702 can be implemented as part of a web-based portal, a cloud-hosted service, or a dedicated enterprise application. The user interface 702 can provide authentication controls to ensure secure access, upload fields for selecting large call record datasets, and execution controls to initiate a structured analytics sequence.

The uploaded call record files can include, without limitation, data entries containing an originating calling party identifier, a terminating calling party identifier, an associated call timestamp, and a call count. Upon initiation from the user interface 702, the uploaded files can be parsed by a classification module that distinguishes originating identifiers from terminating identifiers using a column cardinality analysis. In this embodiment, a column exhibiting fewer unique entries can be classified as containing originating identifiers, while a column with a greater diversity of entries can be classified as containing terminating identifiers.

Once classified, the data can be processed through a recon module triggered by the user interface 702. The recon module can generate carrier heatmap data and destination heatmap data, persist these results in a datastore, and feed the outcomes into downstream mapping and threshold evaluation stages. The mapping module can associate terminating identifiers with defined telecommunications service boundaries, such as numbering plan areas (NPAs), Local Access and Transport Areas (LATAs), jurisdictional or billing boundaries, and regulatory partitions. By persisting these outputs, the recon process creates a continuous dataset that supports both visualization and automated decision-making.

The user interface 702 can also provide execution controls that connect the upload process to a threshold evaluator, which applies configurable limits such as minimum traffic volumes, population thresholds, wireless subscriber counts, or consumer demand indicators. These thresholds can be dynamically updated from the non-transitory memory, enabling the system to adapt to evolving regulatory or business requirements without requiring re-coding or manual intervention. Unlike prior approaches that required static configuration and produced rigid reports, the present invention enables dynamic filtering and adaptive decision-making directly from uploaded data.

Upon completion of the threshold evaluation, the user interface 702 can trigger execution of a numbering plan partition selector that retrieves candidate numbering plan partitions applicable to each identified boundary, sorts the partitions according to weighted criteria, and resolves tie conditions using stored deterministic rules. The partition selector outputs a ranked set of telecommunications numbering partitions that can be combined with a quantity calculator to determine a required number of identifiers for each boundary. The quantity calculator applies weighting factors across selection criteria, scales results to a predetermined range, and enforces minimum and maximum bounds. By enforcing these bounds, the system prevents under-provisioning in high-demand areas and wasteful over-provisioning in low-demand areas.

In another embodiment, when the uploaded call records exceed a dataset threshold, the interface 702 can initiate execution of a stratified sampling policy. The sampling policy can compute a base sample size using a binomial proportion formula, allocate per-boundary sample counts proportionally to observed shares, and apply a boost to boundaries proximate to cutoff thresholds. A pooled residual sample can also be maintained for regions that do not meet threshold criteria, ensuring representation across all service boundaries. These steps reduce processing time and memory utilization while maintaining a target error margin at the decision cutoff. This improvement provides a concrete technical advantage, particularly in large-scale enterprise contexts where millions of call records must be processed within operationally acceptable timeframes.

The user interface 702 can further provide download controls for outputting results. The report generator can produce structured, machine-actionable files as well as vector-encoded heatmaps. The structured files can include, for each service boundary, the required identifier quantity, associated population and traffic data, and the selected numbering plan partitions. The structured outputs can be formatted for direct ingestion by an automation client configured to transmit procurement orders to telecommunications number suppliers. By generating outputs in a structured, compliant format, the invention eliminates manual reformatting and reduces end-to-end provisioning latency, producing measurable technical benefits over prior approaches that relied on human operators to copy results into procurement systems.

The vector-encoded heatmaps generated through the same process can be rendered within the user interface 702 at multiple zoom levels without loss of label clarity. This feature enables operators to interactively visualize call distribution, carrier concentration, and DID allocation strategies without encountering the memory bottlenecks or graphical distortion common in raster-based mapping. By combining analytic outputs with interactive rendering, the user interface 702 provides both machine-actionable and human-readable results that reinforce each other, enabling better decision-making and improved auditability.

Accordingly, the user interface 702 provides more than a simple upload and display tool. It is an integrated gateway to an analytics engine that automates classification, mapping, threshold evaluation, partition selection, sampling, and reporting. The combination of these functions produces a concrete technical improvement: reduction of human error, faster execution of analytics at scale, direct integration with procurement automation, and enhanced visualization through vector encoding. These features collectively enable the system to overcome limitations of prior approaches that required multiple separate platforms, static reporting, and manual number provisioning.

Figure 2:
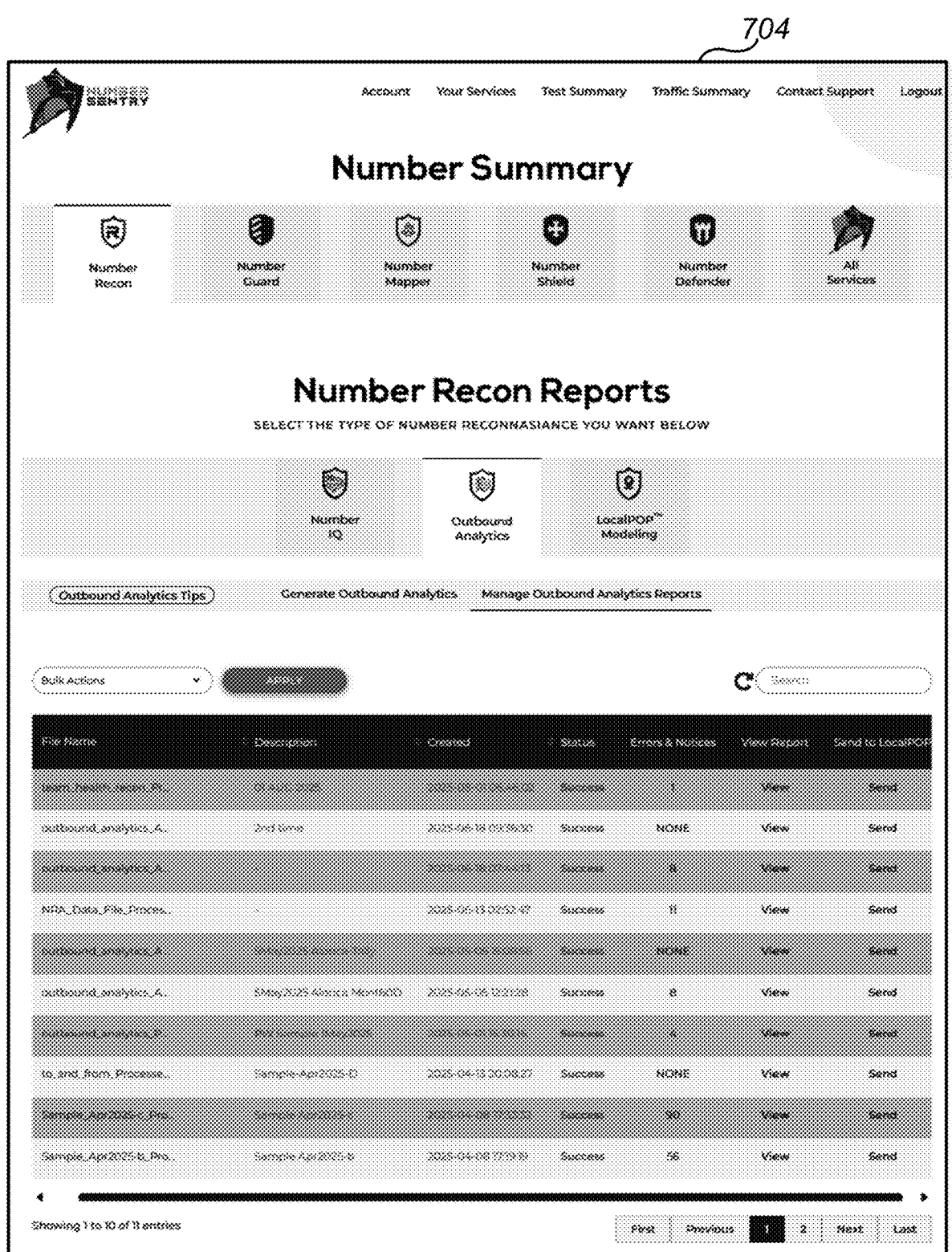
FIG. 2 illustrates one example of a number recon report.

Referring to FIG. 2, there is illustrated an exemplary embodiment of a number recon report 704 generated by the system following ingestion of call record files through the user interface 702 of FIG. 1. In an exemplary embodiment, the number recon report 704 can be automatically produced by a recon module that processes a plurality of call records, each record comprising at least an originating calling party identifier, a terminating calling party identifier, a timestamp, and an associated call count. The recon module can apply classification logic that distinguishes between originating and terminating identifiers by column cardinality analysis and can persist both carrier heatmap data and destination heatmap data that are then displayed within the report 704.

The number recon report 704 can present these outputs in a structured manner, combining tabular and graphical elements that represent how calls are distributed across carriers, states, and other telecommunications-defined service boundaries. Unlike prior approaches, which often required exporting raw data into external spreadsheets or static reporting systems, the recon report 704 can be generated automatically within the analytics pipeline and maintained in synchronization with downstream mapping, threshold evaluation, and identifier allocation modules. This ensures consistency between the data displayed to the operator and the structured files produced for automated procurement, reducing error and eliminating redundant human reformatting.

In some embodiments, the recon report 704 can also highlight which service boundaries satisfy configurable thresholds, such as a minimum traffic volume, population level, or subscriber count. Surfacing these threshold results directly in the report provides an operational checkpoint that allows an operator to confirm that the analytics pipeline is applying the correct business or regulatory criteria.

The number recon report 704 can be rendered in a vector-encoded format, which preserves label clarity across zoom levels and minimizes memory consumption when handling large datasets. This approach allows operators to interact with heatmaps and charts even when millions of records are involved, providing both improved usability and system efficiency. In some embodiments, metadata such as population values or carrier assignments can be embedded directly into vector objects, allowing the report itself to function as both a visual and a machine-actionable representation of the analytics.

Another advantage of the recon report 704 is its ability to serve as a persistent audit record. The system can store cryptographic hashes or other validation data associated with the generated report, ensuring that the contents of the report can later be reconciled with procurement orders placed through the automation client. This linkage between analytic reporting and order execution improves transparency, reduces the possibility of tampering, and ensures that identifier acquisition decisions can be validated retrospectively.

The recon report 704, therefore, represents more than a simple display of information. It reflects a series of technical operations—including automated classification of identifiers, threshold evaluation, stratified sampling where datasets exceed defined limits, and mapping to telecommunications boundaries—that collectively transform raw call records into structured, actionable insight. By embedding these operations within the report generation process, the invention produces a technically improved outcome: reduced latency from ingestion to actionable results, increased reliability of outputs across both visual and machine-actionable formats, and direct compatibility with automated procurement workflows. These advantages distinguish the invention from prior approaches that relied on disconnected reporting systems, static images, and manual reconciliation.

Figure 3:
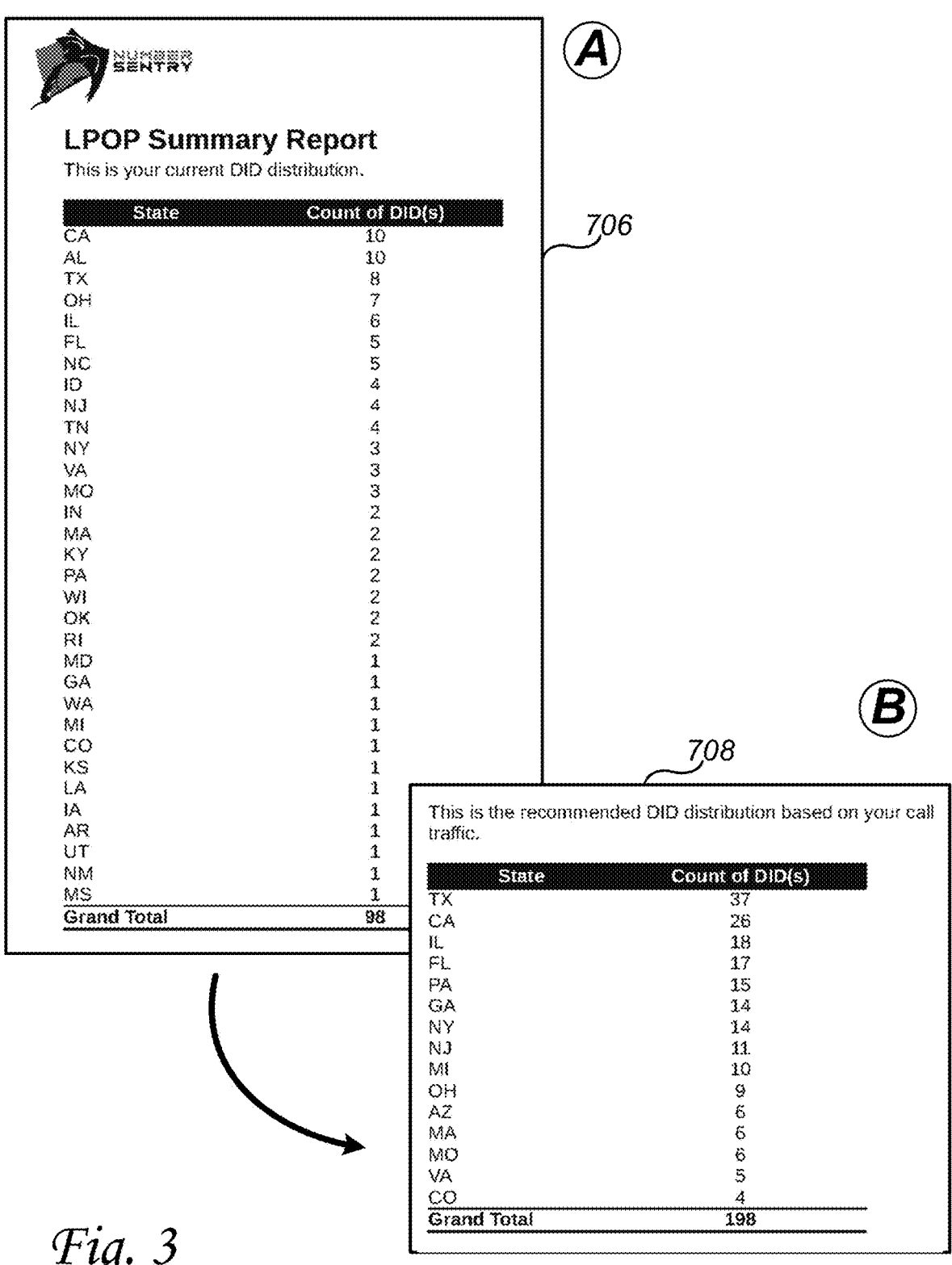
FIG. 3 illustrates one example of a local POP summary report.

Referring to FIG. 3, there is illustrated an exemplary embodiment of a local POP summary report. In an exemplary embodiment, the local POP summary report can present side-by-side views of a current DID distribution 706 (reference A) and a recommended DID distribution 708 (reference B). The current DID distribution 706 can represent the existing allocation of originating calling party identifiers across geographic or regulatory service boundaries, as derived from uploaded call records and any previously provisioned numbers. The recommended DID distribution 708 can represent a recalculated allocation based on the analytics performed by the system, including traffic volume computations, population weighting, and threshold evaluation.

In operation, the current DID distribution 706 can highlight imbalances in existing number allocations. For example, identifiers may be concentrated in regions with relatively low call traffic or sparse population density, resulting in wasted resources, while high-demand areas may lack sufficient coverage. Prior approaches often relied on static geographic assignment strategies or operator intuition, which produced such inefficiencies. By contrast, the recommended DID distribution 708 generated by the present invention can provide a data-backed realignment of identifiers to better match actual demand. This alignment is accomplished through the quantity calculator, which computes the required number of identifiers for each boundary as a weighted combination of call traffic and population metrics, scaled within defined upper and lower limits.

The local POP summary report can therefore demonstrate the corrective action proposed by the system: moving identifiers away from over-provisioned regions and reallocating them toward areas where the analytics show greater demand. Because the recommended DID distribution 708 is derived from structured computations—rather than manual judgment—it provides consistency, scalability, and auditability that were not achievable with prior approaches.

In some embodiments, the local POP summary report can also embed interactive elements that allow an operator to explore the differences between the current DID distribution 706 and the recommended DID distribution 708. For example, hovering over a boundary may reveal the calculated traffic volume, associated population, applied thresholds, and computed identifier quantity. These interactive elements are rendered in a vector-encoded format, ensuring that the report remains responsive and legible across zoom levels, even when applied to nationwide or carrier-wide datasets.

Another technical improvement of the local POP summary report is its compatibility with downstream automation. The recommended DID distribution 708 can be exported as part of a structured machine-actionable file that is suitable for direct ingestion by an automation client. This file can include the identifier quantities, numbering plan partitions, and selection criteria values for each boundary, eliminating the manual reformatting required in prior approaches. The tight coupling between the visual representation 708 and the structured file ensures that what the operator sees is directly aligned with what the system will procure, reducing the risk of inconsistency or error.

By integrating both the current DID distribution 706 and the recommended DID distribution 708 within the same report, the invention provides operators with clear evidence of system improvements and actionable insights that can be acted upon immediately. The dual presentation also supports compliance and audit functions by preserving a record of the baseline allocation alongside the system-generated recommendation. The result is an improved mechanism for optimizing telecommunications identifiers that combines clarity, reliability, and automation readiness, addressing inefficiencies that were prevalent in prior approaches.

Figure 4:
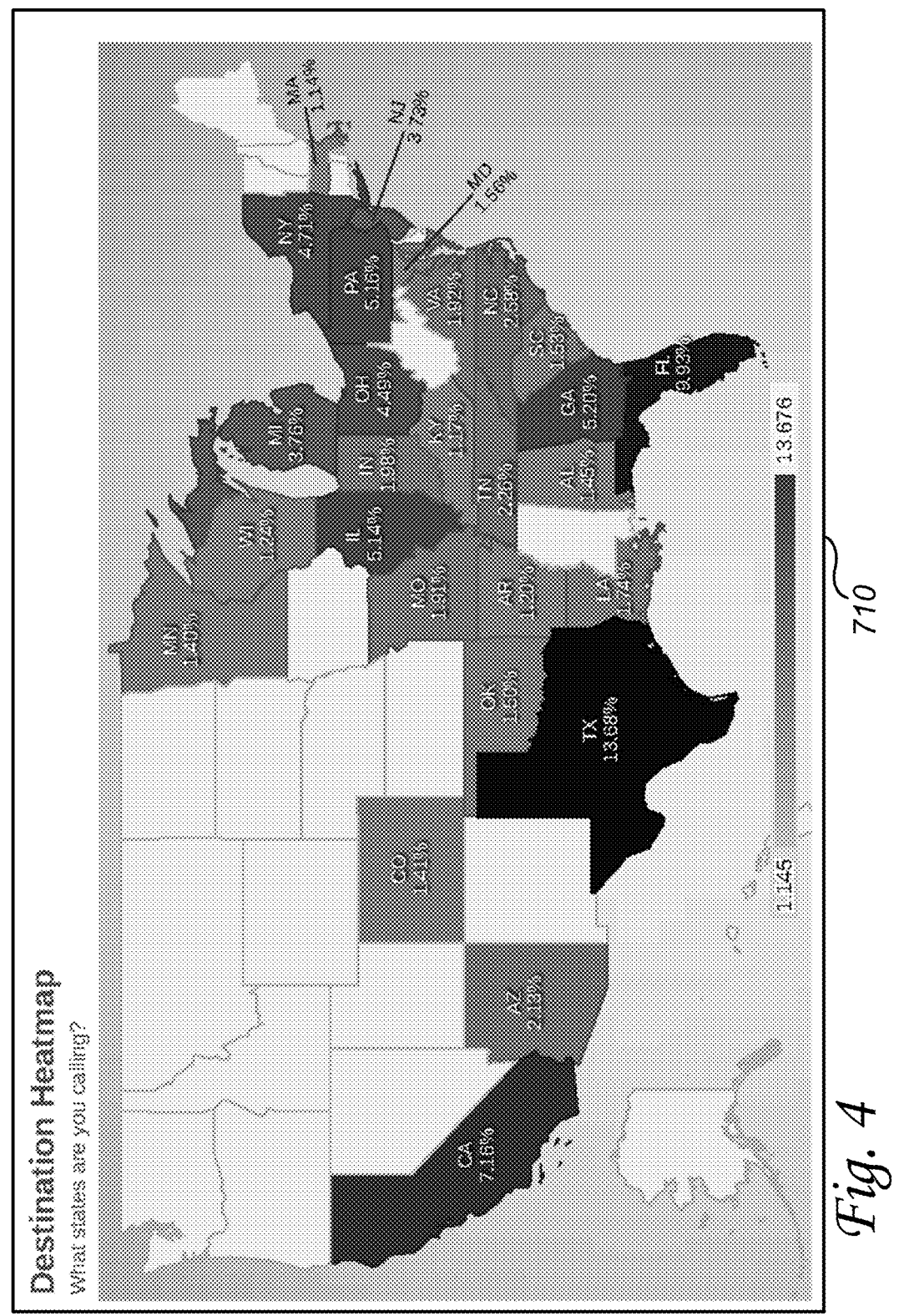
FIG. 4 illustrates one example of destination States that are being called heatmap.

Referring to FIG. 4, there is illustrated an exemplary embodiment of a destination States heatmap 710. In an exemplary embodiment, the destination States heatmap 710 can represent the relative intensity of outbound call traffic terminating in different U.S. states, as derived from the terminating calling party identifiers processed by the recon module. Each state can be shaded or colored according to the magnitude of traffic volume, with higher traffic regions represented by more prominent intensity indicators.

The destination States heatmap 710 can be generated automatically from the plurality of uploaded call records after the classification module distinguishes originating identifiers from terminating identifiers. Once the terminating identifiers are mapped to state-level boundaries, the traffic volume module can compute aggregated call counts for each state. These values can be combined with population data retrieved from a population datastore, enabling the system to determine where calling demand is high relative to consumer density. The resulting data can then be rendered as the heatmap 710, providing operators with a visual confirmation of the geographic distribution of outbound calls.

The present invention can generate the destination States heatmap 710 natively as part of its integrated analytics pipeline. This reduces latency, ensures consistency across all analytics outputs, and eliminates the errors that frequently arise from manual preprocessing or reformatting. The vector-encoded rendering of the heatmap 710 further ensures that the map remains legible at multiple zoom levels, allowing operators to interactively examine both national patterns and localized demand without encountering memory bottlenecks or graphical distortion.

The destination States heatmap 710 can also serve as an input into downstream threshold evaluation. For example, if traffic volume for a given state falls below a configured threshold, that state may not be selected for additional DID allocation in the recommended distribution. Conversely, states with high traffic or high population values can be prioritized by the numbering plan partition selector and the quantity calculator. By embedding threshold logic directly into the same dataset that generates the heatmap 710, the system ensures that the visualization is not merely descriptive but functionally linked to automated identifier allocation decisions.

Another technical benefit of the destination States heatmap 710 is its integration with reporting and compliance functions. The rendered map can be included in a number recon report or LPOP summary report as visual confirmation of the system's computations. In some embodiments, the underlying dataset used to generate the heatmap 710 can be exported in structured form alongside the visual rendering, providing machine-actionable compatibility with procurement automation clients. This dual output ensures that the same underlying computation drives both human-readable visualizations and machine-readable transactions, providing traceability and auditability that prior approaches lacked.

Accordingly, the destination States heatmap 710 provides more than a graphical overlay of call activity. It represents a concrete technical step in the transformation of raw telecommunications records into actionable analytics, enabling both operator understanding and automated execution. The seamless integration of the heatmap 710 into the broader pipeline reduces the reliance on external tools, improves efficiency, and ensures that outbound number allocation aligns with both actual traffic demand and population considerations.

Figure 5:
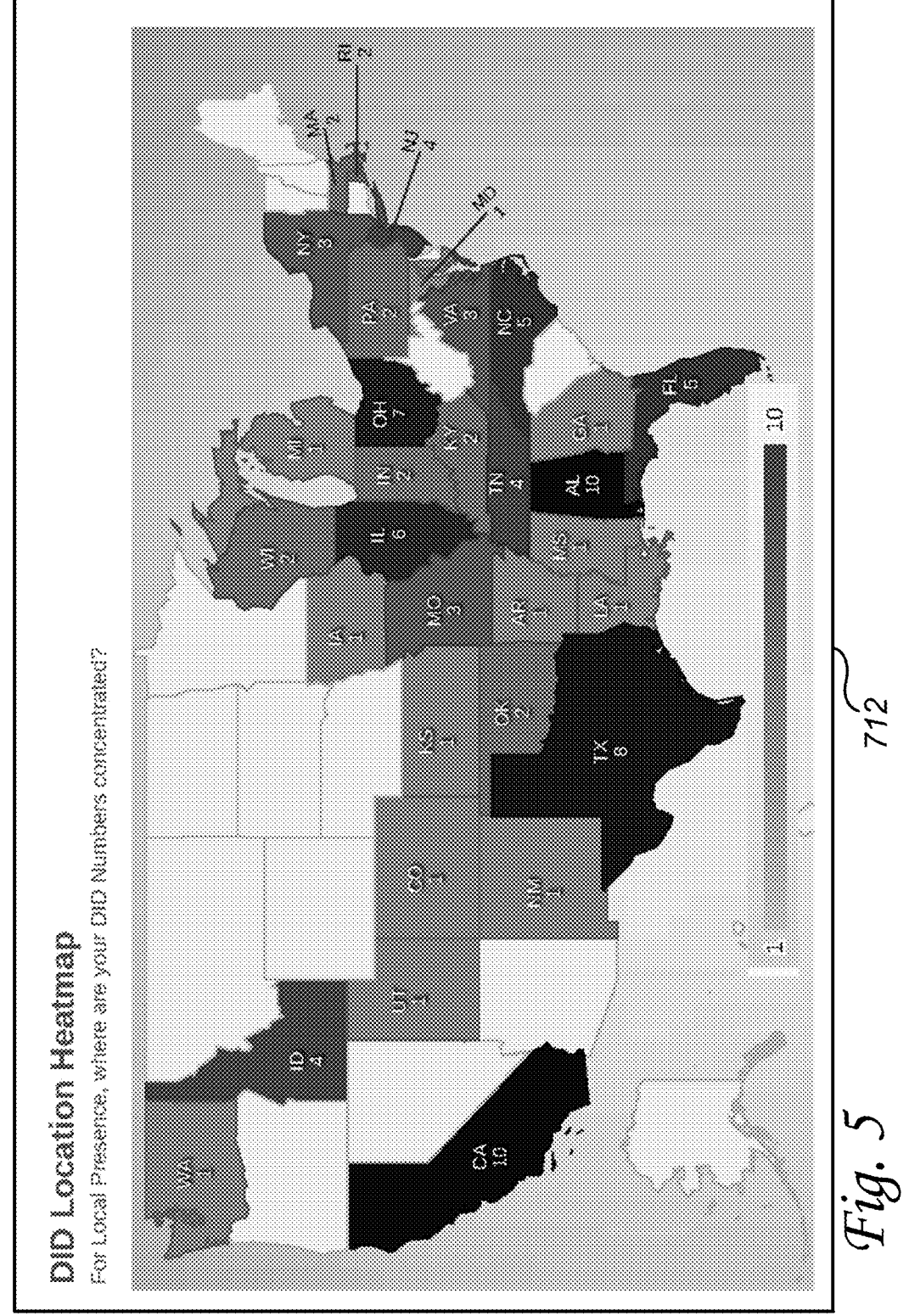
FIG. 5 illustrates one example of DID number concentration location heatmap.

Referring to FIG. 5, there is illustrated an exemplary embodiment of a DID number concentration location heatmap 712. In an exemplary embodiment, the DID number concentration location heatmap 712 can depict the geographic concentration of existing originating calling party identifiers across service boundaries such as numbering plan areas (NPAs) or state-level regions. Each region can be shaded or color-coded to indicate the relative density of identifiers, with areas of high concentration distinguished from those with sparse allocation.

The DID number concentration location heatmap 712 can be generated by analyzing the existing inventory of identifiers available to an enterprise or service provider. The mapping module can associate each identifier with its corresponding geographic or regulatory partition, and the traffic volume module can compute the relative share of identifiers allocated to each boundary. These results can be rendered into the heatmap 712 in a vector-encoded format, ensuring that the visualization remains clear across multiple zoom levels and that metadata, such as identifier counts or associated partitions, can be embedded directly into the graphical objects.

In contrast with prior approaches, where identifier allocation data was often maintained in static spreadsheets or fragmented inventory systems, the present invention integrates allocation visualization directly into the analytics pipeline. The DID number concentration location heatmap 712 thus provides operators with an immediate view of how current resources are distributed relative to demand patterns shown in the destination States heatmap 710. By juxtaposing these datasets, the system enables identification of geographic mismatches—such as over-concentration of identifiers in low-demand areas and under-allocation in high-demand areas—that would not be easily discernible from raw tabular data alone.

The DID number concentration location heatmap 712 also provides technical advantages in automated allocation. Because the visualization is generated from structured data that is persisted within the system, the same underlying dataset can be fed into the quantity calculator and numbering plan partition selector. This ensures that the visualization and the downstream computation remain synchronized, reducing the potential for operator error or inconsistency. In some embodiments, the system can overlay additional data points, such as population values from a population datastore or threshold markers from the threshold evaluator, further enriching the interpretation of identifier concentration.

Another benefit of the DID number concentration location heatmap 712 is its role in compliance and audit functions.

The concentration map can serve as a historical record of identifier allocation at a given point in time, and when stored with cryptographic validation, can provide tamper-evident evidence of how identifiers were distributed before and after reallocation. This capability not only supports operational optimization but also provides the traceability required in regulated telecommunications environments.

The DID number concentration location heatmap 712, therefore, represents a technical improvement over prior approaches that relied on static, disconnected tools. By embedding identifier allocation visualization into the same pipeline that computes traffic demand and population weighting, the invention creates a unified view of both supply and demand. This integration allows enterprises to rebalance their identifier portfolios with greater accuracy, speed, and confidence, while also supporting automated procurement workflows and compliance monitoring.

Figure 6:
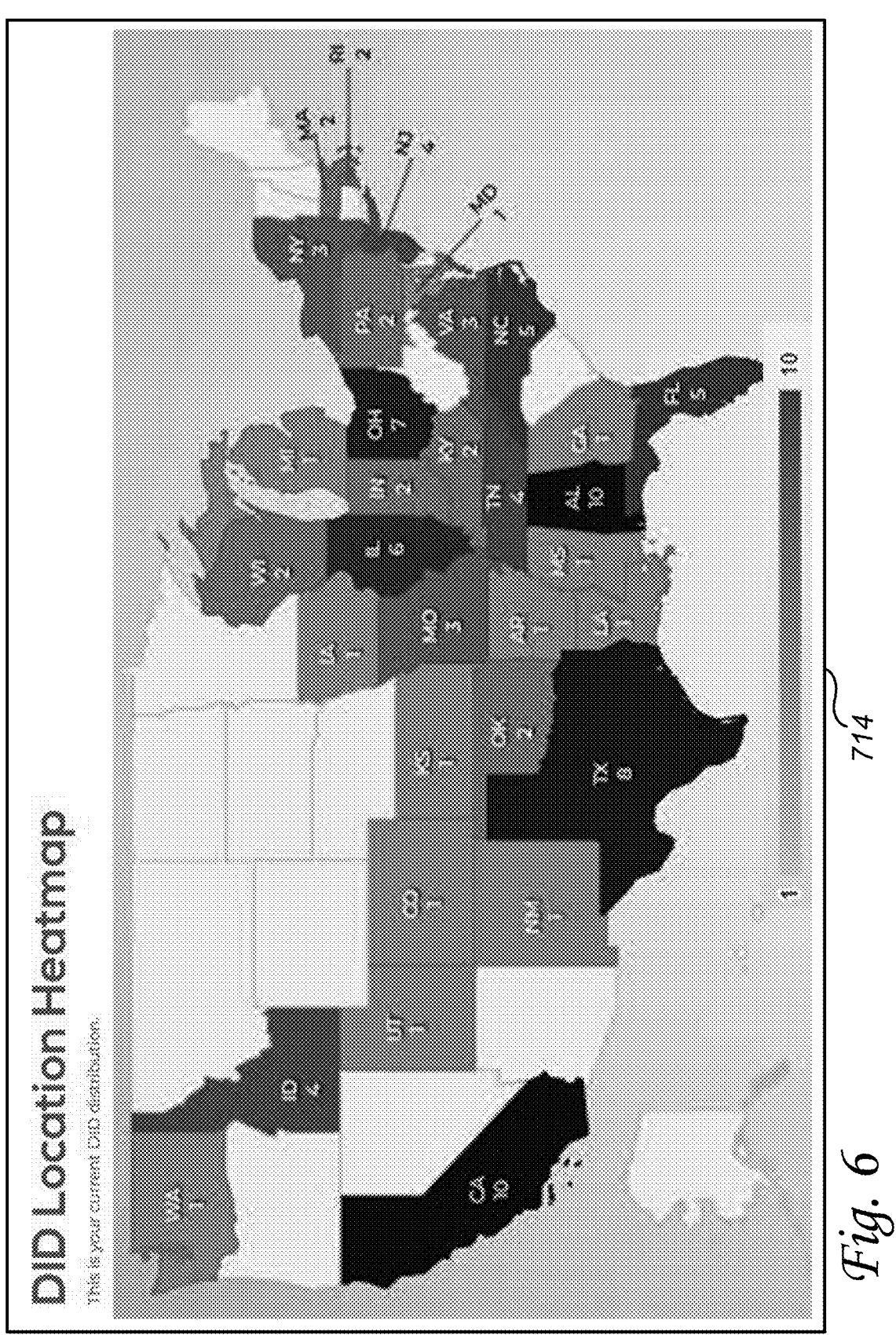
FIG. 6 illustrates one example of a current DID distribution location heatmap.

Referring to FIG. 6, there is illustrated an exemplary embodiment of a current DID distribution location heatmap 714. In an exemplary embodiment, the current DID distribution location heatmap 714 can depict how originating calling party identifiers are presently deployed across geographic regions, such as numbering plan areas (NPAs), state boundaries, or other telecommunications-defined service boundaries. The current DID distribution location heatmap 714 can be derived from inventory data representing the identifiers already provisioned and active within the system, and can be rendered in a vector-encoded format to preserve legibility at multiple zoom levels.

The current DID distribution location heatmap 714 can serve as a baseline for analyzing inefficiencies in identifier allocation. For example, some regions may exhibit disproportionately high allocations of identifiers relative to their outbound call traffic or population demand, while other regions may show limited coverage despite representing significant call destinations. Prior approaches typically required operators to perform manual cross-referencing of inventory databases and traffic reports to identify such imbalances, a process that was error-prone, time-consuming, and not scalable for enterprises managing thousands of identifiers. The present invention automates this analysis and produces a real-time visualization that eliminates reliance on manual reconciliation.

In some embodiments, the current DID distribution location heatmap 714 can be directly compared against traffic demand outputs, such as the destination States heatmap 710 of FIG. 4. This comparison allows the system to highlight regions of over-provisioning or under-provisioning. These insights can be further integrated into the quantity calculator, which determines recommended identifier counts for each service boundary based on traffic volume values, population data, and configurable thresholds. By tying the visualization of the current distribution to the computational logic of the system, the heatmap 714 functions not only as an informational tool but as a technical input into the automated allocation pipeline.

Another advantage of the current DID distribution location heatmap 714 is its role in maintaining transparency and traceability. By persisting snapshots of identifier allocation at different points in time, the system can generate an auditable record that demonstrates how recommendations were developed and how reallocations were justified. When coupled with cryptographic logging, these snapshots can serve as tamper-evident proof of system behavior, which is particularly valuable in regulated telecommunications environments.

Accordingly, the current DID distribution location heatmap 714 provides a visual baseline that anchors the optimization process. It highlights the inefficiencies of existing allocations, demonstrates the technical need for realignment, and establishes a consistent point of comparison for the recommended DID distribution 716 described in FIG. 7. Through this integration, the invention delivers a technical improvement over prior approaches by unifying visualization, computation, and auditability into a single pipeline that ensures both operational efficiency and regulatory compliance.

Figure 7:
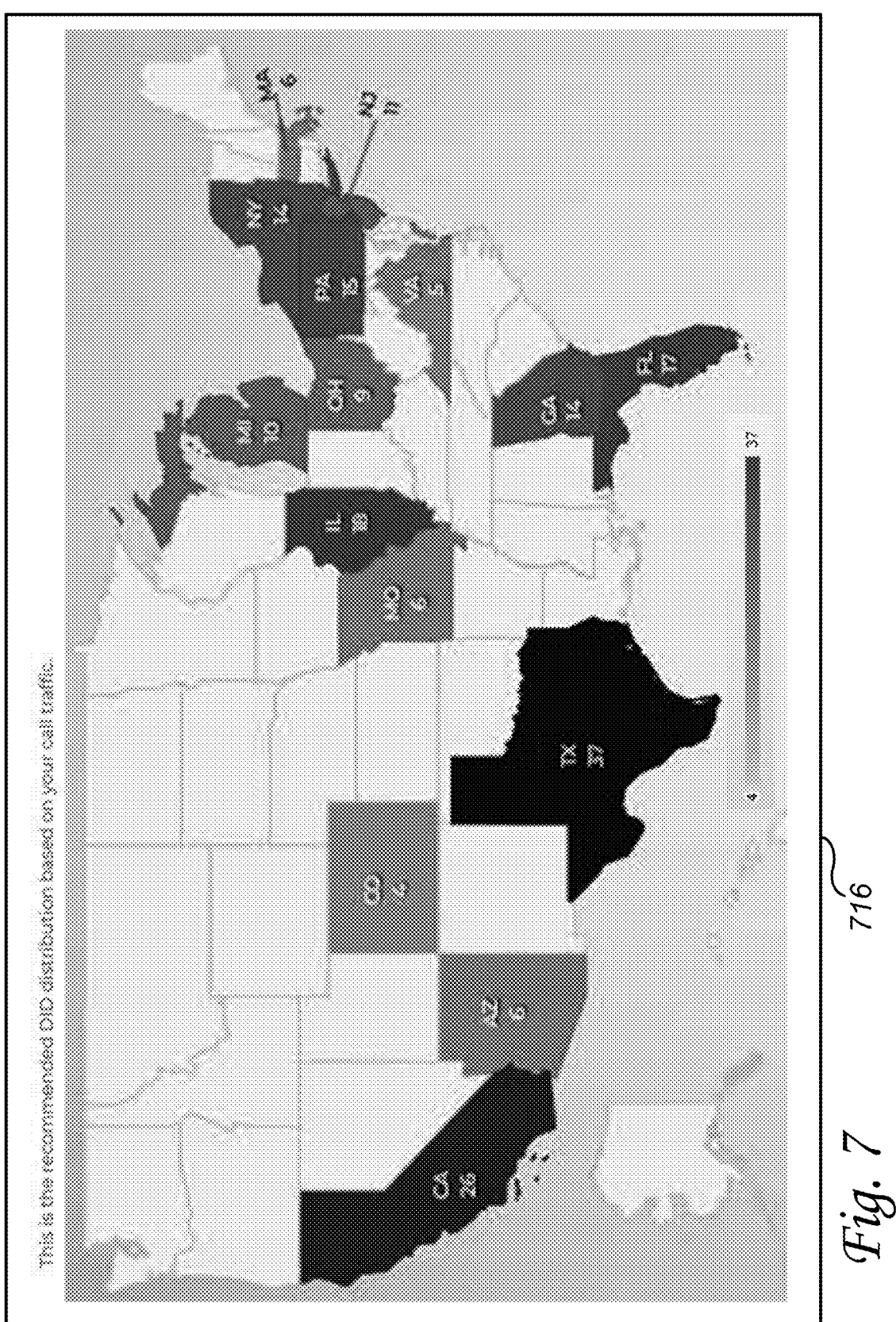
FIG. 7 illustrates one example of recommended DID distribution based on call traffic heatmap.

Referring to FIG. 7, there is illustrated an exemplary embodiment of a recommended DID distribution heatmap 716 generated by the system. In an exemplary embodiment, the recommended DID distribution heatmap 716 can represent a recalculated allocation of originating calling party identifiers across geographic or regulatory service boundaries, determined by applying the analytics pipeline to a plurality of call records and associated population data.

The recommended DID distribution heatmap 716 can be computed by the quantity calculator, which applies a weighted combination of traffic volume, population values, and configurable demand indicators to determine the required number of identifiers for each service boundary. These weighted results can be scaled to a predefined range, rounded to an integer, and constrained by minimum and maximum allocation limits stored in memory. The result is a data-backed quantity of identifiers for each region, rendered as the heatmap 716 to allow operators to visually confirm the recommended distribution.

The recommended DID distribution heatmap 716 provides several technical advantages over prior approaches. In traditional workflows, operators often assigned identifiers manually or according to simple geographic quotas, leading to inefficient allocations and underutilized resources. By contrast, the present invention ties the recommended distribution directly to measurable traffic and demographic data, ensuring that identifiers are allocated where they will have the greatest impact on call connection rates and customer reach. This approach reduces wasted capacity in low-demand regions and increases coverage in high-demand areas, producing a tangible improvement in outbound call performance.

In some embodiments, the recommended DID distribution heatmap 716 can be generated in tandem with a structured, machine-actionable file that lists, for each service boundary, the computed identifier quantity, the selection criteria values, and the telecommunications numbering plan partitions identified by the numbering plan partition selector. This structured file can be directly ingested by an automation client to procure identifiers from number suppliers, eliminating manual reformatting steps. By synchronizing the human-readable heatmap 716 with the machine-actionable procurement file, the system ensures consistency across visualization and execution, reducing errors and provisioning latency.

The recommended DID distribution heatmap 716 can also incorporate results of threshold evaluation. For example, service boundaries that fail to meet a traffic volume or population threshold can be excluded from the recommended allocation, while boundaries close to a cutoff may be included based on a borderline boost policy. These configurable rules allow the system to adapt to different operational strategies while maintaining consistent, auditable decision criteria.

Another technical feature of the recommended DID distribution heatmap 716 is its use of vector-encoded rendering, which preserves clarity across zoom levels and allows large datasets to be navigated interactively without excessive memory consumption. Metadata such as population values, traffic share, and identifier quantities can be embedded directly into vector objects, allowing the heatmap 716 to function as both a visual report and a machine-actionable data layer. This dual purpose further differentiates the invention by integrating visualization and computation into a single artifact.

From an operational standpoint, the recommended DID distribution heatmap 716 provides a clear comparison against the current DID distribution 714 of FIG. 6, highlighting the improvements achieved by the system's analytics. By capturing both the baseline and the optimized state, the invention creates a transparent pathway for demonstrating the impact of its optimization, supporting both business decision-making and regulatory compliance.

Accordingly, the recommended DID distribution heatmap 716 embodies the core improvement of the present invention: transforming raw call records and population data into actionable identifier allocation recommendations that are simultaneously human-readable, machine-actionable, and automation-ready. This integration provides technical improvements in efficiency, scalability, accuracy, and trustworthiness, addressing longstanding shortcomings of prior approaches.

Referring to FIG. 8, there is illustrated an exemplary embodiment of a carrier heatmap 718 generated by the recon module. In an exemplary embodiment, the carrier heatmap 718 can represent the relative distribution of outbound call traffic across multiple telecommunications carriers, based on the terminating identifiers extracted from the uploaded call records. Each carrier can be assigned a proportional representation, with shading or intensity values indicating the share of call traffic routed through that carrier.

The carrier heatmap 718 can be produced automatically after the classification module distinguishes terminating identifiers from originating identifiers, and the recon module generates carrier-level aggregates. The traffic volume module can compute the total call counts per carrier, and these results can be stored in a datastore and visualized as the carrier heatmap 718. This visualization allows operators to quickly determine which carriers are handling the largest shares of traffic, and to identify imbalances or anomalies that may warrant reallocation of identifiers or adjustments to routing strategies.

Unlike prior approaches, which typically required external carrier reports or static spreadsheets, the present invention generates the carrier heatmap 718 natively within the same analytics platform that computes geographic and population-based allocations. This integration ensures that carrier-level insights are synchronized with other metrics, such as destination state traffic and DID distributions. For example, if a single carrier exhibits a disproportionately high concentration of traffic in a particular region, the system can incorporate this carrier weighting into the quantity calculator and threshold evaluator, producing recommendations that balance not only geographic demand but also network performance.

In some embodiments, the carrier heatmap 718 can also incorporate percentage distribution values that quantify the share of call traffic attributed to each carrier. These values can be displayed in conjunction with the visualization, providing both a graphical and numerical view of carrier distribution. By embedding these percentage distributions directly in the analytics pipeline, the invention avoids the latency and inconsistency of manual carrier reporting, and provides a real-time, system-validated view of traffic allocation.

The carrier heatmap 718 can further enhance downstream automation. Because the carrier-level distribution data is persisted in structured form, it can be included in the machine-actionable files generated by the report generator. These files can specify not only the geographic boundaries and identifier quantities but also carrier distribution metrics, enabling the automation client to factor network performance into procurement and allocation workflows. This linkage between visual representation and structured machine-actionable data reduces error and ensures that operator decisions and automated executions are aligned.

Another technical advantage of the carrier heatmap 718 is its use of vector-encoded rendering, which ensures label legibility and responsiveness even when representing a large number of carriers or call records. In prior approaches, raster graphics or static charts often degraded in clarity as datasets grew, forcing operators to toggle between coarse summaries and unwieldy detailed reports. The present invention eliminates this tradeoff by enabling interactive exploration of carrier-level data without loss of fidelity or excessive memory consumption.

By generating the carrier heatmap 718 as an integrated step within the recon workflow, the present invention provides more than a simple display of carrier information. It represents the output of concrete technical processes—classification, aggregation, storage, and rendering—that transform raw call records into structured insights about network-level performance. The ability to combine these insights with geographic and population-based analytics ensures that identifier allocation and routing recommendations are optimized across multiple dimensions, a capability absent from prior approaches.

Accordingly, the carrier heatmap 718 provides a technical improvement in telecommunications analytics by unifying carrier distribution data with broader local presence optimization. It allows enterprises to detect imbalances, optimize routing, and improve efficiency in outbound calling campaigns while simultaneously providing outputs that are audit-ready and compatible with automated procurement.

Referring to FIG. 9, there is illustrated an exemplary embodiment of a carrier percentage distribution chart 720. In an exemplary embodiment, the carrier percentage distribution chart 720 can quantify the relative share of outbound call traffic assigned to each carrier, expressed as a percentage of total call volume. Each carrier entry in the chart 720 can display a computed value derived from the aggregated terminating identifiers associated with that carrier, as calculated by the traffic volume module.

The carrier percentage distribution chart 720 can complement the carrier heatmap 718 of FIG. 8 by providing precise numerical allocations in addition to visual representations. Whereas the carrier heatmap 718 emphasizes proportional intensity across carriers, the carrier percentage distribution chart 720 allows operators to quickly identify exact shares of traffic, including minor carriers that may not be easily distinguishable on a heatmap. This dual presentation ensures that both qualitative and quantitative insights are available within the analytics pipeline, reducing reliance on manual cross-referencing and improving accuracy.

The carrier percentage distribution chart 720 can also serve as an input into downstream processes. The percentage allocations can be stored in the system's non-transitory memory and made available to the threshold evaluator and quantity calculator. For example, if a carrier's share of traffic exceeds a configured threshold, the system may recommend redistributing identifiers to improve balance across networks. Conversely, carriers with consistently low shares may be deprioritized when selecting numbering plan partitions. By embedding carrier percentages into the computational workflow, the system ensures that routing and allocation decisions are informed by real-world network performance, not just geographic demand.

In contrast with prior approaches, where carrier percentages were typically available only through external reports provided by carriers or manually computed spreadsheets, the present invention generates these values automatically from uploaded call records. This automation provides two technical advantages: first, it reduces provisioning latency by eliminating dependency on external reporting cycles; and second, it ensures that the same dataset drives both visual reports and procurement actions, reducing the risk of inconsistency.

The carrier percentage distribution chart 720 can also be integrated into the system's reporting functionality. In some embodiments, the chart 720 can be included in a machine-actionable file or in an interactive, vector-encoded report that operators can download. These outputs can be formatted to align with downstream automation clients, allowing carrier percentage data to be factored into identifier ordering requests. The inclusion of carrier-level percentages in both human-readable and machine-actionable outputs ensures consistency and traceability from analytics through procurement.

Another advantage of the carrier percentage distribution chart 720 is its ability to reveal subtle anomalies or emerging patterns. For instance, a sudden increase in percentage allocation to a particular carrier may indicate routing inefficiencies, misconfiguration, or potential fraud. By continuously updating the chart 720 as new call records are processed, the system provides real-time visibility into carrier performance and allows corrective actions to be taken promptly. Prior approaches lacked this level of granularity and timeliness, often identifying problems only after they had already degraded call connection rates.

Accordingly, the carrier percentage distribution chart 720 represents a technical enhancement of the analytics pipeline. By pairing numerical allocations with visual heatmaps, embedding percentage values into downstream computations, and ensuring outputs are compatible with automation and compliance systems, the invention improves efficiency, accuracy, and responsiveness in outbound call management.

Referring to FIG. 10, there is illustrated an exemplary embodiment of a destination heatmap 722 generated by the recon module. In an exemplary embodiment, the destination heatmap 722 can depict the geographic distribution of outbound call traffic across a plurality of service boundaries, which may include, without limitation, Local Access and Transport Areas (LATAs), numbering plan areas (NPAs), jurisdictional boundaries, or other telecommunications-defined partitions. Each boundary can be shaded or color-coded according to the magnitude of traffic terminating within that boundary, producing a geographically contextualized representation of demand.

The destination heatmap 722 can be produced after the classification module distinguishes terminating identifiers and the mapping module associates those identifiers with the corresponding service boundaries. The traffic volume module can compute the total call counts for each boundary, and the resulting dataset can be stored and rendered as the heatmap 722. The use of vector-encoded rendering ensures that the map remains legible and responsive even when representing large datasets spanning many boundaries, with label clarity preserved at multiple zoom levels.

In contrast with prior approaches that often produced static tables or raster-based images, the destination heatmap 722 integrates visual analytics into the same computational framework that supports threshold evaluation and identifier allocation. For example, boundaries with traffic volumes below a configured threshold can be visually represented in muted tones or excluded from further allocation recommendations, while boundaries exceeding traffic or population thresholds can be highlighted. This integration of computation and visualization provides operators with immediate, system-validated confirmation of where resources should be concentrated.

The destination heatmap 722 can also serve as a comparative tool. By aligning with the current DID distribution heatmap 714 of FIG. 6 and the recommended DID distribution heatmap 716 of FIG. 7, operators can visualize mismatches between where calls are terminating and where identifiers are currently allocated. This comparison underscores the system's technical advantage: it provides a direct link between demand (as shown in the heatmap 722) and supply (as reflected in identifier inventories), enabling automated reallocation that balances both factors.

In some embodiments, the destination heatmap 722 can include embedded metadata that records the computed traffic volumes, population values, and identifier quantities for each boundary. This metadata can be incorporated into the machine-actionable file generated by the report generator, ensuring that the same data drives both visualization and automated procurement. By synchronizing these outputs, the system reduces inconsistencies and eliminates the manual reformatting that characterized prior approaches.

The destination heatmap 722 can further provide operational benefits in anomaly detection. For example, a sudden shift in traffic intensity in a specific region can indicate routing inefficiencies, changes in customer behavior, or potential fraud. Because the heatmap 722 is continuously updated as new call records are ingested, the system can provide real-time visibility that allows for proactive adjustments in identifier allocation or routing strategies.

Accordingly, the destination heatmap 722 serves not only as a visualization of call distribution but as a functional component of the analytics pipeline. It transforms raw call record data into actionable insights that drive threshold evaluation, identifier allocation, and procurement automation. By embedding computation, visualization, and machine-actionable outputs into a unified framework, the invention achieves improvements in efficiency, accuracy, and responsiveness that were not attainable with prior approaches.

Figure 11:
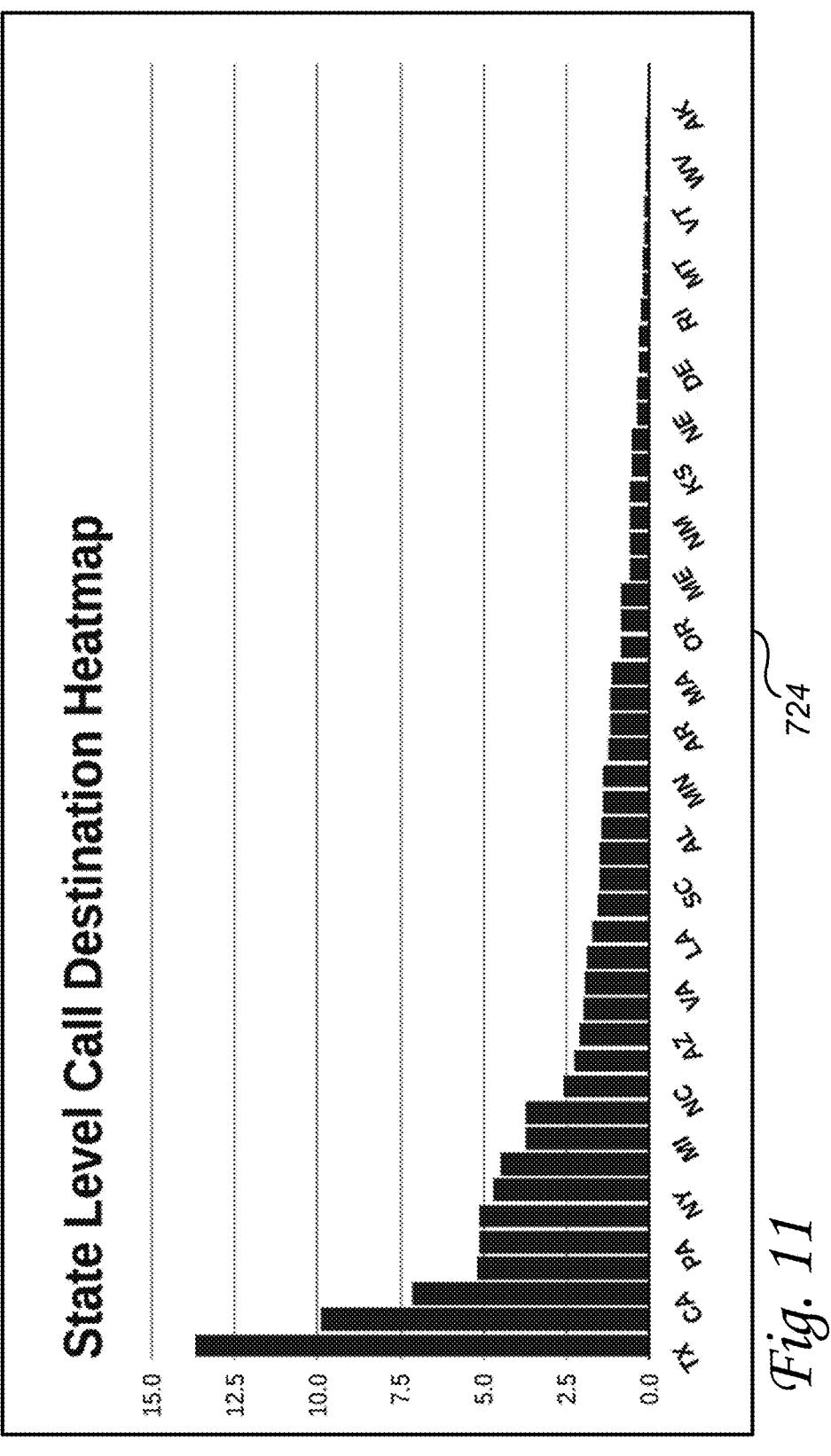
FIG. 11 illustrates one example of a State level call destination heatmap.

Referring to FIG. 11, there is illustrated one example of a State-level call destination heatmap 724 generated from the processing of a plurality of call records received by the system. In an exemplary embodiment, the State-level call destination heatmap 724 can be rendered by the report generator in conjunction with the recon module, mapping module, and traffic volume module to provide geographic visualization of terminating call activity aggregated at the State boundary level. Each State on the heatmap can be shaded or color-coded according to relative call traffic volume, thereby enabling authorized users 402 to immediately discern which geographic regions account for higher or lower levels of terminating traffic.

The State-level call destination heatmap 724 can be derived from the same underlying classification of call records used to distinguish originating calling party identifiers from terminating calling party identifiers. By aggregating call counts across telecommunications-defined service boundaries that align with State borders, the system can create normalized comparisons that account for differences in population density, wireless subscriber counts, or other service demand indicators. In certain embodiments, the heatmap 724 can also incorporate selection criteria values generated by the threshold evaluator to highlight States exceeding configurable thresholds of traffic, population, or wireless subscriber penetration.

An advantage of the State-level call destination heatmap 724 is that it provides actionable insights at a regulatory and operational granularity not addressed by prior approaches, which often stopped at aggregate national or carrier-level reporting. For example, while the destination heatmap 722 of FIG. 10 may illustrate call termination patterns at a broader level, the State-level heatmap 724 enables telecommunications service providers, enterprises, and compliance officers to correlate call distribution against State-specific regulations, numbering plan area assignments, or population coverage zones. This technical capability improves operational efficiency by enabling a user 402 to identify imbalances, such as an under-allocation of originating calling party identifiers in States with high traffic-to-population ratios, and to make informed adjustments before procurement requests are submitted.

In practical operation, the State-level call destination heatmap 724 can be rendered in a vector-encoded format, allowing the visualization to remain legible and interactive across multiple zoom levels within the graphical user interface. This avoids the pixelation and performance degradation common with static image-based approaches and ensures that labels, State boundaries, and traffic indicators remain accessible on both desktop-class computing devices 222A and mobile computing devices 222B/222C. Moreover, the vector encoding supports integration into the machine-actionable files produced by the report generator, allowing downstream automation clients to utilize the geographic data for procurement workflows without requiring manual reformatting.

Through this arrangement, the system applies its classification, mapping, and reporting modules in a coordinated manner, grounded in the structured call record data and telecommunications-defined service boundaries already described with respect to FIGS. 19A-19B and FIGS. 20-22. As a result, the State-level call destination heatmap 724 provides more than an abstract presentation of information; it embodies a technical improvement in the way large datasets are transformed, normalized, and rendered to inform network planning, regulatory compliance, and number procurement activities.

Referring to FIG. 12, there is illustrated an exemplary embodiment of a Local Presence Optimization (LPOP) report 726. In an exemplary embodiment, the LPOP report 726 can provide a consolidated summary of analytics derived from uploaded call records, including traffic volume, population weighting, service boundary mapping, carrier distribution, and identifier allocation recommendations. The LPOP report 726 can be presented to operators in a human-readable format while also being exportable as a structured, machine-actionable file suitable for ingestion by automated procurement systems.

The LPOP report 726 can integrate the outputs of multiple modules within the system. The classification module distinguishes originating identifiers from terminating identifiers. The recon module generates carrier and destination heatmap data. The mapping module associates terminating identifiers with defined service boundaries such as NPAs, LATAs, and jurisdictional partitions. The traffic volume module aggregates call counts for each boundary, while the population datastore provides demographic values. The threshold evaluator applies configurable minimums for traffic and population, and the numbering plan partition selector retrieves and ranks candidate partitions. The quantity calculator then computes the required number of identifiers for each service boundary, applying weighting, scaling, and bounding rules. These results are persisted and compiled into the LPOP report 726.

The LPOP report 726 can include visualizations such as heatmaps, charts, and summary tables that depict both the current identifier allocation and the recommended identifier allocation. Operators reviewing the report 726 can compare these datasets side by side to evaluate how the system's recommendations realign identifiers with traffic and population demand. By combining descriptive and prescriptive elements, the LPOP report 726 provides a technical advantage over prior approaches that offered only static reporting without actionable recommendations.

Another technical aspect of the LPOP report 726 is its vector-encoded rendering. This enables operators to interactively explore large datasets without loss of fidelity, and allows embedded metadata—such as computed traffic volumes, population thresholds, and recommended identifier quantities—to be directly associated with graphical objects. The same metadata can be exported into the machine-actionable file generated by the report generator, ensuring consistency across visual outputs and automated workflows.

The LPOP report 726 can also serve as an audit-ready artifact. In some embodiments, the system can log cryptographic hashes or reconciliation data associated with the report, ensuring that its contents can be validated against procurement transactions initiated through the automation client. This traceability allows enterprises to demonstrate compliance with internal policies, contractual obligations, and regulatory requirements.

By consolidating analytics from multiple sources into a single report, the LPOP report 726 provides not only clarity for operators but also efficiency for downstream execution. Instead of requiring manual extraction and formatting, the report 726 ensures that identifier allocation recommendations flow seamlessly into procurement automation, thereby reducing latency, minimizing errors, and increasing scalability.

Accordingly, the LPOP report 726 represents a culmination of the system's technical improvements. It transforms raw call records into a structured, multi-layered output that combines geographic, demographic, and carrier-based insights, aligns identifier allocation with actual demand, and bridges human oversight with automated execution. This integration delivers measurable advantages in efficiency, accuracy, and compliance, addressing longstanding shortcomings of prior approaches in telecommunications resource management.

In an exemplary embodiment, the reporting and visualization functions illustrated in FIG. 12 can further interoperate with national and local telecommunications infrastructures, including integration with National Service Access Points (NSAPI) and three-digit Local Point of Presence (LPOP) dialing schemes. In operation, the system can ingest call record files that reflect NSAPI routing outcomes or LPOP three-digit codes used for service designation. The mapping module 1012 can classify and associate such identifiers with specific telecommunications-defined service boundaries, including but not limited to emergency service zones, regional assignment blocks, or enterprise-defined routing partitions. By processing these identifiers in conjunction with originating and terminating calling party identifiers, the system can produce actionable reports that highlight service gaps, redundant coverage, or underutilized numbering partitions in both traditional and short-code dialing environments.

In another exemplary embodiment, the system can accommodate multiple classes of stakeholders with differentiated roles and permissions. Administrators can define stratified sampling policies or configure deterministic tie-breaking rules in the numbering plan partition selector 1012, while enterprise operators can focus on procurement workflows through the automation client 1202. Carriers and regulators can access compliance-specific dashboards to validate that allocations adhere to number assignment rules, jurisdictional rating boundaries, or other statutory requirements. Consumers 404, when authorized, can selectively access reports that relate to service availability or brand reputation analytics without being exposed to sensitive procurement records. Such multi-role interaction ensures that the system is not limited to abstract data processing, but rather provides a structured and secure platform adaptable to enterprise, carrier, and regulatory contexts.

The system can also be deployed across heterogeneous environments, including cloud-scale platforms such as AMAZON WEB SERVICES (AWS), MICROSOFT AZURE, or GOOGLE CLOUD PLATFORM, enterprise-managed PBX or VoIP networks, and carrier-grade infrastructures with direct signaling interconnects. In such deployments, the recon module 1008 can persist carrier and destination heatmap data in cloud-hosted databases 212A/212B, while enterprise implementations may rely on on-premises database clusters. Hybrid deployments can combine both, ensuring continuity of analytics and procurement operations even in environments with varying data sovereignty or compliance requirements.

In operation, additional analytics outputs can be generated to support decision-making beyond the visualizations already described. For example, the system can generate a carrier percentage distribution chart (FIG. 9), a destination-level heatmap (FIG. 10), and a state-level call destination heatmap (FIG. 11). These outputs can be cross-referenced with population datastore values and threshold evaluator 1312 selections to identify over-provisioned or under-provisioned areas relative to wireless subscriber counts, telecom consumer counts, or other configurable service demand indicators. Reports generated in this manner can be output as vector-encoded documents or structured spreadsheets, enabling direct ingestion by downstream automation workflows while preserving legibility across zoom levels and maintaining accuracy of numerical values.

In a further exemplary embodiment, compliance boundaries can be explicitly incorporated into the mapping and evaluation process. The mapping module 1012 can reference jurisdictional rating boundaries established by federal or state regulators, number assignment boundaries defined by industry groups such as the North American Numbering Plan Administrator (NANPA), or billing and interconnection boundaries used by carriers. For example, calls terminating in a state-level regulatory zone may require allocations that align with local numbering resources, while interconnection boundaries may dictate specific routing paths between carriers. By associating originating calling party identifiers with such compliance-driven partitions, the system produces procurement and reporting outputs that are technically accurate, legally compliant, and immediately actionable within real-world telecommunications environments.

Through these capabilities, the reporting and allocation workflows illustrated in FIG. 12 are not confined to abstract data transformations but are concretely tied to telecommunications infrastructure, enterprise operations, and regulatory enforcement. The outputs can directly inform procurement decisions, optimize network utilization, and ensure compliance across diverse service boundaries, thereby providing a practical and tangible application of the disclosed system.

Figure 13:
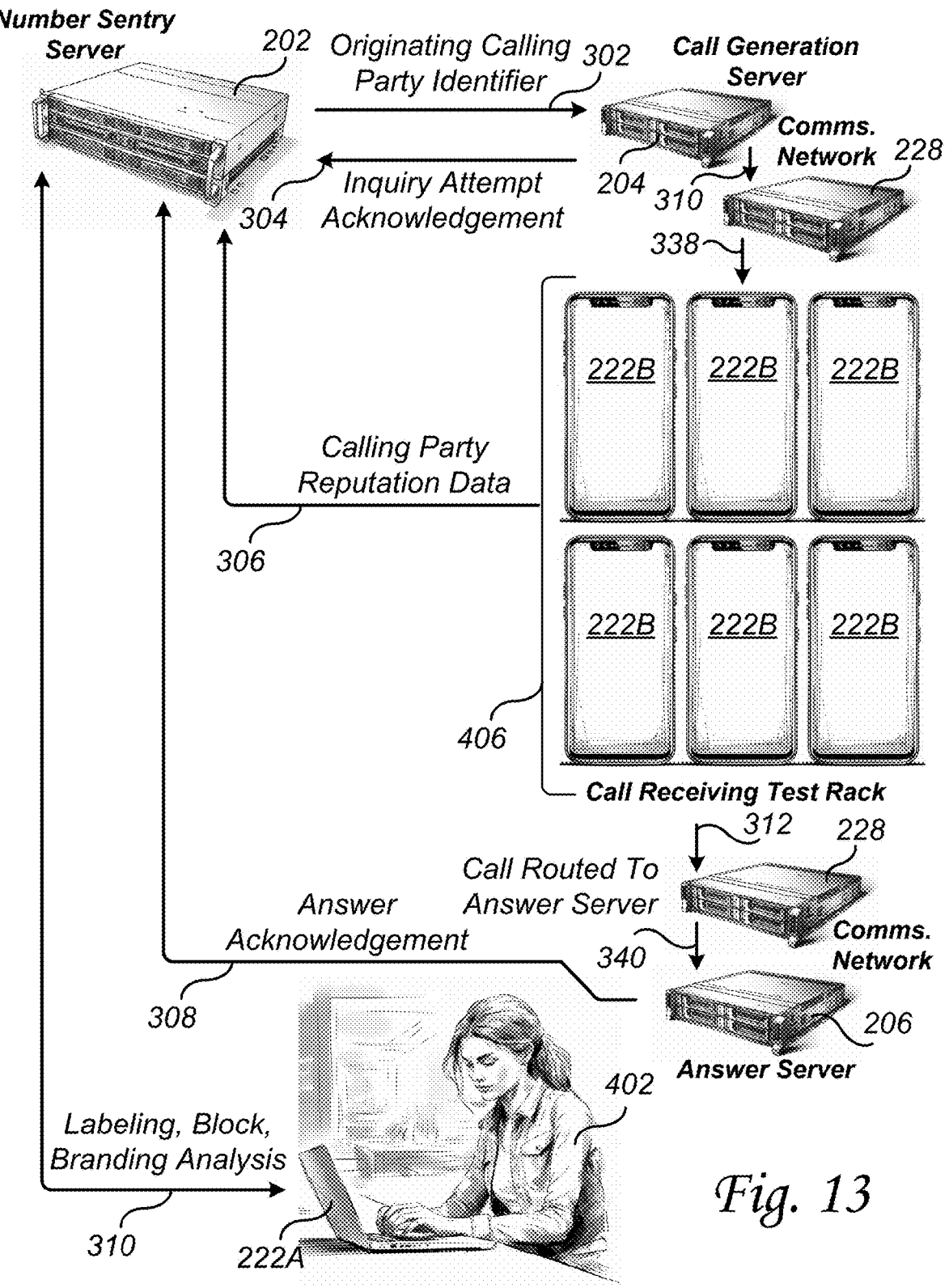

Referring to FIG. 13, there is illustrated an exemplary embodiment of a brand identity, brand security, and brand reputation monitoring system that integrates with the outbound analytics and allocation framework of the present invention. In this embodiment, a number sentry server 202 maintains a datastore of clients 402 (also referred to herein as users 402) and their associated originating calling party identifiers, which can include telephone numbers, Voice over Internet Protocol (VOIP) identifiers, or other telecommunications-defined identifiers.

At predetermined monitoring intervals, the number sentry server 202 initiates inquiry call attempts to a plurality of computing devices 222B, which can be smartphones or other call-receiving endpoints, each configured with a receiving called party identifier such as a telephone number. Each computing device 222B can be associated with a specific communications network 228, allowing the system to test how the same originating calling party identifier is presented across multiple networks.

In operation, the originating calling party identifier and the designated receiving called party identifier can be data communicated 302 to a call generation server 204. The call generation server 204 issues a return data communication 304 acknowledging receipt of the request and signaling the number sentry server 202 that a call attempt will be placed. The call generation server 204 then communicates 310 with the communications network 228 to initiate 338 the inquiry call to the computing device 222B. Once received, the computing device 222B captures calling party reputation data, which can include display name, business logo, label descriptors, and warning labels such as "SPAM LIKELY" or "FRAUD RISK."

Captured data can be relayed 306 from the computing device 222B to the number sentry server 202. In certain embodiments, the computing device 222B can also trigger AI-based enrichment, capturing screenshots, applying optical character recognition, or recording metadata such as network element responses. The inquiry call itself can be routed 312/340 through the communications network 228 to an answer server 206, which acknowledges receipt 308, manages call duration, and may generate tonal patterns during a relief period to avoid network penalties associated with short calls.

An advantage of this configuration is that it provides proactive monitoring of brand identity integrity across multiple communications networks 228. Prior approaches relied on static complaints or post-hoc reporting, whereas the present invention allows continuous detection of brand degradation, spoofing, or network mislabeling in real time. The ability to compare captured data across multiple communications networks 228 ensures that inconsistencies can be quickly identified and remediated, for example, by substituting alternative originating identifiers or submitting correction requests to a network.

Because the captured reputation data 306 is persistently stored and scored by the number sentry server 202, the system builds a longitudinal record of how each identifier is represented. This record can be cross-referenced against the broader analytics pipeline of the present invention, correlating brand reputation with traffic volumes, population-based demand, and identifier allocation strategies. Thus, FIG. 13 illustrates how the monitoring subsystem enhances the outbound allocation framework by ensuring that identifiers selected for campaigns are not only efficiently distributed but also brand-safe.

Referring to FIG. 14, there is illustrated an exemplary embodiment of the workflow for inquiry call attempts and brand reputation analysis. In this embodiment, the number sentry server 202 initiates an inquiry call attempt 318 by instructing the call generation server 204 to place a test call using an originating calling party identifier associated with a client 402. The call generation server 204 acknowledges receipt of the request and initiates 332/334 a call through a communications network 228 toward a computing device 222B configured with a receiving called party identifier.

In reference 'A', if the inquiry call attempt is received by the computing device 222B, the device captures a plurality of calling party reputation data, which may include alphanumeric caller ID, logos, warning labels, or other presentation attributes visible on the device display. The computing device 222B then communicates 306 this data to the number sentry server 202. In certain embodiments, the computing device 222B may also perform supplemental enrichment, such as screenshot capture, AI-based label classification, or cross-checking with other reputation databases.

If no calling party reputation data is received, the system can infer that the originating identifier may have been blocked by the communications network 228, a preloaded application, or the device itself. The number sentry server 202 can then schedule a second inquiry call attempt to a different receiving called party identifier associated with another computing device 222B on the same communications network 228 to verify whether blocking is network-wide or device-specific.

In reference 'B', clients or users 402 can access results through a computing device 222A, such as a laptop or workstation, communicating 310 with the number sentry server 202. The user 402 can view brand identity, labeling outcomes, blocked identifiers, and other analytics in real time. They may then select or enable the selection of 322 originating calling party identifiers for outbound campaigns, prioritizing identifiers that maintain accurate branding, avoid blocking, and present acceptable risk levels.

In reference 'C', the advantage of continuous monitoring and multi-network comparison becomes evident. By repeatedly testing identifiers at a defined monitoring interval 316, the system ensures that degradations in reputation, spoofing attempts, or network misclassifications are detected early. The user 402 can therefore select identifiers 322 with confidence that they will appear correctly to consumers 404, leading to increased answer rates 324. The feedback loop between identifier monitoring, analytics, and campaign selection ensures that brand reputation is actively managed rather than passively observed.

As with FIG. 13, the system illustrated in FIG. 14 achieves technical improvements over prior approaches. The monitoring is automated, persistent, and multi-network, with results integrated directly into the identifier allocation framework of the present invention. This integration reduces provisioning latency, enhances brand trust, and ensures that outbound communication strategies are optimized not only for efficiency but also for reputation and security.

Figure 15:
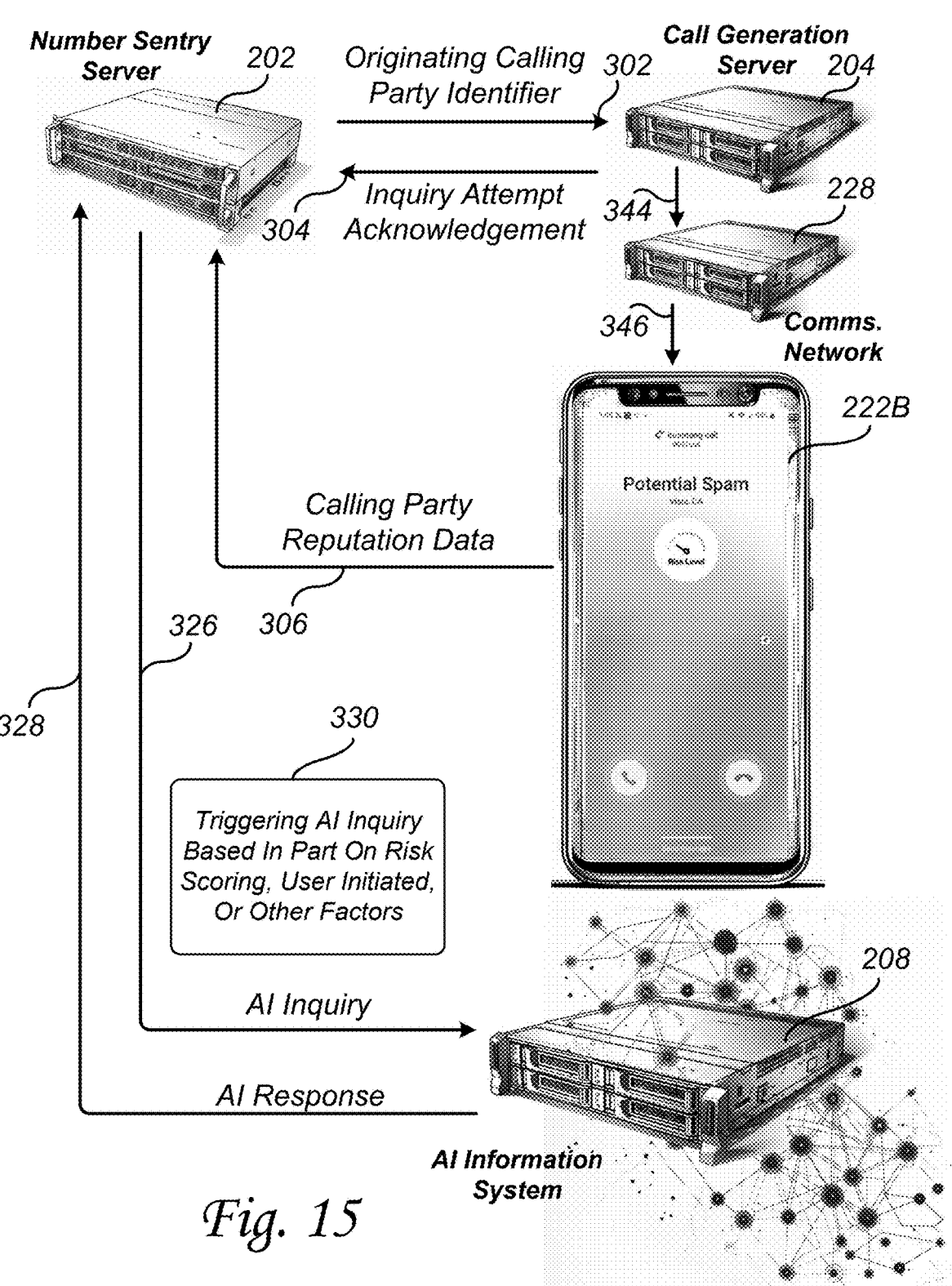

Referring to FIG. 15, there is illustrated an exemplary embodiment of a brand identity, brand security, and brand reputation management system that incorporates artificial intelligence (AI)-based inquiries to extend the monitoring and analytics capabilities of the present invention. In this embodiment, the number sentry server 202 coordinates continuous monitoring of originating calling party identifiers across a plurality of communications networks 228. The monitoring process is carried out with the assistance of data communications 344/346 between the call generation server 204, the communications network 228, and a plurality of computing devices 222B configured with unique receiving called party identifiers.

In operation, each inquiry attempt placed by the call generation server 204 to the computing devices 222B results in captured calling party reputation data, which can include name displays, logos, labels such as "SPAM LIKELY" or "FRAUD RISK," and other visual or metadata indicators of how the identifier is being represented by the communications network 228. This data is communicated back to the number sentry server 202 for processing. In addition to capturing the raw outputs, the system can trigger AI-based inquiries 330 when certain conditions are met, such as the detection of a warning label, scoring anomalies in brand reputation, or inconsistent representations across networks.

The AI inquiries 330 can involve multiple modes of analysis, including but not limited to machine learning, deep learning, and natural language processing. These inquiries can be initiated by the number sentry server 202, the call generation server 204, the answer server 206, or even by an authorized user 402 inputs via administrative controls. Each AI inquiry 330 can be directed as a data communication 326 to an AI information system 208, which may comprise one or more specialized AI subsystems trained or configured for distinct information domains. In response, the AI information system 208 can provide an AI response 328 containing enriched context, classification, or recommendations.

For example, an AI response 328 may correlate a flagged originating calling party identifier with recent legal filings, known social media campaigns, or emerging fraud reports. It may also provide reasoning as to why a communications network 228 applied a blocking or warning label, based on analysis of prior network behavior, consumer complaint datasets, or regulatory guidelines. The number sentry server 202 can parse and integrate this AI response 328 into its evaluation, thereby supplementing raw capture data with context-sensitive insights.

The advantage of this configuration is that the system is no longer limited to static observation of call presentation data but can dynamically contextualize reputation signals with external knowledge and predictive analytics. Prior approaches provided only surface-level data such as "blocked" or "spam" without explaining why those conditions occurred or what corrective actions should be taken. By contrast, the present invention enables a deeper analysis, permitting clients 402 to make informed, proactive adjustments. This can include requesting alternate originating identifiers, modifying campaign configurations, or escalating issues to carriers with data-backed justification.

In some embodiments, the AI information system 208 can consist of multiple subsystems. For example, one generative AI system may be configured for natural language analysis, supporting interpretation of consumer-facing labels and sentiment analysis of public commentary. Another deep learning system may be trained specifically on telecommunications routing and blocking data, allowing it to identify patterns in how different carriers or network elements apply reputation labels. Yet another AI system may focus on regulatory compliance, providing insights into whether a particular identifier usage may expose the client 402 to jurisdictional risks. The number sentry server 202 can route AI inquiries 326 to one or more of these specialized systems, depending on the type of anomaly detected or the monitoring objective at hand.

Additionally, the integration of AI inquiries ensures that captured reputation data can be continuously correlated with broader enterprise metrics, such as traffic volume values, population thresholds, or identifier allocation recommendations generated by the main analytics pipeline. For example, if a high-volume identifier that satisfies demand criteria also receives negative reputation labels, the system may recommend substitution with a lower-volume identifier that preserves brand integrity. By linking AI-driven insights with the quantity calculator and numbering plan partition selector, the invention provides not only improved accuracy in identifier allocation but also improved trustworthiness in consumer presentation.

In some embodiments, AI-based insights may also be logged and stored as part of the audit logger functionality, enabling tamper-evident records of how identifiers were evaluated and why certain identifiers were chosen or excluded from campaigns. This provides a defensible compliance trail that can be valuable in regulatory, contractual, or brand-protection contexts.

Accordingly, the embodiment of FIG. 15 demonstrates how the system extends beyond simple monitoring of calling party reputation to provide multi-layered, intelligent analysis. By capturing raw call presentation data, augmenting it with AI-based insights, and integrating those insights into identifier allocation and procurement processes, the invention provides technical improvements in accuracy, efficiency, and brand protection that cannot be achieved by prior approaches relying on manual checks or static reports.

Figure 16:
FIG. 16 illustrate examples of a plurality of computing devices in a call-receiving test rack configured for operation on one or more communication networks.

Referring to FIG. 16, there is illustrated an exemplary embodiment of a call-receiving test rack 406 comprising a plurality of computing devices 222B configured for operation on one or more communications networks 228. Each computing device 222B can be provisioned with a unique receiving called party identifier, such as a telephone number or VoIP endpoint, enabling the system to place controlled inquiry call attempts from selected originating calling party identifiers and capture the resulting calling party reputation data as it is actually displayed by the network.

In the illustrated embodiment, the computing devices 222B within the call-receiving test rack 406 present a range of call labeling outcomes. In reference 'A', a device displays "POTENTIAL SPAM." In reference 'B', another device shows the label "NUMBER SENTRY," which may correspond to a preferred or client-designated brand identity. In reference 'C', the labeling appears as "TELEMARKETER." In reference 'D', the label "ROBO CALLER" is applied. In reference 'E', the label reads "NUISANCE LIKELY," while in reference 'F', the device displays "SCAM LIKELY." These examples demonstrate the spectrum of possible network-applied reputational outcomes, ranging from desirable branding to risk-oriented warnings.

The ability to simultaneously monitor multiple computing devices 222B across distinct communications networks 228 allows the system to identify inconsistencies in branding and labeling that may arise due to differences in carrier-level policies, third-party spam-filtering applications, or regional compliance algorithms. Prior approaches relied heavily on anecdotal consumer complaints or delayed carrier reports, whereas the present invention provides direct, real-time observation of how each originating calling party identifier is represented across networks and applications.

An advantage of the configuration shown in FIG. 16 is that it enables brand identity management in view of the user's 402 preferred branding. For example, user 402 may specify "ACME Lawn Service" as the preferred display label, yet the test rack 406 may capture variations such as missing spaces ("ACMELawnService"), truncated names ("ACME"), or misdirected identifiers showing "SPAM LIKELY." Even minor deviations such as capitalization errors or run-on words can diminish consumer trust, reduce call answer rates, and erode brand reputation. By detecting these discrepancies, the system allows for corrective action, such as adjusting outbound identifiers, submitting branding corrections to a carrier, or substituting alternate identifiers through the allocation framework.

Another technical benefit is the ability to detect risk labeling events that suppress or override the intended brand identity. For example, when a communications network 228 decides to substitute a risk label such as "SCAM LIKELY" or "TELEMARKETER" in place of the actual business identity, the present invention captures that substitution. This is significant because the substitution may be based on network analytics, customer complaints, or external datasets that do not accurately reflect the caller's intent. By detecting misapplied risk labels in near-real time, the system allows clients 402 to remediate reputational harm, either by requesting network reviews, rotating identifiers, or adjusting campaign strategies.

The call-receiving test rack 406 can also expose brand security threats, such as spoofing or falsification of originating identifiers. In these cases, a bad actor may transmit a false caller ID to make it appear as though the call is coming from a trusted brand. By monitoring a broad set of identifiers across multiple networks, the present invention can detect unexpected label changes, mismatched identifiers, or suspicious patterns that indicate spoofing. Once detected, the number sentry server 202 can generate alerts, log events for compliance, and support corrective actions that mitigate the security incident.

From a system-level perspective, the captured calling party reputation data can be integrated back into the analytics and identifier allocation pipeline described in earlier figures. For instance, if a high-volume identifier recommended by the quantity calculator also consistently triggers "NUISANCE LIKELY" labels, the threshold evaluator may downgrade its suitability for allocation. Conversely, identifiers that maintain accurate, client-preferred labels can be prioritized in outbound campaigns, thereby improving overall consumer answer rates.

Accordingly, FIG. 16 demonstrates how the call-receiving test rack 406 enhances the present invention by providing a controlled, repeatable mechanism for validating brand identity, detecting network-imposed risk labels, and identifying spoofing attempts. The technical improvements lie not merely in visualizing call labeling but in embedding these captured insights directly into automated identifier selection, procurement, and monitoring processes. This integration ensures that outbound identifiers are not only efficiently allocated by traffic and population data, but also safeguarded against reputational degradation across diverse communications networks 228.

Figure 17:
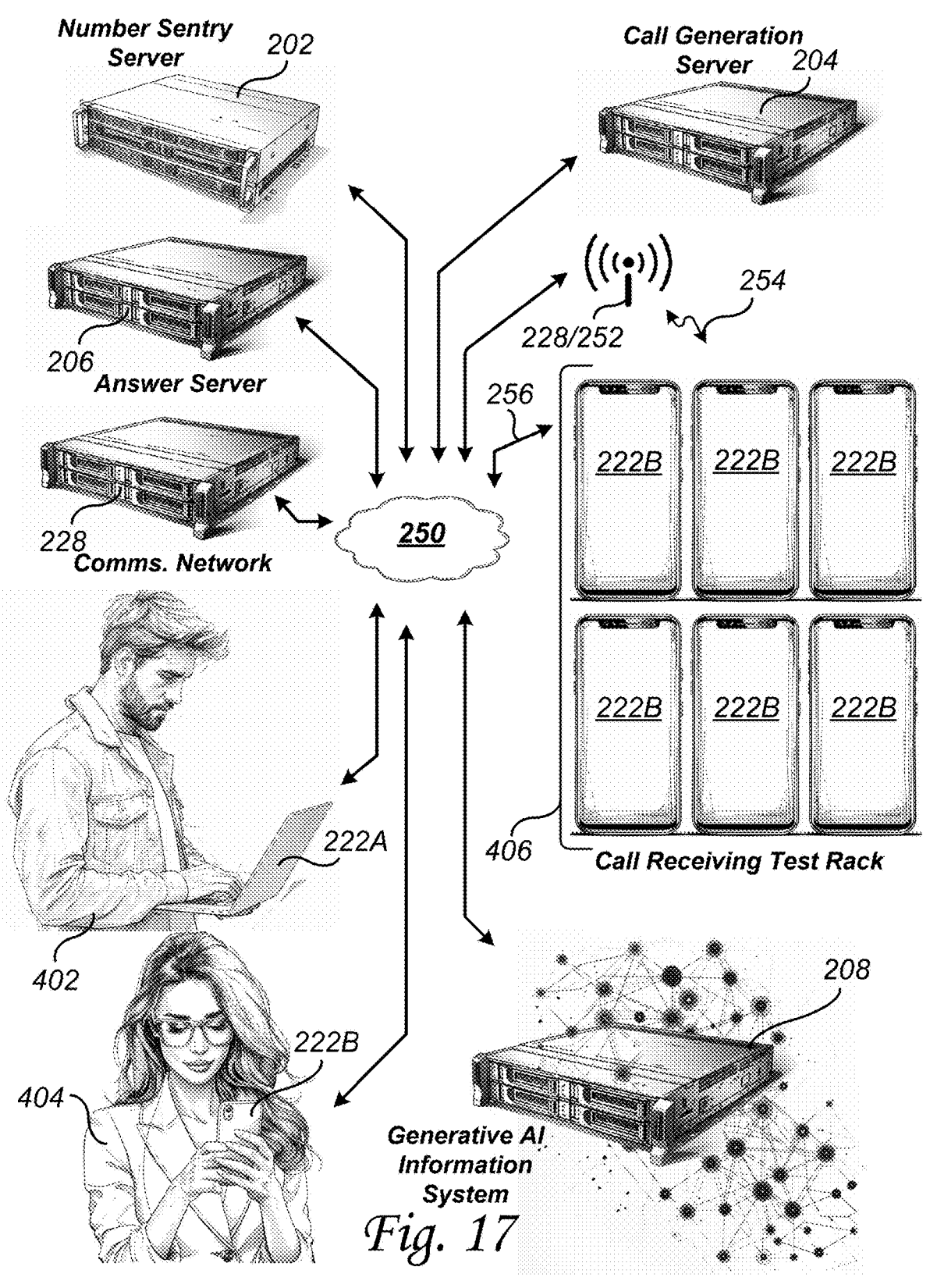
FIG. 17 illustrates one example of managing a brand identity, brand security, and brand reputation network.

Referring to FIG. 17, there is illustrated an exemplary embodiment of a brand identity, brand security, and brand reputation management system, method, and network operating across a global network 250. The Internet can be a global network 250. In this embodiment, a plurality of remote data processing resources are interconnected to coordinate monitoring, enrichment, and control of originating calling party identifiers. These resources include the number sentry server 202, the call generation server 204, the answer server 206, one or more computing devices 222B, network elements of communications networks 228, and an AI information system 208. Each of these data processing resources can communicate with one another across the global network 250, which can comprise the Internet and additional carrier-grade hardware resources of communications networks 228.

In an exemplary embodiment, clients or authorized users 402 may access the system using computing devices 222A/222C, while consumers 404 receive and view calls on computing devices 222B/222C. Computing devices 222A can include laptop and desktop-style machines used for administrative control, configuration, and reporting. Computing devices 222B/222C can be mobile devices such as smartphones and tablets that operate directly on communications networks 228. When functioning as consumer endpoints, these devices 222B/222C capture and display calling party reputation data, such as brand names, risk labels, and logos. When functioning as client endpoints, they allow user 402 to monitor identifier performance, review captured data, and adjust outbound identifier strategies.

The computing devices 222B/222C can communicate 254 with the remote data processing resources using wireless communications 252, such as GSM, CDMA, 3G, 4G, or 5G technologies provided by carriers like AT&T, T-MOBILE, and VERIZON. Alternatively, or in addition, they can communicate 256 using Wi-Fi or other local access methods. This dual communication capability ensures that reputation data and analytic results can be reliably exchanged between mobile endpoints and the centralized servers, even under varied network conditions.

The remote data processing resources 202/204/206/208/228 can be implemented as physical servers, virtualized servers, or hosted infrastructure within public or private cloud environments. In some embodiments, these may be deployed on third-party cloud platforms such as AMAZON WEB SERVICES (AWS), MICROSOFT AZURE, or GOOGLE CLOUD PLATFORM (GCP). In other embodiments, the resources can be on-premises systems operated by the enterprise. For purposes of disclosure, each of these distributed data processing resources can be generically referred to as a "server."

From a technical perspective, the interconnection of these resources across the global network 250 achieves several improvements over prior approaches. The number sentry server 202 provides a centralized coordination function, aggregating captured calling party reputation data from computing devices 222B, correlating it with network signaling provided by communications networks 228, and integrating analytic results generated by the AI information system 208. The call generation server 204 and answer server 206 perform real-time control of inquiry call attempts, ensuring that calls are successfully placed, monitored, and relieved. The AI information system 208 enriches raw observations with context such as labeling trends, spoofing risk, or regulatory correlations.

The global network 250 provides the backbone for this architecture, enabling distributed resources to function cohesively as part of a unified monitoring and analytics framework. Unlike prior approaches that relied on isolated, device-level monitoring or siloed carrier reports, the present invention embeds continuous, multi-network monitoring into a scalable, cloud-compatible system that integrates reputation signals directly with identifier allocation logic.

Accordingly, FIG. 17 illustrates a distributed system architecture in which servers, network elements, and mobile endpoints interoperate to monitor, enrich, and control brand identity and reputation data in real time. By embedding this architecture into the identifier allocation framework described in earlier figures, the invention ensures that outbound identifiers are not only allocated efficiently but also validated for branding accuracy and security across multiple communications networks 228.

Figure 18:
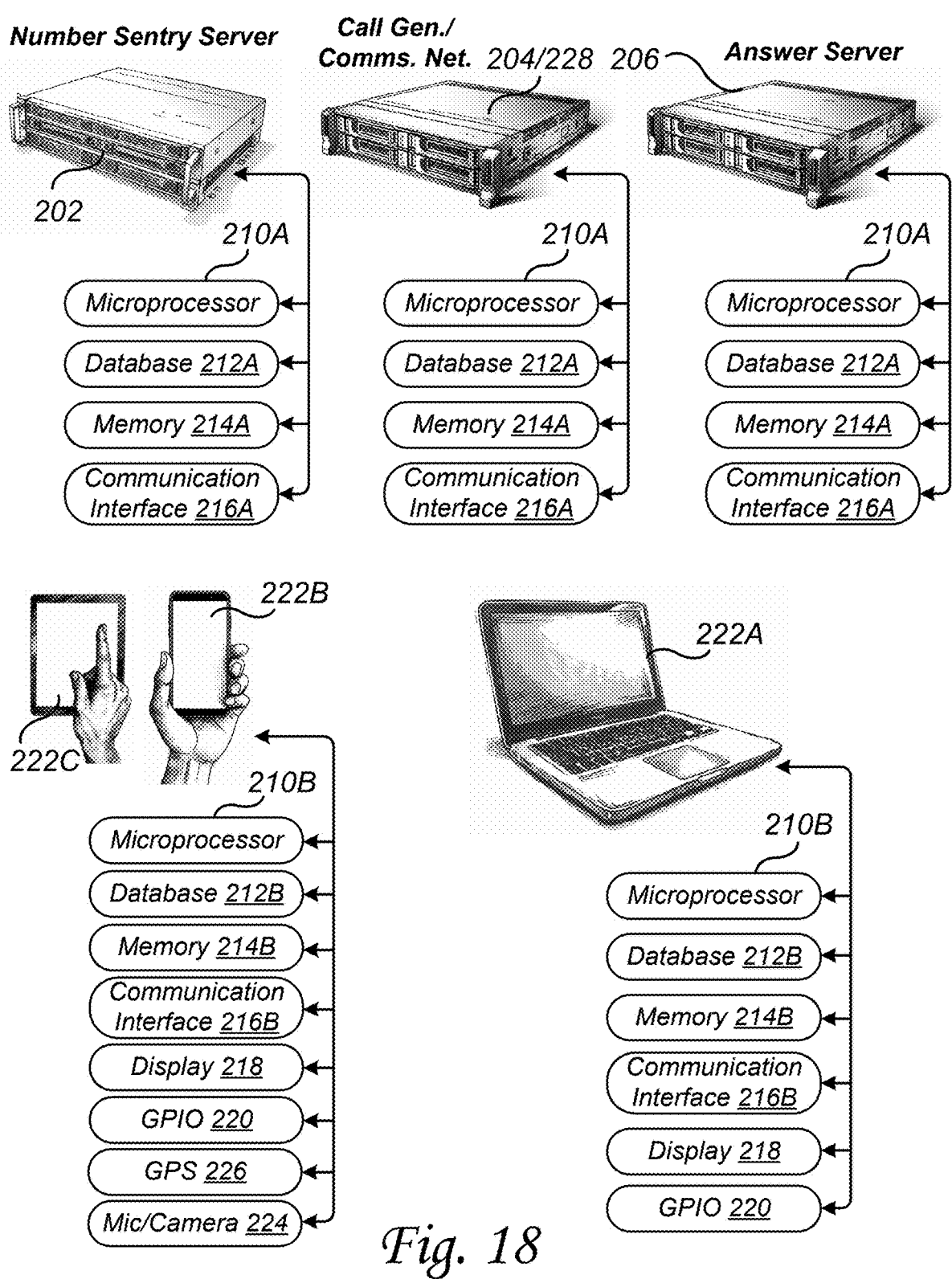
FIG. 18 illustrates examples of remote data processing resources and computing devices.

Referring to FIG. 18, there is illustrated an exemplary embodiment of remote data processing resources and computing devices that enable distributed operation of the present invention. These components provide the hardware and software foundation for executing the identifier allocation, brand identity monitoring, and analytics functions described herein.

In an exemplary embodiment, the remote data processing resources 202/204/206/208/228 can include the number sentry server 202, the call generation server 204, the answer server 206, the AI information system 208, and network elements of communications networks 228. Each of these resources can comprise a microprocessor 210A, a database 212A, a memory 214A, and a communication interface 216A. The microprocessor 210A is operationally related to the database 212A, memory 214A, and communication interface 216A, providing computational control, persistent data management, and reliable network connectivity.

The microprocessor 210A can be any suitable device, such as those manufactured by INTEL, ZILOG, MICROCHIP, AMD, ARM, or equivalent providers. It executes instructions for classifying identifiers, generating heatmaps, evaluating thresholds, and running AI enrichment queries. The database 212A can be implemented in SQL, MYSQL, MARIADB, ORACLE, MS ACCESS, or other relational or non-relational systems, and can store reputation data, call record metadata, allocation thresholds, and procurement logs. The memory 214A can include RAM, ROM, flash, hard drives, solid-state drives, or removable media such as USB drives or micro-SD cards, providing both volatile and non-volatile storage for fast execution and long-term archiving. The communication interface 216A can include LAN, WAN, USB, Ethernet, RS232, RS485, Wi-Fi, 2G, 3G, 4G, 5G, Bluetooth, TCP/UDP protocols, Zigbee, or mesh networks. These multiple interface options ensure robust data communication across the global network 250, including Internet backbones and carrier infrastructure.

In operation, computing devices 222A/222B/222C—collectively referred to as computing devices 222—can data communicate with the remote data processing resources 202/204/206/208 across the global network 250. The global network 250 can include the Internet as well as additional elements of a communications network 228, allowing seamless integration of enterprise servers, carrier equipment, and mobile endpoints.

Each computing device 222 can comprise a microprocessor 210B, database 212B, memory 214B, communication interface 216B, a display 218, and general-purpose inputs and outputs (GPIO) 220. Mobile devices such as smartphones 222B and tablets 222C may also include a global positioning system (GPS) 226, and a microphone and/or camera 224. These additional peripherals enable enhanced monitoring and contextualization. For example, GPS 226 can record the geographic location of consumers 404 or test racks 406 receiving inquiry calls, enabling correlation with regional reputation data. Microphone/camera 224 can capture supplemental evidence of how calls are presented or recorded, providing audit-ready records.

The microprocessor 210B can be INTEL, ZILOG, MICROCHIP, AMD, ARM, or other processors, executing instructions for presenting reputation data on the display 218 or relaying captured data back to the number sentry server 202. The database 212B and memory 214B can store temporary call logs, screenshots, and metadata. The communication interface 216B can include wired or wireless protocols such as Wi-Fi, Bluetooth, or 5G, ensuring that captured data is reliably transmitted to the centralized servers.

The display 218 may be implemented as LCD, LED, or OLED, enabling clear visualization of branding, labels, or warnings presented to the consumer 404. The GPIO 220 may be configured to interface with user input devices such as touchscreens, biometric sensors, or external testing equipment, enabling automated workflows and expanded test configurations.

An advantage of the architecture illustrated in FIG. 18 is that it shows the symbiosis between remote processing resources and end-user computing devices. The servers 202/204/206/208/228 provide high-throughput computation, data aggregation, and AI analysis, while the computing devices 222 capture ground-truth data from the perspective of the consumer 404 or provide operator access for clients 402. This distributed arrangement allows for real-time monitoring, multi-network verification, and immediate adjustment of identifier allocation strategies.

In contrast to prior approaches, which relied on siloed reputation checks or after-the-fact reports, the present invention integrates component-level hardware and software resources into a unified framework. This ensures that insights generated at the device level (e.g., captured call labeling on computing devices 222B/222C) are directly fed into higher-level processes such as the threshold evaluator, quantity calculator, and automation client. The result is an end-to-end system that not only observes brand identity outcomes but also acts upon them through automated identifier selection and procurement.

Accordingly, FIG. 18 illustrates the physical and logical architecture that supports the present invention's improvements in efficiency, accuracy, and reliability. By combining distributed servers with consumer-facing devices and integrating them through the global network 250, the invention provides a technical infrastructure capable of ensuring brand integrity, securing identifiers, and aligning allocation with both demand and reputation considerations.

Figure 19A:
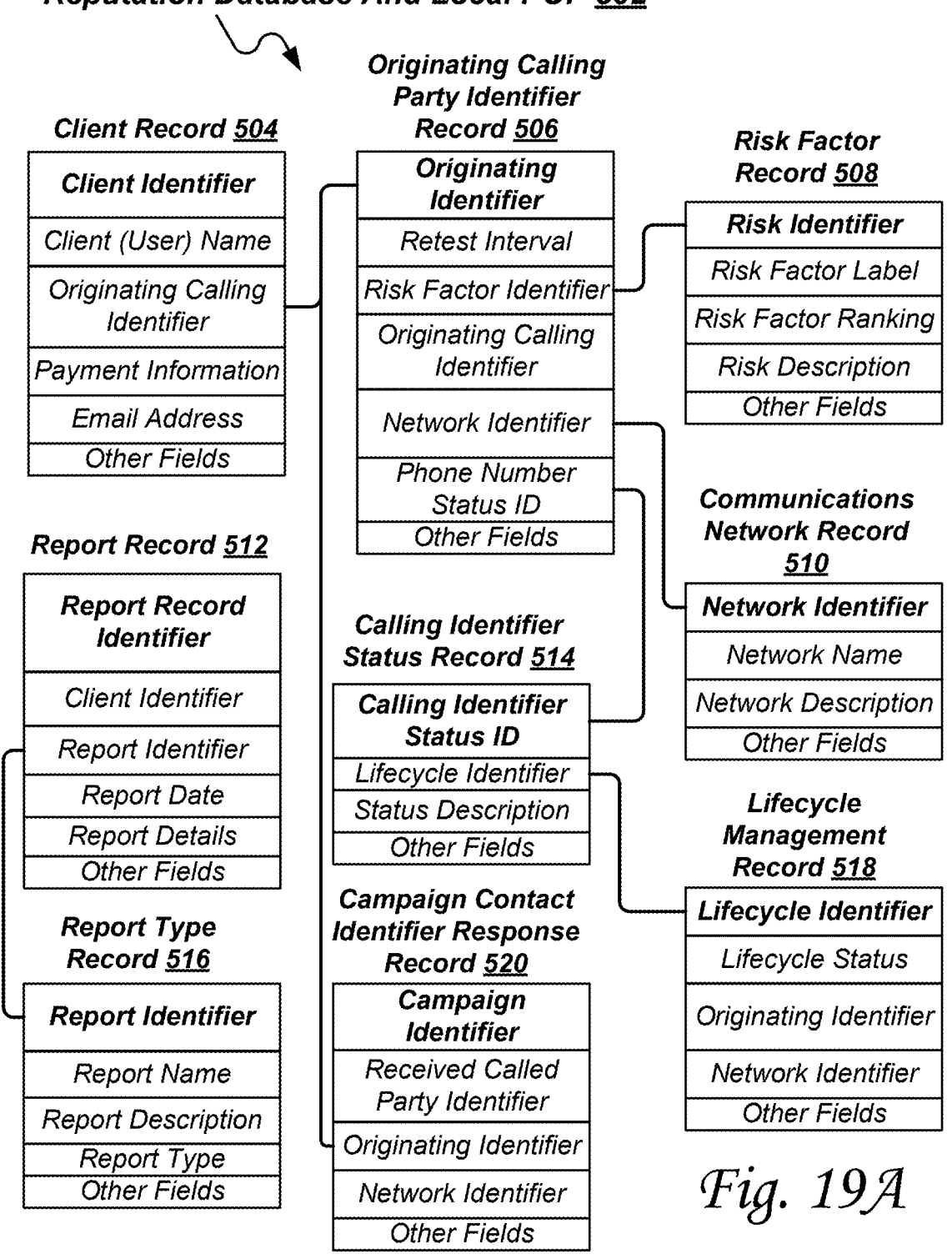

Referring to FIGS. 19A-19B, there is illustrated an exemplary embodiment of a Managing Brand Identity and Brand Reputation Database and Local POP database 502 database structure supporting the systems and methods of the present invention.

With reference to FIG. 19A, in this embodiment, at least one database 212A/212B can be implemented across one or more of the remote data processing resources 202/204/206/208, or alternatively on a computing device 222, depending on the deployment environment. Such databases 212A/212B can be configured for multi-stakeholder access under role-based authorization, enabling administrators, authorized users 402, and, in some embodiments, select consumers 404 to access, create, or manage portions of the stored records.

The database 502 can be realized in a variety of technologies, including SQL, MYSQL, MARIADB, ORACLE, MS ACCESS, network-accessible storage, or hybrid architectures that combine relational tables with unstructured repositories. This flexibility allows the database to store not only structured call record and identifier metadata but also associated screenshots, demographic files, or enriched AI responses that support practical monitoring and allocation operations.

As illustrated, the database 502 comprises a set of inter-related records, including: Client Record 504, Originating Calling Party Identifier Record 506, Risk Factor Record 508, Communications Network Record 510, Report Record 512, Calling Identifier Status Record 514, Report Type Record 516, Lifecycle Management Record 518, and Campaign Contact Identifier Response Record 520. The interconnect-ing lines between these records represent some of the relational dependencies, ensuring that identifiers, risk val-ues, network associations, campaign outcomes, and report-ing artifacts remain synchronized throughout system opera-tion.

The Client Record 504 can store attributes such as client identifiers, account numbers, names, billing information, preferred brand identity, payment information, email address or other contact information, linked originating identifiers, and other fields. This record anchors the database to individual enterprises or organizations and allows moni-toring, reporting, and allocation decisions to be tracked on a per-client basis.

The Originating Calling Party Identifier Record 506 can include fields such as the identifier itself, retest intervals, associated client, risk factor identifiers, communications network identifiers, status flags or other statuses, and other fields. This record forms the nexus between a client's identifiers and their real-world performance across networks 228, enabling traceability when identifiers are selected or suppressed during outbound campaigns.

The Risk Factor Record 508 can define one or more brand or reputation risks tied to identifiers. Fields may include a risk identifier, descriptive risk factor label, severity ranking, explanatory notes, descriptions, and other fields. Examples of risks include presentation as "SPAM LIKELY," high block rates, or spoofing indicators. Persisting these in a structured form enables systematic evaluation by the thresh-old evaluator and quantity calculator.

The Communications Network Record 510 can store network identifiers, names, carrier categories, descriptions, jurisdictional regions, compliance zones, and other fields. This record ensures that identifier performance can be correlated with the networks where calls terminate, support-ing cross-network comparisons and localized regulatory assessments.

The Report Record 512 can track analytics and reports generated by the system. Fields may include report record identifiers, client cross-references, report type identifiers, report timestamps, report details, descriptions, structured contents, and other fields. These records provide continuity between system operation and client-facing deliverables.

The Calling Identifier Status Record 514 can record the operational state of identifiers, with fields such as status IDs, active/inactive flags, lifecycle identifiers, descriptive notes, and other fields. This record is critical for informing both automated procurement workflows and manual management decisions.

The Report Type Record 516 can provide metadata describing available report classes. Fields may include report identifiers, names, report types, categories, descrip-tions, applicable formats, and other fields. This record enables the system to flexibly output data in compliance reports, vector-encoded heatmaps, or machine-actionable files for automation clients.

The Lifecycle Management Record 518 introduces tem-poral tracking, storing events and status changes throughout the lifespan of an identifier. Fields may include lifecycle statuses, activation dates, network identifiers, originating calling party identifiers, suspension logs, remediation actions, eventual commissioning/decommissioning or other notes, and other fields. This ensures that identifier usage is managed in a structured, auditable manner over time, an element often missing in prior approaches.

Finally, the Campaign Contact Identifier Response Record 520 can persist outcomes from outbound contact campaigns. Fields may include campaign identifiers, asso-ciated received calling party identifiers, originating calling party identifiers, network identifiers, block outcomes, answer rates, consumer engagement results, compliance notes, and other fields. By cross-linking these results to originating identifiers, the system can evaluate whether specific identifiers enhance or diminish campaign effective-ness.

An advantage of the database structure shown in FIG. 19A is that it consolidates client metadata, identifier attri-butes, risk assessments, lifecycle events, campaign responses, and reporting outputs into a single relational framework. Prior approaches often separated brand identity monitoring from outbound campaign metrics or failed to tie reputation status back to lifecycle and procurement records, creating gaps in accountability. By contrast, the present invention ensures that all stages of identifier use—from allocation through monitoring to campaign-level out-comes—are represented in a unified schema, enabling machine-actionable outputs, compliance-grade auditability, and improved decision support for enterprises managing their outbound calling reputation.

With reference to FIG. 19B, there is illustrated an exem-plary embodiment of an extended database structure 502 for the systems and methods of the present invention. This database extends the schema shown in FIG. 19A by intro-ducing additional records that support advanced analytics, identifier allocation, campaign monitoring, fraud detection, and audit functionality. Interconnecting lines between the records illustrate relational dependencies, ensuring that data integrity is preserved across the various functions of the system.

Though not illustrated in FIG. 19B, each of the records 522, 524, 526, 528, 530, 532, and 534 is relationally linked with the records of FIG. 19A, including client record 504, originating calling party identifier record 506, and related reporting and lifecycle records. These relationships allow traffic, population, fraud/risk, and campaign analytics data to be cross-referenced with identifier status, client information, and network attributes. By maintaining these dependencies within a relational schema, the database ensures that all analytics, enrichment, and audit outcomes are grounded in persistent operational data rather than abstract models, thereby enabling reproducibility, compliance verification, and machine-actionable outputs.

In an exemplary embodiment, the extended database 502 can include the following records: a Call Log Record 522, a DID Metric Record 524, a Heatmap Record 526, a Campaign Analytics Record 528, a Fraud/Risk Record 530, an Outbound Call Metrics Record 532, and a Records Data Table 534.

The Call Log Record 522 can store raw call-level data ingested by the network interface, including fields such as log identifier, originating calling party identifier, calling party identifier, call record ID, timestamp, call duration, termination cause, DID status, additional metadata, and other fields. Persisting call logs at this level enables forensic traceability and provides a foundation for reconciling system-generated analytics with underlying call activity.

The DID Metric Record 524 can capture health indicators for each Direct Inward Dialing (DID) number. Fields may include DID metric identifier, DID identifier, call success rate, answer rate, rejection rate, error rate, block rate, engagement score, health score, latency mean, geographic coordinates (latitude/longitude or polygon ID), other metadata, descriptions, and other fields. This record allows the system to track performance at the individual DID level, informing allocation, substitution, or remediation strategies.

The Heatmap Record 526 can store geographic visualization data produced by the recon module and report generator. Fields may include heatmap identifier, heatmap ID, LATA ID, associated call volume, color intensity values, call volume, population values, carrier distribution percentages, other metadata, descriptions, and other fields. By persisting heatmap data in a structured form, the system can regenerate vector-encoded heatmaps across different zoom levels and preserve alignment with associated selection criteria.

The Campaign Analytics Record 528 can store data tied to specific outbound campaigns. Fields may include campaign identifier, campaign name, start date, end date, assigned DIDs, total calls, block rate, conversion rate, compliance flags, orther metadata, descriptions, and other fields. This record allows clients 402 to correlate procurement and allocation decisions with business outcomes, improving accountability and planning for future campaigns.

The Fraud/Risk Record 530 can persist information relating to potential abuse, spoofing, or mislabeling. Fields may include fraud identifier, risk record ID, fraud score, suspicious pattern flags, call fingerprints (hash or feature vectors), rejection rate, engagement scores, carrier feedback, other metadata, descriptions, and other fields. This structured fraud/risk record ensures that anomalies detected in reputation monitoring, call success trends, or AI-enrichment analysis can be logged, tracked, and acted upon.

The Outbound Call Metrics Record 532 can store aggregate metrics relating to metric record ID, outbound campaigns, including total outbound calls, average call duration, answer rate, latency means, carrier distribution percentages, error rates, other metadata, descriptions, and other fields. These records support longitudinal analysis of outbound traffic and provide benchmarks for adjusting identifier allocation across service boundaries.

Finally, the Records Data Table 534 can serve as a unifying structure for joining and cross-referencing related identifiers across the various records. Fields may include call record ID, originating calling party identifiers, received calling party identifiers, LATA ID, call count, population value, threshold flag, carrier ID, carrier feedback, NPA code, NPA rank, fraud score, routing score, DID assignment, carrier ID, traffic volume values, recommended quantity, procurement status indicators, idempotency token, audit hash, compliance flags, orther meta data, descriptions, and other fields. This table provides the relational glue between transactional records, analytic records, and procurement outcomes, ensuring that each stage of the system's operation remains fully auditable.

An advantage of the extended schema illustrated in FIG. 19B is that it unifies operational, analytic, and compliance data in a single structured framework. Prior approaches often treated call logs, DID health, fraud detection, and procurement activity as siloed datasets, creating inefficiencies and gaps in traceability. By contrast, the present invention centralizes these data domains into one relational schema, enabling identifier allocation decisions to be informed simultaneously by call performance, campaign outcomes, fraud signals, and compliance requirements.

From a practical perspective, the database structure of FIGS. 19A-19B ensures that every stage of the system—from raw call record ingestion to quantity calculation, from AI-enriched fraud scoring to automated procurement—remains connected through persistent, queryable data. This design reduces latency, improves the reliability of machine-actionable outputs, and provides a tamper-evident audit trail suitable for regulatory compliance and enterprise-scale deployment.

Referring to FIG. 20, there is illustrated an exemplary flowchart of a system for allocating originating calling party identifiers based on call traffic and population data. The system shown is implemented across the interconnected computing resources described in FIGS. 13-18, with results persisted in the structured databases illustrated in FIGS. 19A-19B.

In step 1002, a network interface of the number sentry server 202 or another remote processing resource is configured to receive a plurality of call records from one or more communications networks 228. Each record includes an originating calling party identifier, a terminating calling party identifier, a timestamp, and a call count. These records are not simply abstract inputs; they originate from live traffic captured by the call generation server 204 and test rack of computing devices 222B (see FIGS. 13-16). As received, the call records are written into the originating calling party identifier record 506 and communications network record 510 within the structured databases 212A/212B (FIG. 19A), providing durable storage for subsequent analysis.

In step 1006, the classification module 1004 executes a column cardinality analysis to distinguish originating identifiers from terminating identifiers. The results of this analysis are persisted into the calling identifier status record 514 and cross-referenced with the client record 504 to maintain attribution to the correct user 402. Anchoring classification results in the database structure ensures that identifier provenance is preserved and auditable, rather than being an ephemeral logical step as in prior approaches.

In step 1010, the recon module 1008 processes the terminating identifiers to generate carrier heatmap data and destination heatmap data. These heatmaps are persisted into the report record 512 and associated with report type record 516, allowing downstream retrieval by the reporting module and visualization as shown in FIGS. 8-12. By persisting heatmaps in structured tables, operators can correlate carrier distribution trends with specific risk factors recorded in the risk factor record 508.

In step 1014, the mapping module 1012 associates the terminating identifiers with telecommunications-defined service boundaries, such as regulatory partitions or interconnection boundaries. These associations are cross-linked within the communications network record 510 and the originating calling party identifier record 506, creating durable mappings that can be used for regulatory audits or compliance reports. Prior approaches performed mapping heuristically and discarded intermediate states; in contrast, the present invention ensures mappings are retained and queryable.

In step 1018, a traffic volume module 1016 computes traffic volumes per boundary, drawing from aggregated call counts stored in the originating calling party identifier record 506. The computed volumes are written back to the risk factor record 508, where they can be combined with population values retrieved from the population datastore. This linkage creates a concrete data pipeline: raw calls from the network→structured database fields→computed volumes-→stored risk-adjusted indicators.

In step 1020, a numbering plan partition selector retrieves candidate numbering plan partitions for each boundary. These partitions are selected by querying stored data in the report type record 516 and applying deterministic rules maintained in non-transitory memory. The results are linked back into the report record 512, ensuring that allocation decisions are preserved alongside their underlying data. Unlike prior approaches, where partition choices were ad hoc, the present invention enforces reproducibility through persistent database ties.

In step 1022, the quantity calculator computes the required number of originating calling party identifiers for each service boundary. This computation uses weighted combinations of stored data, such as call volumes, population values, and other data. The computed quantities are rounded, range-limited, and persisted for subsequent procurement.

In step 1024, the report generator produces two outputs. First, a machine-actionable file is generated in a structured format that lists each required quantity, boundary, and selected numbering plan partition. This file is directly ingestible by an automation client operating on the Number Sentry server 202, thereby eliminating manual reformatting. Second, the generator produces a vector-encoded heatmap report, which draws on the persisted carrier and destination heatmaps in the report record 512. Both outputs are distributed through the global network 250 to client computing devices 222A/222C, allowing users 402 to review allocation recommendations in real time.

When the volume of input call records exceeds a dataset threshold, the system applies a stratified sampling policy. This policy is not merely a statistical exercise but is applied against stored call distributions in record 506, with computed sample allocations persisted in the database for traceability. The pooled residual sample ensures that underrepresented boundaries remain visible in the report record 512, preventing allocation blind spots. By leveraging stored data structures and distributed network execution, the system achieves both efficiency and transparency in large-scale identifier allocation.

Accordingly, FIG. 20 illustrates more than an abstract sequence of steps. Each module is integrated into the network architecture of FIGS. 13-18 and the database schema of FIGS. 19A-19B, producing tangible outputs that inform procurement workflows. This integration demonstrates a technical application: real network traffic is captured, structured into persistent records, processed across distributed servers, and returned as actionable allocation recommendations that reduce provisioning latency and protect brand reputation.

Figure 21:
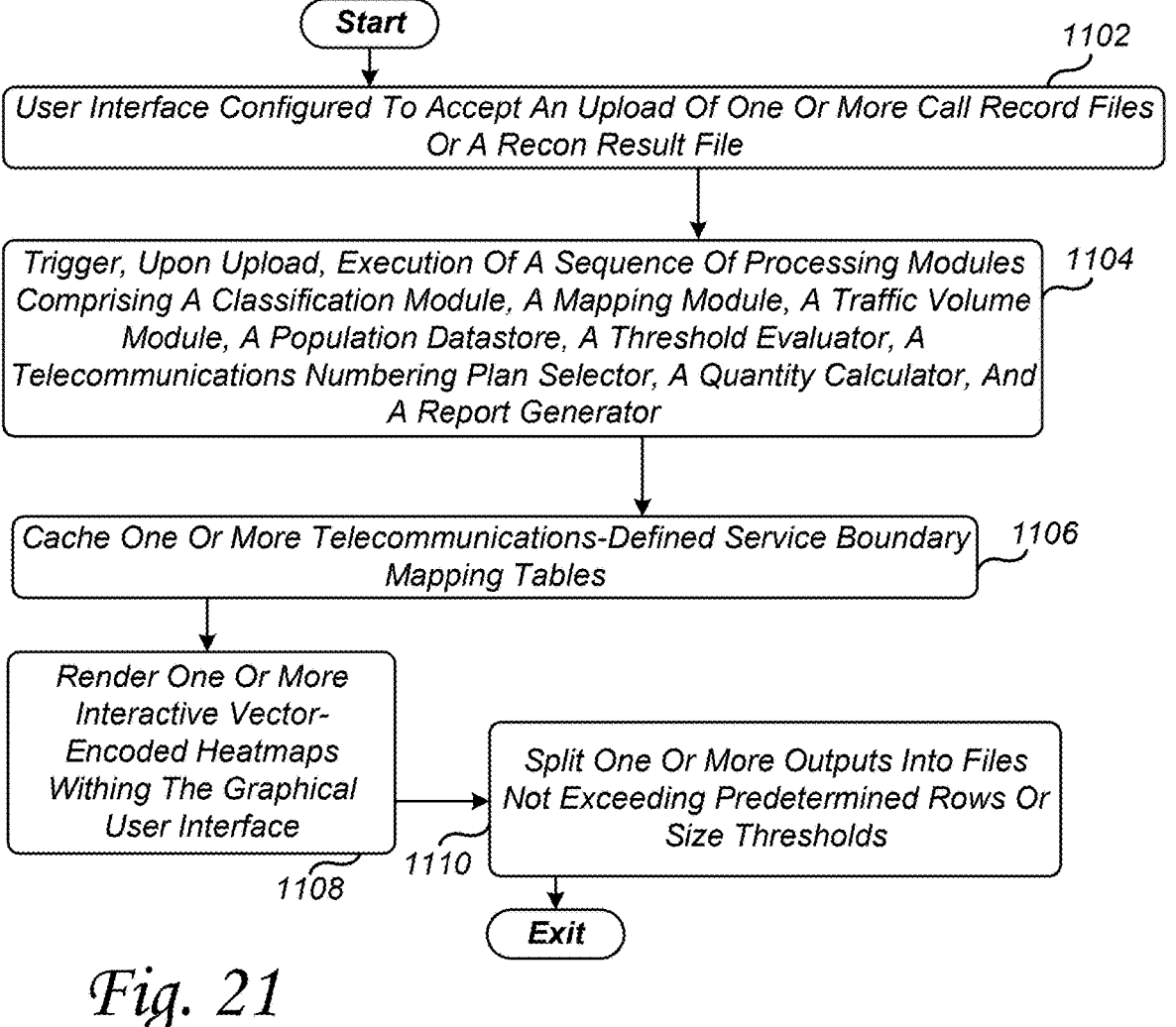

Referring to FIG. 21, there is illustrated a flowchart of an exemplary system for allocating originating calling party identifiers using a graphical user interface coupled to distributed computing resources. The system operates across the number sentry server 202, the call generation server 204, the answer server 206, the AI information system 208, and associated databases 212A/212B, as shown in FIGS. 13-19B, and provides actionable outputs to client computing devices 222A/222C connected through the global network 250.

In step 1102, a web server hosts a graphical user interface (GUI) configured to accept the upload of one or more call record files or previously generated recon result files. When a user 402 selects and uploads such files from a laptop or other computing device 222A/222C, the system stores the raw inputs within structured records in the database 212A/212B. For example, uploaded call records are persisted into the originating calling party identifier record 506 and the communications network record 510, ensuring that the uploaded data is not transient but becomes part of a queryable, auditable dataset.

In step 1104, the upload event automatically triggers execution of a processing pipeline consisting of a classification module, mapping module, traffic volume module, population datastore, threshold evaluator, numbering plan partition selector, quantity calculator, and report generator. Each of these modules has already been described in relation to the workflow of FIG. 20, but here the execution is user-initiated through the GUI and coordinated in real time. The results of intermediate steps are written back into database records, such as the risk factor record 508 and report record 512, thereby grounding each computational stage in persistent storage rather than treating the workflow as an abstract data sequence.

In step 1106, the system caches one or more service boundary mapping tables directly into non-transitory memory on the number sentry server 202 or associated servers 204/206. These mapping tables correspond to telecommunications-defined service boundaries described in FIGS. 19A-19B (e.g., regulatory partitions, numbering plan partitions). By caching locally rather than repeatedly querying external data sources, the system reduces latency and resource consumption. This caching strategy is supported by the communications network record 510, which holds identifiers for regulatory and service boundary associations that can be referenced locally during processing.

In step 1108, the system renders one or more interactive vector-encoded heatmaps within the GUI. These heatmaps are generated from the persisted carrier and destination heatmap data and stored in the report record 512. The rendering is designed to preserve label legibility across multiple zoom levels while reducing memory utilization, ensuring usability even for large datasets spanning thousands of originating and terminating identifiers. Unlike static reports in prior approaches, the present system generates vector-encoded graphics directly tied to structured database entries, allowing users to drill into details dynamically. The GUI also provides download report controls so that users can select output formats, including vector-encoded PDFs or spreadsheet worksheets, both of which maintain structural fidelity for automated workflows.

In step 1110, the system splits processing outputs into manageable files that do not exceed predefined row or size thresholds. These thresholds align with system resource limits and compliance constraints of downstream automation clients that ingest the results. The splitting logic operates against stored entries in the report type record 516, which specifies the expected format and constraints for output files. This approach ensures compatibility with procurement systems and reduces the likelihood of processing failures caused by oversized datasets.

In operation, the steps of FIG. 21 demonstrate a practical technical improvement. By anchoring the upload, caching, rendering, and file-splitting operations in the interconnected server ecosystem of FIGS. 13-18 and the structured databases of FIGS. 19A-19B, the system achieves real-world performance benefits: reduced latency through caching, improved visualization through vector rendering, enhanced compatibility through controlled file splitting, and transparent traceability through persistent database entries. These benefits extend beyond mere data manipulation, enabling enterprises to monitor call traffic, allocate identifiers, and protect brand reputation with a higher level of technical reliability and efficiency than prior approaches.

Figure 22:
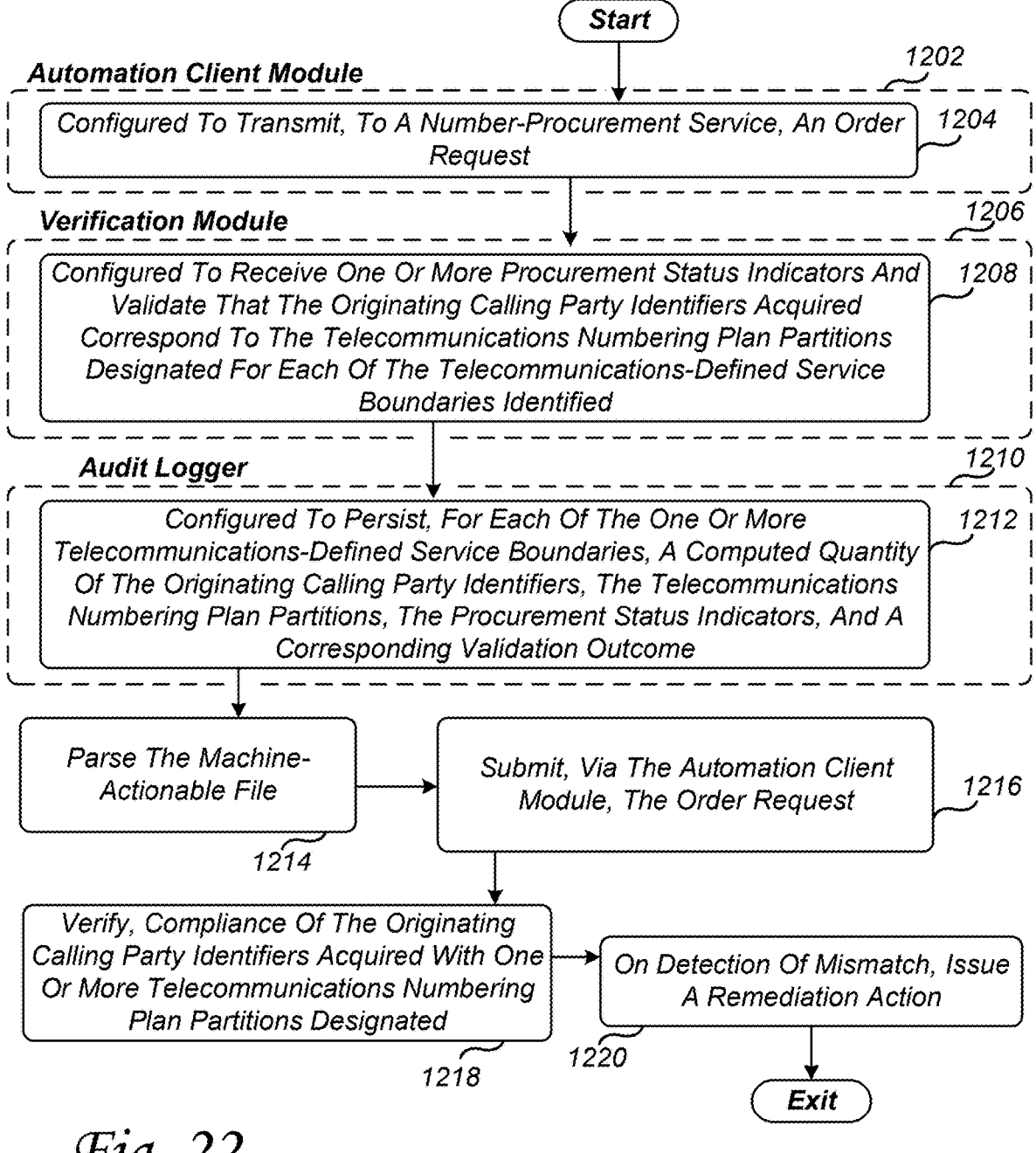

Referring to FIG. 22, there is illustrated a flowchart of an exemplary system for allocating originating calling party identifiers through automated procurement, validation, and audit logging. The flow is carried out within the network of interconnected components previously described in FIGS. 13-18, operating in concert with the structured databases of FIGS. 19A-19B. By grounding each functional step in this distributed infrastructure, the system provides a practical mechanism for reducing provisioning latency, enforcing numbering compliance, and ensuring tamper-evident traceability of procurement activity.

In step 1204, an automation client 1202 is configured to generate and transmit order requests to a number-procurement service. Each order request is based on the machine-actionable file output by the report generator of FIGS. 20-21, which includes, for each telecommunications-defined service boundary (e.g., regulatory partitions, billing boundaries, interconnection boundaries), a computed quantity of originating calling party identifiers and one or more telecommunications numbering plan partitions. The automation client retrieves this data directly from the report record 512 and the originating calling party identifier record 506 stored in the databases of FIGS. 19A-19B, ensuring that orders are grounded in verified and persistent data structures rather than transient processing streams.

In step 1208, a verification module 1206 receives procurement status indicators returned by the number-procurement service. These indicators may specify whether an order was accepted, partially fulfilled, or rejected. The module cross-references each returned identifier against the designated numbering plan partitions stored in the communications network record 510 and risk factor record 508. By validating acquisitions against these database entries, the system ensures that identifiers are compliant with the regulatory or routing rules associated with their respective service boundaries.

In step 1212, an audit logger 1210 persists, for each service boundary, the computed quantity of identifiers requested, the partitions selected, the procurement status indicators, and the validation outcomes. These entries are stored in a tamper-evident structure that may incorporate cryptographic hashes of the order payloads and confirmation payloads. The records are written into the audit log tables of the database 212A/212B, ensuring durable, queryable traceability that can withstand regulatory review or compliance audits.

In step 1214, the system parses the machine-actionable file generated in earlier stages, using its structured format (e.g., JSON, XML, or delimited tables) to extract each service boundary entry, its associated selection criteria, and the recommended numbering partitions. Parsing is performed by the number sentry server 202 or other processing resources within the global network 250, and results are mapped into normalized database tables for subsequent retrieval.

In step 1216, the parsed data is used to submit order requests via the automation client 1202. Each submission is packaged with idempotency tokens to prevent duplication and incorporates a rate-limited backoff policy to comply with provider thresholds while maintaining efficient ordering times. Unlike prior approaches that required manual resubmission, this automated retry and pacing mechanism ensures consistent throughput while reducing operator burden.

In step 1218, the verification module 1206 cross-checks procurement confirmations with the stored partitions. This involves querying the numbering plan partition tables and other data to ensure that the identifiers acquired are aligned with the partitions originally designated. Discrepancies, such as identifiers assigned to a different geographic or regulatory boundary, are flagged immediately.

In step 1220, when a mismatch is detected, the system initiates a remediation action. This can include canceling the order, substituting an equivalent partition of equal or higher priority, or generating an operator alert that is communicated to a client device 222A/222C through the graphical user interface. These remediation pathways ensure continuity of provisioning without waiting for manual interventions, improving both speed and reliability.

By executing this sequence through the automation client 1202, verification module 1206, and audit logger 1210, the system provides more than abstract ordering logic. It integrates real data from persistent records, utilizes a global network of interconnected servers and computing devices, and outputs tamper-evident, regulator-ready audit trails. The result is a concrete technical improvement: provisioning latency is reduced relative to manual processes, numbering compliance is programmatically enforced, and procurement activity is stored in durable, verifiable form. These enhancements enable enterprises to scale identifier allocation with confidence in both efficiency and compliance, distinguishing the present invention from prior approaches that relied on manual workflows or unverified ordering processes.

Referring to FIG. 23, there is illustrated a flow diagram highlighting exemplary dependent functionalities that enhance the core identifier allocation process. Each dependent function integrates directly into the architecture of servers, computing devices, and persistent databases, thereby ensuring concrete technical improvements in efficiency, compliance, and data reliability.

In step 1302, the classification module 1004 assigns the originating calling party identifiers to the column exhibiting lower cardinality and the terminating calling party identifiers to the column exhibiting higher cardinality. This differentiation is implemented by scanning call record fields stored in the call record tables of the database 212A/212B and applying a column cardinality analysis. By anchoring the classification in measurable dataset properties and persisting results into structured database records, the system avoids heuristic or abstract identification. This concrete mechanism improves the speed and reliability of downstream traffic analysis and ensures that later modules receive properly distinguished identifier categories.

In step 1306, the numbering plan partition selector 1304 resolves tie conditions between telecommunications numbering plan partitions using a deterministic prioritization rule stored in non-transitory memory. This prioritization rule can be pre-defined by regulatory hierarchy, geographic preference, enterprise policy, or other tie-breaking approaches, as may be required and/or desired in a particular embodiment. By embedding deterministic rules into persistent storage and applying them systematically across competing partitions, the system achieves predictable, reproducible tie-breaking. This not only reduces provisioning latency but also prevents inconsistent operator-driven decisions that plagued prior approaches.

In step 1310, the quantity calculator 1308 applies configurable weights to the selection criteria values, scales a weighted sum, and rounds to the nearest integer subject to a minimum and maximum quantity. These operations are implemented against stored population values, traffic counts, subscriber records, and other data. By computing quantities through normalized weighting and bounded rounding, the system ensures that identifier orders scale proportionally with demand while respecting operator-defined safeguards. This reduces both under-ordering (leading to service disruptions) and over-ordering (wasting identifiers and cost).

In step 1314, the threshold evaluator 1312 applies configurable thresholds based on selection criteria values such as traffic share, subscriber counts, or population thresholds. These thresholds are not hardcoded but are dynamically stored in the non-transitory memory for update by user 402 through the graphical interface. In practice, this allows enterprises to adjust provisioning sensitivity in response to changing market conditions or regulatory constraints, ensuring the system remains adaptive while preserving data integrity in the databases.

In step 1318, the recon module 1316 generates carrier heatmap data and destination heatmap data, persisting these results in a cloud datastore. The cloud datastore may be implemented on AMAZON WEB SERVICES (AWS), MICROSOFT AZURE, or GOOGLE CLOUD PLATFORM (GCP). Persisting heatmaps at scale enables multi-user access, replication, and long-term retention of traffic intelligence. Unlike prior approaches that generated transient visuals only for on-screen display, the present invention transforms raw call records into durable, queryable heatmap datasets that can be analyzed over time and integrated into compliance audits or business forecasting.

In step 1322, the report generator 1320 outputs both the vector-encoded heatmap report and the machine-actionable file in formats that include vector-encoded portable document format (PDF) and spreadsheet worksheet formats. By outputting in these structured, machine-readable forms, the reports preserve label legibility at multiple zoom levels while also enabling direct ingestion into automated number-ordering workflows. This dual output—human-interpretable and machine-actionable—bridges the gap between analytic review and downstream automation, further reducing manual intervention.

In operation, the dependent functionalities of FIG. 23 illustrate how modular enhancements in classification, selection, calculation, evaluation, data persistence, and reporting yield practical technical improvements in provisioning reliability, compliance enforcement, and user efficiency. By grounding each enhancement in persistent databases and interconnected servers, the invention ensures that these modules operate as concrete, machine-implemented processes rather than abstract concepts.

Referring to FIG. 24, there is illustrated a continuation of the automated identifier ordering and validation system, emphasizing dependent functionalities that improve auditability, scaling for toll-free identifiers, and reconciliation logging. Each step leverages the distributed resources of FIGS. 13-18 and the structured databases of FIGS. 19A-19B, thereby ensuring that the system functions as a concrete, machine-implemented framework rather than an abstract process.

In step 1402, the audit logger 1210 stores one or more cryptographic hashes of the order payloads and corresponding confirmation payloads. These hashes are written into the audit log tables of the database 212A/212B alongside the original order data. By hashing both outbound requests and inbound confirmations, the system creates a tamper-evident reconciliation mechanism that can be independently verified during compliance reviews. Unlike prior approaches that relied only on sequential transaction IDs, the use of cryptographic hashes ensures that even subtle payload alterations can be detected. This improves brand security and regulatory reliability by embedding verifiable integrity checks into the procurement record.

In step 1404, a quantity calculator 1308 computes a recommended quantity of toll-free originating calling party identifiers using a scaling rule distinct from the algorithms applied to geographic or regulatory service boundaries. This specialized scaling accounts for the unique traffic patterns, population factors, and demand elasticity of toll-free services. The calculation references toll-free tables stored in the database 212B, which include historic usage data and scaling coefficients. Once computed, the recommended toll-free quantity is injected into the order payload assembled by the automation client 1202. By programmatically adjusting for toll-free conditions, the system ensures efficient allocation of identifiers across multiple service categories, reducing over-ordering while maintaining readiness for consumer call demand.

In step 1406, the verification module 1206 maintains a reconciliation log that cross-references each procured identifier with its corresponding procurement confirmation. This log is persisted in structured form within the reconciliation records of database 212A/212B. The module applies a stored tolerance threshold, and when mismatches exceed this threshold—such as identifiers missing confirmations or misaligned with numbering partitions—it automatically flags the discrepancies for operator review. Notifications can be routed to a client computing device 222A/222C through the graphical user interface, allowing user 402 to intervene. This concrete reconciliation process ensures that errors are surfaced quickly and that operators are presented with actionable alerts rather than raw transaction data.

Together, the enhancements of FIG. 24 illustrate how cryptographic hashing, toll-free scaling, and structured reconciliation logs transform the identifier procurement process into a verifiable, adaptive, and resilient workflow. By anchoring each function in persistent storage and distributed server execution, the invention demonstrates technical improvements in security, compliance, and operational scalability.

Referring to FIG. 25, there is illustrated a flowchart of an exemplary method of using the identifier allocation system described in FIG. 20. This method builds upon the distributed architecture of FIGS. 13-18 and the structured databases of FIGS. 19A-19B, ensuring that each step operates within a practical, machine-implemented environment rather than as an abstract algorithm.

In step 1502, the system begins by ingesting, via the network interface, a plurality of call records. These call records can include an originating calling party identifier, a terminating calling party identifier, a timestamp, and an associated call count. The ingestion process occurs through network-facing components of the Number Sentry server 202 or call generation server 204, and the records are persisted directly into the call record tables of database 212A/212B. By writing the raw data into structured storage, the system enables subsequent modules to query and transform the records reliably across multiple processing cycles.

In step 1504, the classification module 1004 applies a column cardinality analysis to distinguish terminating calling party identifiers from originating calling party identifiers. This analysis is carried out against the ingested call record tables, where the module identifies the column with higher cardinality as the terminating identifiers and the column with lower cardinality as the originating identifiers. Results are persisted as metadata records linked back to the original call record entries. This grounding in actual stored data demonstrates the practical execution of the classification, ensuring that the output feeds directly into subsequent mapping and traffic analysis stages.

In step 1506, the recon module 1008 generates and persists carrier heatmap data and destination heatmap data derived from the terminating identifiers. This involves aggregating call volumes by carrier and geographic region, rendering them into vector-ready formats, and storing them in a cloud datastore accessible across the global network 250 (e.g., AWS, Azure, or GCP). Persisting the heatmaps ensures that analytics can be retrieved for both immediate visualization and long-term comparative analysis, overcoming limitations of prior approaches that produced only transient outputs.

In step 1508, the mapping module 1012 associates the terminating identifiers with one or more telecommunications-defined service boundaries, such as regulatory partitions, billing boundaries, or interconnection zones. This mapping is performed using boundary mapping tables stored in database 212B. By referencing structured, persistent tables rather than ephemeral lookups, the mapping process becomes reproducible and traceable, enabling consistent decision-making across different provisioning cycles.

In step 1510, the traffic volume module 1016 computes traffic share values for each service boundary, while the population datastore provides associated demographic values such as subscriber counts or population size. The combined outputs form the selection criteria values used for threshold evaluation. These computed values are stored in traffic volume records and population tables of database 212B, ensuring that the analytics are anchored in durable, queryable data for future audits and adjustments.

In step 1512, the threshold evaluator 1312 determines which service boundaries satisfy configured selection criteria such as traffic volume thresholds, population cutoffs, or wireless subscriber counts. The evaluator retrieves its threshold parameters from non-transitory memory, where they are dynamically updateable by user 402 through the graphical interface. Results are persisted as boundary evaluation records in database 212A, ensuring auditability of why certain boundaries were selected or excluded.

In step 1514, the numbering plan partition selector 1304 identifies a set of applicable telecommunications numbering plan partitions for each qualified boundary. The selector retrieves candidate partitions from partition tables, sorts them based on the configured selection criteria, and applies deterministic tie-breaking rules stored in memory. Outputs are logged as partition assignment records, ensuring that downstream ordering can be traced back to specific rules and datasets.

In step 1516, the quantity calculator 1308 computes the required number of originating identifiers for each selected boundary. This is achieved by applying weights to the traffic and population values, scaling the result to a normalized range, and rounding to enforce a minimum and maximum value. These computations are persisted as quantity allocation records within the database, providing a reproducible log of how provisioning levels were determined.

Finally, in step 1518, the report generator 1320 produces two types of outputs: (i) a machine-actionable file containing the computed quantities, partitions, and criteria values in a structured format (e.g., JSON, XML, or CSV), and (ii) a vector-encoded heatmap report for visual review by user 402. These outputs are both displayed through the graphical user interface and stored in the report records 512 of the database. The dual output ensures seamless downstream integration with automation clients while providing human-readable artifacts for compliance and planning.

In operation, the method of FIG. 25 illustrates a fully implemented technical workflow where raw call records are ingested, classified, mapped, evaluated, calculated, and reported within a distributed network and structured database environment. Unlike prior approaches that relied on static spreadsheets or manual provisioning, the present invention executes each step as a machine-driven process, grounded in persistent data storage and scalable cloud infrastructure. This ensures not only technical improvements in provisioning speed and accuracy but also compliance-ready traceability.

Referring to FIG. 26, there is illustrated a flowchart of an exemplary method of using the system of FIG. 21 through the graphical user interface hosted by the web server. The method integrates the functional modules of FIGS. 20-22 with the persistent data structures of FIGS. 19A-19B, providing a practical, machine-implemented workflow that couples user interaction with automated provisioning analytics.

In step 1602, the system receives, via the graphical user interface (GUI), a user authentication input. This input can include a username, password, token, or multifactor authentication credential. The authentication is validated against entries in the client record 504 and user access control tables of database 212A/212B. Once authenticated, the user 402 gains access to the secure interface for uploading call record data and monitoring analytics results.

In step 1604, the GUI enables the user 402 to upload one or more call record files or recon result files. These files are received by the web server and written into the call record ingestion tables of the database, where metadata such as upload timestamp, file size, and file integrity hash are also recorded. By grounding the uploads in persistent storage, the system ensures that analytic modules can access standardized, validated datasets without depending on transient session data.

In step 1606, the system initiates execution of the processing sequence comprising the classification module, mapping module, traffic volume module, population datastore, threshold evaluator, numbering plan partition selector, quantity calculator, and report generator. Each module executes on distributed servers such as the number sentry server 202 or call generation server 204, with results persisted to their respective tables (e.g., traffic volume records, partition assignment records, quantity allocation records) within the structured databases of FIGS. 19A-19B. Unlike prior approaches that executed analytic steps manually in separate silos, the present system triggers the sequence automatically on file upload, improving responsiveness and eliminating redundant operator actions.

In step 1608, the system caches one or more telecommunications-defined service boundary mapping tables in non-transitory memory. These tables, originally stored in the database 212B, include associations between identifiers and regulatory or geographic boundaries. Caching them locally reduces round-trips to the external datastore, lowering latency during mapping and partition selection. By implementing this caching at runtime, the system achieves a concrete technical improvement in efficiency, particularly when handling large-scale call datasets.

In step 1610, the processor generates the machine-actionable file and/or one or more vector-encoded heatmap reports. The machine-actionable file is structured (e.g., JSON, XML, CSV) for direct ingestion by automation clients, while the heatmap reports are rendered in vector formats such as PDF or SVG for interactive use within the GUI. Both file types are persisted in the report records 512 of the database, ensuring that they can be retrieved for future review or audit.

In step 1612, the processor splits one or more processing outputs into files not exceeding predetermined row or size thresholds. This ensures compatibility with downstream systems that impose upload or processing limits, such as carrier provisioning platforms. Metadata regarding the split (e.g., file sequence, row count, and hash values) are logged into the report type record 516 or other suitable records for traceability. This step provides a practical safeguard against operational errors caused by oversized files.

Finally, in step 1614, the GUI renders one or more download report controls corresponding to the machine-actionable file and heatmap outputs. These controls allow user 402 to download the results directly from the server while maintaining data integrity. The GUI also updates to display job completion status, errors (if any), and links to historical reports stored in the database. By linking real-time rendering with persistent data, the system delivers both immediacy and continuity of access, ensuring that outputs are actionable without further manual reformatting.

Through the method illustrated in FIG. 26, the present invention ties together secure authentication, structured ingestion, automated analytics, caching for efficiency, managed file output, and interactive rendering into a unified, machine-executed workflow. This tightly integrated approach provides technical improvements in latency, reliability, and compliance support that distinguish it from prior approaches relying on manual file transfers or isolated analytic steps.

Referring to FIG. 27, there is illustrated a flowchart of an exemplary method of using the automated identifier ordering and validation system described in FIG. 22. This method integrates the automation client 1202, verification module 1206, and audit logger 1210 with the structured databases of FIGS. 19A-19B and the distributed resources of FIGS. 13-18, ensuring that each step is executed in a real, technical environment.

In step 1702, the system begins by ingesting, via the processor, the machine-actionable file generated by the report generator of FIGS. 20 and 25. This file is structured in a standardized format such as JSON, XML, or CSV, and includes the computed quantities, selection criteria, and assigned telecommunications numbering plan partitions for each service boundary. On ingestion, the contents are parsed and written into the order preparation tables of database 212A/212B, ensuring that the automation client 1202 can retrieve normalized data for order submission.

In step 1704, the automation client 1202 transmits the order request to a number-procurement service. The request includes the computed quantities of originating calling party identifiers and the associated numbering plan partitions retrieved from the database records. The transmission includes safeguards such as idempotency tokens and rate-limited backoff policies, which are logged into the transaction record tables to avoid duplication and maintain compliance with provider submission limits. Unlike manual procurement processes, this automated submission reduces latency and prevents ordering errors.

In step 1706, the system receives procurement status indicators from the number-procurement service. These may indicate success, partial fulfillment, delay, or rejection. The processor writes each status indicator into the procurement status records of database 212B, associating it with the originating request payload stored in step 1702. Persisting the status results in durable traceability that can be queried by both automated processes and human operators.

In step 1708, the verification module 1206 performs a compliance check, verifying that the procured identifiers match the designated numbering plan partitions. The module queries the partition assignment records of database 212B and cross-references them against the identifiers confirmed in the status payloads. When a mismatch is detected—such as identifiers falling outside the assigned regulatory boundary—the verification module records the discrepancy and flags it for remediation. This practical check enforces compliance rules automatically rather than relying on operator review after deployment.

In step 1710, the audit logger 1210 records the results of the ordering process. Logged data includes the computed quantity, the designated numbering partitions, the procurement status indicators, and the corresponding validation outcome. These logs are persisted, which may also incorporate cryptographic hashes for tamper-evident reconciliation. The audit logs provide a durable, regulator-ready trail of procurement activity, ensuring transparency and accountability.

Through the method illustrated in FIG. 27, the present invention demonstrates a fully implemented ordering and validation workflow. Each step is anchored in structured database storage, executed by distributed network servers, and results in machine-actionable outputs. Unlike prior approaches that required manual ordering and reconciliation, this invention provides automated provisioning, compliance enforcement, and tamper-evident audit logging, delivering measurable improvements in efficiency, reliability, and trustworthiness.

Referring to FIG. 28, there is illustrated an exemplary embodiment of how the system manages different forms of telecommunications numbering plan partitions. In this embodiment, step 1802 is implemented to ensure that identifier allocation is flexible across diverse partitioning schemes used in telecommunications networks, data routing environments, and service allocation workflows.

In operation, the numbering plan partition selector 1304 retrieves applicable partitions from the partition tables of database 212A/212B, which were introduced in FIGS. 19A-19B. These tables are populated and maintained using inputs from telecommunications standards bodies, carrier interconnection data, and enterprise-defined configuration files. By persisting partitions in structured records, the system provides a reliable foundation for automated lookups during identifier allocation.

As illustrated, the partitions can include a numbering plan area (NPA), commonly known as an area code, which defines geographic service boundaries. NPAs are stored with metadata such as region, jurisdictional authority, and assignment history. The system can also operate at the finer granularity of a numbering plan area-exchange block (NPA-NXX), which maps identifiers down to the local exchange level. These records allow the system to allocate identifiers with greater geographic precision, ensuring compliance with both regulatory boundaries and consumer demand.

Beyond traditional telephone numbering, the invention supports allocation against modern network identifiers. For example, the partition selector can process an Internet Protocol (IP) address or IP address block, enabling allocation of identifiers for VoIP endpoints or hybrid communication services. These IP blocks are stored in the database with subnet masks, assignment ranges, and carrier ownership metadata, ensuring that allocation respects both routing efficiency and carrier interconnection rules.

In other embodiments, the partitioning may be based on Uniform Resource Locator (URL)-based identifier groupings, which are used in web-integrated communications or platform-based calling services. The URL groupings are persisted in the database alongside DNS mappings and service provider metadata, ensuring that identifier allocation can extend to modern, web-based communication environments.

The system can further support other telecommunications-defined partitions for routing or service allocation, including but not limited to mobile network codes, international exchange zones, or compliance-driven partitions such as lawful intercept domains. These entries are stored with configurable metadata fields, allowing enterprises or regulators to add new partition definitions without altering the underlying system architecture.

By incorporating NPAs, NPA-NXX blocks, IP address blocks, URL groupings, and other partitions into its structured workflow, the system provides a practical and extensible method of identifier allocation. Unlike prior approaches that were limited to static geographic area codes, the present invention ensures that identifier assignment is adaptive across multiple communication technologies and service models.

The use of database-stored partition tables, combined with distributed validation and ordering modules, ensures that partition selection is carried out as a machine-executed, persistent, and verifiable process. This yields technical improvements in flexibility, compliance, and scalability, enabling the system to allocate identifiers across both legacy telephony and modern IP-based communication infrastructures.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer-readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for allocating originating calling party identifiers based on call traffic and population data, the system comprising:

a network interface configured to receive a plurality of call records, each call record comprising an originating calling party identifier, a terminating calling party identifier, a timestamp, and an associated call count;

a processor;

a non-transitory memory storing instructions that, when executed by the processor, cause the system to implement:

a classification module configured to distinguish the terminating calling party identifiers from the originating calling party identifiers within the plurality of call records by applying a column cardinality analysis, wherein the classification module assigns a column exhibiting a greater count of unique entries as the terminating calling party identifiers and assigns a column exhibiting a lesser count of unique entries as the originating calling party identifiers;

a recon module configured to generate carrier heatmap data and destination heatmap data from the terminating calling party identifiers and to persist the carrier heatmap data and the destination heatmap data;

a mapping module configured to associate the terminating calling party identifiers with one or more telecommunications-defined service boundaries, each of the telecommunications-defined service boundaries comprising at least one of: a regulatory partition, an industry-defined partition used for routing, a number assignment boundary, a billing boundary, an interconnection boundary, a jurisdictional rating boundary, or a compliance boundary;

a traffic volume module configured to compute, for each of the telecommunications-defined service boundaries, a traffic volume value based on the associated call counts;

a population datastore storing a population value for each of the telecommunications-defined service boundaries;

a threshold evaluator configured to list each of the telecommunications-defined service boundaries identified that satisfy one or more selection criteria, the one or more selection criteria comprising at least one of: a traffic volume threshold, a population threshold, a wireless subscriber count, a telecom consumer count, or another configurable service demand indicator;

a numbering plan partition selector configured, for each of the telecommunications-defined service boundaries identified, to:

(i) retrieve one or more telecommunications numbering plan partitions applicable to each of the telecommunications-defined service boundaries identified;

(ii) sort the one or more telecommunications numbering plan partitions based on at least one of the selection criteria;

(iii) resolve ties between the one or more telecommunications numbering plan partitions using a deterministic rule stored in the non-transitory memory; and (iv) output a set of telecommunications numbering plan partitions for each of the telecommunications-defined service boundaries identified;

a quantity calculator configured to compute, for each of the telecommunications-defined service boundaries identified, a required quantity of originating calling party identifiers as a weighted combination of the one or more selection criteria values, the required quantity being scaled to a predetermined range and rounded to an integer while enforcing a minimum quantity and a maximum quantity; and a report generator configured to output (i) a machine-actionable file comprising, for each of the telecommunications-defined service boundaries identified, the required quantity, the one or more selection criteria values, and the set of telecommunications numbering plan partitions determined by the numbering plan partition selector, and (ii) a vector-encoded heatmap report;

wherein, when a size of the plurality of call records exceeds a dataset threshold, the system reduces processing time and memory utilization by applying a stratified sampling policy defined with respect to the telecommunications-defined service boundaries, the stratified sampling policy comprising:

(i) computing a base sample size using a binomial proportion formula evaluated at a traffic-share cutoff;

(ii) allocating per-boundary sample counts proportionally to computed shares of each of the telecommunications-defined service boundaries, the shares determined from the call records, subject to a per-boundary minimum floor and a borderline boost within a predetermined margin of the cutoff; and (iii) generating a pooled residual sample comprising records from each of the telecommunications-defined service boundaries that do not satisfy the selection criteria, and incorporating the pooled residual sample into the stratified sampling policy to maintain representation across all boundaries, thereby ensuring inclusion of the telecommunications-defined service boundaries that satisfy the selection criteria while maintaining a target error margin at the cutoff; and wherein the machine-actionable file is generated in a structured format suitable for direct ingestion by an automation client configured to procure originating calling party identifiers, the structured format eliminating manual reformatting and reducing end-to-end provisioning latency.

2. The system of claim 1, wherein the telecommunications numbering plan partitions comprise at least one of: a numbering plan area (NPA), a numbering plan area-exchange block (NPA-NXX), an Internet Protocol (IP) address or IP address block, a Uniform Resource Locator (URL)-based identifier grouping, or another telecommunications-defined partition for routing or service allocation.

3. The system of claim 1, wherein the classification module assigns the originating calling party identifiers to a column exhibiting lower cardinality and the terminating calling party identifiers to a column exhibiting higher cardinality.

4. The system of claim 1, wherein the numbering plan partition selector resolves tie conditions between telecommunications numbering plan partitions using a deterministic prioritization rule stored in the non-transitory memory.

5. The system of claim 1, wherein the quantity calculator applies weights to the selection criteria values, scales a weighted sum, and rounds to a nearest integer subject to a minimum quantity and a maximum quantity.

6. The system of claim 1, wherein the threshold evaluator applies configurable thresholds based on the selection criteria, the thresholds being stored in the non-transitory memory for dynamic update.

7. The system of claim 1, wherein the recon module generates the carrier heatmap data and the destination heatmap data and persists the carrier heatmap data and the destination heatmap data in a cloud datastore.

8. The system of claim 1, wherein the report generator outputs the vector-encoded heatmap report and the machine-actionable file in at least one of: a vector-encoded portable document format (PDF) format or a spreadsheet worksheet format, each preserving label legibility and enabling ingestion by automated number-ordering workflows.

9. A method of using the system of claim 1, the method comprising the steps of:

ingesting, by the network interface, the plurality of call records;

applying, by the classification module, a column cardinality analysis to distinguish the terminating calling party identifiers from the originating calling party identifiers;

generating and persisting, by the recon module, carrier heatmap data and destination heatmap data derived from the terminating calling party identifiers;

mapping, by the mapping module, the terminating calling party identifiers to the telecommunications-defined service boundaries;

computing, by the traffic volume module and the population datastore, selection criteria values for each of the telecommunications-defined service boundaries;

determining, by the threshold evaluator, a set of the telecommunications-defined service boundaries that satisfy the selection criteria;

selecting, by the numbering plan partition selector, a set of telecommunications numbering plan partitions for each of the telecommunications-defined service boundaries determined by the threshold evaluator;

computing, by the quantity calculator, the required quantity of originating calling party identifiers for each of the telecommunications-defined service boundaries based on the selection criteria values; and generating, by the report generator, a machine-actionable file or a vector-encoded heatmap report.

10. A system for allocating originating calling party identifiers based on call traffic and population data, the system comprising:

a web server hosting a graphical user interface configured to accept an upload of one or more call record files or a recon result files;

a processor and a non-transitory memory storing instructions that, when executed by the processor, cause the system to:

trigger, upon the upload, execution of a sequence of processing modules comprising a classification module, a mapping module, a traffic volume module, a population datastore, a threshold evaluator, a telecommunications numbering plan partition selector, a quantity calculator, and a report generator;

cache one or more telecommunications-defined service boundary mapping tables in the non-transitory memory to reduce external datastore round-trips and thereby reduce latency of execution of the sequence of processing modules;

render one or more interactive vector-encoded heatmaps within the graphical user interface, the rendering configured to preserve label legibility and reduce memory utilization across multiple zoom levels, and provide download report controls to configure downloadable file results when the sequence of processing modules completes; and split one or more processing outputs into files not exceeding predetermined row or size thresholds, thereby ensuring manageable file size limits for downstream processing and compliance with system resource constraints;

wherein the graphical user interface provides controls to monitor progress of the sequence of processing modules and interact with the rendered analytics, and wherein the caching of the one or more telecommunications-defined service boundary mapping tables reduces latency by eliminating repeated external datastore lookups, the vector rendering of the one or more interactive heatmaps preserves label legibility and usability at multiple zoom levels for large call record datasets, and the file management of the one or more processing outputs maintains downstream compatibility by enforcing predetermined file size limits, thereby producing technical improvements in processing efficiency and user interaction responsiveness.

11. The system of claim 10, wherein the processor and the non-transitory memory are further configured to output the one or more interactive vector-encoded heatmaps and the machine-actionable file in at least one of: a vector-encoded portable document format (PDF) format or a spreadsheet worksheet format for downstream use.

12. The system of claim 10, wherein the processor and the non-transitory memory are further configured to persist carrier heatmap data and destination heatmap data derived from the plurality of call records in a cloud datastore accessible by the user interface.

13. The system of claim 10, wherein the processor and the non-transitory memory are further configured to cache one or more telecommunications-defined service boundary mapping tables in the non-transitory memory to reduce external datastore round-trips and improve execution latency.

14. A method of using the system of claim 10, the method comprising the steps of:

receiving, via the graphical user interface, user authentication input;

uploading, via the graphical user interface, one or more call record files or recon result files;

initiating execution of the processing sequence comprising the classification module, the mapping module, the traffic volume module, the population datastore, the threshold evaluator, the telecommunications numbering plan partition selector, the quantity calculator, and the report generator;

caching, in the non-transitory memory, the one or more telecommunications-defined service boundary mapping tables to reduce external datastore round-trips;

generating, by the processor, the machine-actionable file or the one or more vector-encoded heatmap reports;

splitting, by the processor, one or more processing outputs into files not exceeding predetermined row or size thresholds; and rendering, within the graphical user interface, one or more download report controls and corresponding downloadable results.

15. A system allocating originating calling party identifiers based on call traffic and population data, the system comprising:

an automation client configured to transmit, to a number-procurement service, an order request comprising, for each of the one or more telecommunications-defined service boundaries identified by the system, a computed quantity of one or more originating calling party identifiers and one or more telecommunications numbering plan partitions obtained from a machine-actionable file;

a verification module configured to receive one or more procurement status indicators and validate that the originating calling party identifiers acquired correspond to the one or more telecommunications numbering plan partitions designated for each of the telecommunications-defined service boundaries identified;

an audit logger configured to persist, for each of the one or more telecommunications-defined service boundaries, a computed quantity of the originating calling party identifiers, the one or more telecommunications numbering plan partitions, the one or more procurement status indicators, and a corresponding validation outcome; and a processor and a non-transitory memory storing instructions that, when executed by the processor, cause the system to:

parse the machine-actionable file;

submit, via the automation client, the order request with one or more idempotency tokens and one or more rate-limited backoff;

verify, via the verification module and upon receipt of the procurement status indicators, compliance of the originating calling party identifiers acquired with the one or more telecommunications numbering plan partitions designated; and on detection of a mismatch, initiate a remediation action comprising at least one of: canceling the order request, substituting an equivalent telecommunications numbering plan partition of equal or higher priority, or generating an operator alert;

wherein the system, by executing the automation client, the verification module, and the audit logger, provides automated ordering and validation that decreases end-to-end provisioning latency relative to manual processes, enforces compliance of the originating calling party identifiers with the one or more telecommunications numbering plan partitions designated, and maintains a tamper-evident record of procurement activity.

16. The system of claim 15, wherein the audit logger stores one or more cryptographic hashes of one or more order payloads and one or more confirmation payloads to enable tamper-evident reconciliation.

17. The system of claim 15, wherein the automation client batches order requests by each of the telecommunications-defined service boundaries and performs rate-limited submission to comply with provider thresholds while maintaining a target ordering time.

18. The system of claim 15, further comprising:

a quantity calculator configured to compute a recommended quantity of toll-free originating calling party identifiers using a scaling rule distinct from the telecommunications-defined service boundaries, wherein the automation client includes the recommended toll-free quantity of the originating calling party identifiers in the order request.

19. The system of claim 15, wherein the verification module configured to maintain a reconciliation log that cross-references each of the originating calling party identifiers with a corresponding procurement confirmation, and flags discrepancies for operator review when mismatches exceed a stored tolerance threshold.

20. A method of using the system of claim 15, the method comprising the steps of:

ingesting, by the processor, the machine-actionable file;

transmitting, via the automation client, the order request comprising the computed quantity of the originating calling party identifiers and the telecommunications numbering plan partitions;

receiving, by the processor, the one or more procurement status indicators;

verifying, via the verification module, compliance of the procured originating calling party identifiers with the designated telecommunications numbering plan partitions; and logging, via the audit logger, the computed quantity, the telecommunications numbering plan partitions, the procurement status indicators, and the corresponding validation outcome.

* * * * *